(12) United States Patent
Shin et al.

(10) Patent No.: US 12,045,674 B1
(45) Date of Patent: Jul. 23, 2024

(54) NEURAL PROCESSOR, NEURAL PROCESSING DEVICE INCLUDING THE SAME, AND METHOD FOR DETERMINING DATA COMMUNICATION MODE OF NEURAL PROCESSING DEVICE

(71) Applicant: REBELLIONS INC., Seongnamsi (KR)

(72) Inventors: Wongyu Shin, Seongnamsi (KR); Juyeong Yoon, Seongnamsi (KR); Sangeun Je, Seongnamsi (KR)

(73) Assignee: REBELLIONS INC., Seongnamsi (KR)

( * ) Notice: Subject to any disclaimer, the term of this patent is extended or adjusted under 35 U.S.C. 154(b) by 0 days.

(21) Appl. No.: 18/389,674

(22) Filed: Dec. 19, 2023

(30) Foreign Application Priority Data

Dec. 26, 2022 (KR) .................. 10-2022-0184698

(51) Int. Cl.
*G06F 9/54* (2006.01)
*G06F 1/10* (2006.01)
*G06F 9/52* (2006.01)

(52) U.S. Cl.
CPC ............... *G06F 9/542* (2013.01); *G06F 1/10* (2013.01); *G06F 9/52* (2013.01)

(58) Field of Classification Search
CPC ............... G06F 9/542; G06F 1/10; G06F 9/52
See application file for complete search history.

(56) References Cited

U.S. PATENT DOCUMENTS

| | | | | |
|---|---|---|---|---|
| 8,792,288 B1* | 7/2014 | Bartling | ............... | G11C 29/36 365/207 |
| 2009/0027085 A1* | 1/2009 | Ishii | ............... | G06F 1/10 327/108 |
| 2012/0230158 A1* | 9/2012 | Chuang | ............... | H03K 5/14 368/113 |
| 2012/0317434 A1* | 12/2012 | Tran | ............... | G06F 1/10 713/400 |
| 2016/0109921 A1 | 4/2016 | Chen et al. | | |
| 2021/0232921 A1* | 7/2021 | Parashar | ............... | G06F 9/5027 |

FOREIGN PATENT DOCUMENTS

| | | | | |
|---|---|---|---|---|
| CN | 105404374 B | * | 11/2018 | ............ G06F 1/24 |
| KR | 10-2005-0065269 A | | 6/2005 | |
| KR | 10-2017-0069267 A | | 6/2017 | |
| KR | 10-2022-0142781 A | | 10/2022 | |
| KR | 10-2480300 B1 | | 12/2022 | |

* cited by examiner

*Primary Examiner* — Kevin L Young
*Assistant Examiner* — Phuong N Hoang
(74) *Attorney, Agent, or Firm* — BROADVIEW IP LAW, PC

(57) ABSTRACT

A neural processing device is provided, which includes a first block that operates at a first operating frequency and at a second operating frequency different from the first operating frequency, a second block operates at the first operating frequency, and a data communication mode determiner that controls data communication between the first block and the second block, and determines a first data communication mode for a first interface between the first block and the second block.

18 Claims, 35 Drawing Sheets

NEURAL PROCESSOR, NEURAL PROCESSING DEVICE INCLUDING THE SAME, AND METHOD FOR DETERMINING DATA COMMUNICATION MODE OF NEURAL PROCESSING DEVICE

CROSS-REFERENCE TO RELATED APPLICATION

This application claims priority under 35 U.S.C. § 119 to Korean Patent Application No. 10-2022-0184698, filed in the Korean Intellectual Property Office on Dec. 26, 2022, the entire contents of which are hereby incorporated by reference.

TECHNICAL FIELD

The present disclosure relates to a neural processor, a neural processing device including the same, and a method for determining a data communication mode of the neural processing device. Specifically, the present disclosure relates to a neural processor capable of selecting a data communication mode as synchronous or asynchronous, a neural processing device including the same, and a method for determining the data communication mode of the neural processing device.

BACKGROUND

In recent years, artificial intelligence (AI) has been discussed as the most promising technology worldwide as a core technology of the fourth Industrial Revolution. The biggest challenge of the artificial intelligence would be computing performance. For the artificial intelligence that realizes human learning, reasoning, perception, and performance of natural language, the speed of processing big data is the key factor.

In the early days of the artificial intelligence learning, the central processing unit (CPU) or graphics processing unit (GPU) of related computers are used for deep learning and inference, but there is a limit to use them in the deep learning and inference with high workload, and the neural processing unit (NPU) that is structurally specialized for deep learning is in the spotlight. The neural processing unit has a plurality of compute units inside, and each compute unit operates in parallel, thereby increasing computation efficiency.

The neural processing unit includes not only a plurality of compute units but also various components, and these components operate at different operating frequency ranges. Therefore, in the manufacture of a chip, the operating frequencies of the components included in the neural processing unit are appropriately selected in the designing stage, and either a synchronous data communication circuit or an asynchronous data communication circuit is selectively determined for the corresponding components. However, even if the chip is designed perfectly in theory, unexpected timing issues may occur due to component operation errors, transmission delays, etc. that may occur during actual operation. In addition, even a chip without a problem at the time of manufacture may have new timing issues as components deteriorate.

SUMMARY

An object of the present disclosure is to provide a neural processor and a neural processing device including components capable of selecting either a synchronous data communication mode or an asynchronous data communication mode in accordance with the operating frequency.

Another object of the present disclosure is to provide a method for determining a data communication mode, which is capable of selecting either a synchronous data communication mode or an asynchronous data communication mode in accordance with chip test results.

The objects of the present disclosure are not limited to the objects described above, and other objects and advantages of the present disclosure that are not described can be understood by the following description and will be more clearly understood by the examples of the present disclosure. In addition, it will be readily apparent that the objects and advantages of the present disclosure can be realized by the means and combinations thereof indicated in the claims.

According to some examples, a neural processing device may include a first block that operates at a first operating frequency and at a second operating frequency different from the first operating frequency, a second block that operates at the first operating frequency, and a data communication mode determiner that controls data communication between the first block and the second block, and determines a first data communication mode for a first interface between the first block and the second block.

In some examples, the data communication mode determiner may control the first block to operate at one of the first operating frequency and the second operating frequency.

In some examples, the first data communication mode may be either a synchronous data communication mode or an asynchronous data communication mode.

In some examples, if the first block operates at the first operating frequency, the data communication mode determiner may determine the first data communication mode to be the synchronous data communication mode.

In some examples, if the first block operates at the second operating frequency, the data communication mode determiner may determine the first data communication mode to be the asynchronous data communication mode.

In some examples, the neural processing device may further include a command processor that controls the data communication mode determiner.

In some examples, the neural processing device may further include a third block that operates at the second operating frequency, and the data communication mode determiner may further determine a second data communication mode for the second interface between the first block and the third block and a third data communication mode for the third interface between the second block and the third block.

In some examples, the data communication mode determiner may receive operating frequencies for each of the first to third blocks from the first to third blocks.

In some examples, if the first block operates at the first operating frequency, the data communication mode determiner may determine the first data communication mode to be the synchronous data communication mode, and determine the second data communication mode and the third data communication mode to be the asynchronous data communication mode.

In some examples, if the first block operates at the second operating frequency, the data communication mode determiner may determine the first data communication mode and the second data communication mode to be the asynchronous data communication mode, and determine the third data communication mode to be the synchronous data communication mode.

In some examples, the first block and the second block may be either a neural core or a memory.

According to some examples, a neural processor may include a first neural core that operates at a first operating frequency and at a second operating frequency greater than the first operating frequency, a second neural core that operates at the first operating frequency and the second operating frequency, a first memory that operates at the first operating frequency and is connected to the first neural core, a task manager that configures a data communication path, and a data communication mode determiner that controls a data communication among the first neural core, the second neural core, and the first memory, and determines a mode of data communication among the first neural core, the second neural core, and the first memory, in which the data communication mode determiner may determine a mode of data communication among the first neural core, the second neural core, and the first memory in accordance with the operating frequency at which the first neural core and the second neural core operate.

In some examples, if relatively fast computation is required, the data communication mode determiner may control the first neural core and the second neural core to operate at the second operating frequency, and the data communication mode determiner may determine the mode of data communication between the first neural core and the second neural core to be the synchronous communication mode, and determine the mode of data communication between the first neural core and the first memory to be the asynchronous communication mode.

In some examples, if computation at relatively low power is required, the data communication mode determiner may control the first neural core and the second neural core to operate at the first operating frequency, and the data communication mode determiner may determine the mode of data communication among the first neural core, the second neural core, and the first memory to be the synchronous communication mode.

In some examples, the neural processor may include a first data line connecting the first neural core and the second neural core in series and transmitting data in a first direction, a second data line connecting the first neural core and the second neural core in series and transmitting data in a second direction opposite to the first direction, and a second memory that is connected to the second neural core and operates at the second operating frequency, in which the task manager may control the first data line and the second data line so as to configure a data path among the first neural core, the second neural core, the first memory, and the second memory.

In some examples, the task manager may control the first data line and the second data line so as to configure a first data path in which data is provided in the first direction from the first memory to the first neural core and data is provided in the second direction from the first neural core to the first memory, and control the first data line and the second data line so as to configure a second data path in which data is provided in the second direction from the second memory to the second neural core and data is provided in the first direction from the second neural core to the second memory.

In some examples, the data communication mode determiner may control the first neural core and the second neural core to operate at the first operating frequency, and determine a mode of data communication between the first neural core and the second neural core to be the synchronous data communication mode.

In some examples, the first data line may include a plurality of data lines, and if the first neural core and the second neural core operate at the first operating frequency, the task manager may control so as to turn off some of the plurality of data lines included in the first data line.

According to some examples, a method for determining a data communication mode of a neural core SoC may include designing a semiconductor chip including a plurality of blocks and a data communication mode determiner capable of reconfiguring a mode of data communication between the plurality of blocks into one of a synchronous data communication mode and an asynchronous data communication mode, verifying the designed semiconductor chip, and determining, using the data communication mode determiner, at least some of the plurality of blocks to be the synchronous data communication mode in accordance with the verification result of the designed semiconductor chip, in which the verifying the designed semiconductor chip may include checking whether the designed semiconductor chip operates normally and checking whether the designed semiconductor chip can be physically implemented.

In some examples, the method may further include producing the designed semiconductor chip, verifying the produced semiconductor chip, and determining at least some of the plurality of blocks determined to be the synchronous data communication mode to be the asynchronous data communication mode in accordance with the verification result of the produced semiconductor chip.

The neural processor and neural core SoC of the present disclosure includes the data communication mode determiner that can select the data communication mode, thereby solving timing issues that may occur in unexpected situations.

The method for determining the data communication mode according to the examples of the present disclosure can solve the timing issue by simply adjusting the data communication mode without changing the chip design when an unpredictable timing issue occurs in the chip design.

According to some examples of the present disclosure, the neural processor, the neural core SoC, and the method for determining the data communication mode using the same can effectively solve driving problems caused by differences in the operating frequencies between different blocks.

In addition to the effects mentioned above, specific effects of the present disclosure are described below while explaining specific details for carrying out the present disclosure.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
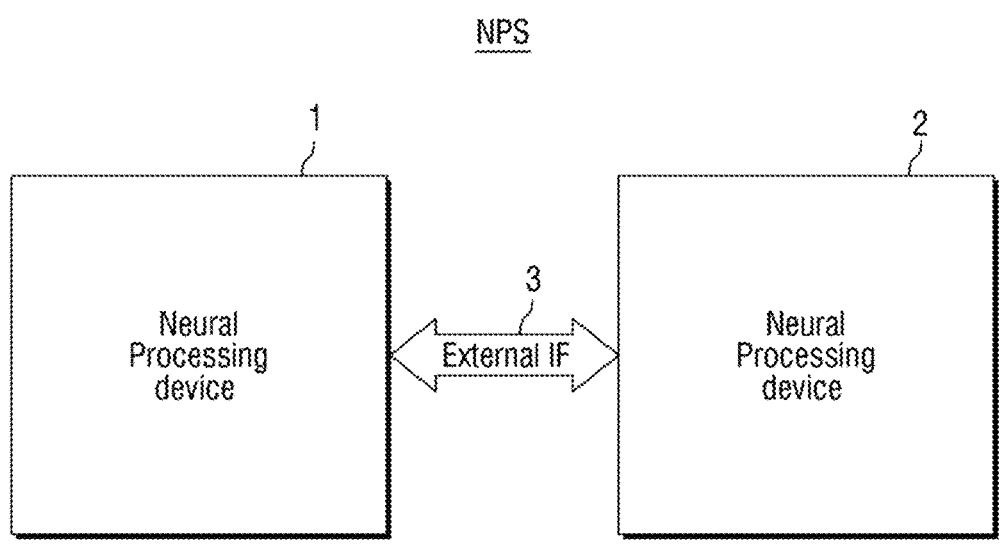
FIG. 1 is a block diagram provided to explain a neural processing system according to some examples of the present disclosure.

The terms or words used herein should not be construed as limited to their general or dictionary meanings. According to the principle that the inventor may define the concepts of terms or words in order to explain his or her invention in the best way, it should be interpreted with a meaning and concept consistent with the technical idea of the present disclosure. In addition, the examples described herein and the configurations shown in the drawings are merely one example for implementing the present disclosure, and do not completely represent the technical idea of the present disclosure, so it should be understood that there may be various equivalents, modifications, and applicable examples that may replace them at the time of filing this application.

Terms such as first, second, A, B and so on used in this specification and claims may be used in describing a variety of elements, but these elements should not be limited to the expression. The expressions are used only for the purpose of distinguishing one element from another. For example, without departing from the scope of the present disclosure, a first component may be referred to as a second component, and similarly, the second component may also be referred to as the first component. The term "and/or" includes a combination of a plurality of related described items or any of a plurality of related described items.

The terms used herein are merely used to describe specific examples and are not intended to limit the invention. Unless otherwise specified, a singular expression includes a plural expression. It should be understood that terms such as "include" or "have" used herein do not preclude the existence or possibility of addition of features, numbers, steps, operations, components, parts, or combinations thereof described herein.

Unless defined otherwise, all expressions used herein, including technical or scientific expressions, have the same meaning as commonly understood by one of ordinary skill in the art to which the present disclosure pertains.

Expressions such as those defined in commonly used dictionaries should be interpreted as having a meaning consistent with the meaning in the context of the relevant art and are to be interpreted as ideal or overly formal in meaning unless explicitly defined in the present application.

In addition, each configuration, process, step, method, or the like included in each example of the present disclosure may be shared within the scope of not being technically contradictory to each other.

FIG. 1 is a block diagram provided to explain a neural processing system according to some examples of the disclosure.

Referring to FIG. 1, the neural processing system (NPS) may include a first neural processing device 1, a second neural processing device 2, and an external interface 3.

The first neural processing device 1 may be a device that performs computations using an artificial neural network. The first neural processing device 1 may be a device specialized for performing a deep learning computational work, for example. However, aspects are not limited to the above.

The second neural processing device 2 may have a configuration identical or similar to that of the first neural processing device 1. The first neural processing device 1 and the second neural processing device 2 may be connected to each other through the external interface 3 to share data and control signals.

Although FIG. 1 illustrates two neural processing devices, the neural processing system (NPS) according to some examples of the present disclosure is not limited thereto. That is, in the neural processing system (NPS) according to some examples, three or more neural processing devices may be connected to each other through the external interface 3. In addition, conversely, the neural processing system (NPS) according to some examples may include only one neural processing device.

In this case, each of the first neural processing device 1 and the second neural processing device 2 may be a processing device other than the neural processing device. That is, the first neural processing device 1 and the second neural processing device 2 may be a graphics processing unit (GPU), a central processing unit (CPU), or other types of processing devices, respectively. Hereinafter, for convenience, the first neural processing device 1 and the second neural processing device 2 will be described as the neural processing devices.

Figure 2:
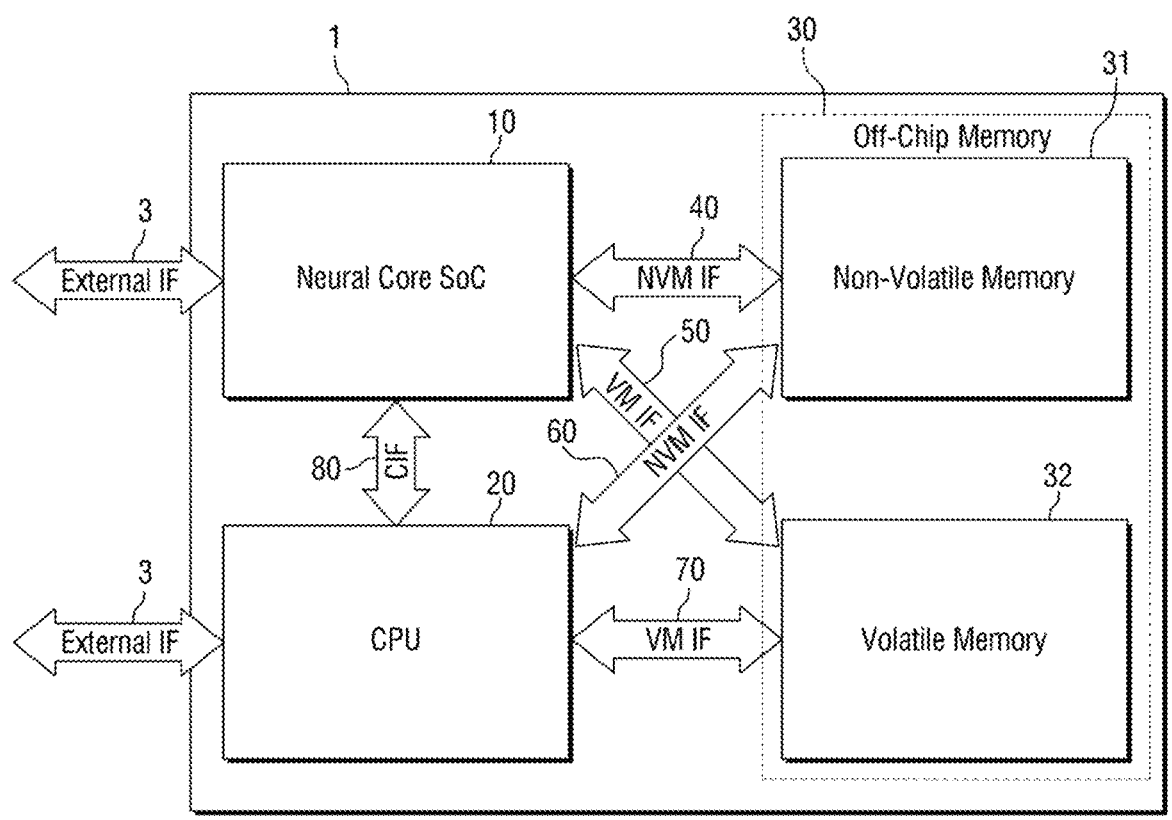
FIG. 2 is a block diagram provided to explain the neural processing device of FIG. 1 in detail.

FIG. 2 is a block diagram provided to explain the neural processing device of FIG. 1 in detail.

Referring to FIG. 2, the first neural processing device 1 may include a neural core SoC 10, a CPU 20, an off-chip memory 30, a first non-volatile memory interface 40, a first volatile memory interface 50, a second non-volatile memory interface 60, a second volatile memory interface 70, and a control interface (CIF) 80.

The neural core SoC 10 may be a System on Chip device. The neural core SoC 10 may be an artificial intelligence compute unit and may be an accelerator. The neural core SoC 10 may be any one of a graphics processing unit (GPU), a field programmable gate array (FPGA), and an application-specific integrated circuit (ASIC), for example. However, aspects are not limited to the above.

The neural core SoC 10 may exchange data with other external compute units through the external interface 3. In addition, the neural core SoC 10 may be connected to a non-volatile memory 31 and a volatile memory 32 through the first non-volatile memory interface 40 and the first volatile memory interface 50, respectively.

The CPU 20 may be a controller that controls the system of the first neural processing device 1 and executes the program computations. The CPU 20 is a general-purpose compute unit and may have too low efficiency to perform parallel simple computations widely used in deep learning. Accordingly, the neural core SoC 10 may perform computations for deep learning reasoning and training works, thus achieving high efficiency.

The CPU 20 may exchange data with other external compute units through the external interface 3. In addition, the CPU 20 may be connected to the non-volatile memory 31 and the volatile memory 32 through the second non-volatile memory interface 60 and the second volatile memory interface 70, respectively.

The CPU 20 may also pass a task to the neural core SoC 10 in a command. In this case, the CPU 20 may be a kind of host that gives instructions to the neural core SoC 10. That is, the neural core SoC 10 can efficiently perform parallel computational tasks such as deep learning tasks according to the instructions of the CPU 20.

The off-chip memory 30 may be a memory disposed outside a chip of the neural core SoC 10. The off-chip memory 30 may include the non-volatile memory 31 and the volatile memory 32.

The non-volatile memory 31 may be a memory that continuously retains stored information even when there is no power supply. For example, the non-volatile memory 31 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory), an Ultra-Violet Erasable Programmable Read-Only Memory (UVEPROM), a Ferroelectric Random Access Memory (FeRAM), a Magnetoresistive Random Access Memory (MRAM), a Phase-change Random Access Memory (PRAM), a silicon-oxide-nitride-oxide-silicon (SONOS), a Resistive Random Access Memory (RRAM), a Nanotube Random Access Memory (NRAM), a magnetic computer storage devices such as hard disks, and a magnetic computer storage device (e.g., hard disk, diskette drive, magnetic tape), an optical disk drive, or 3D XPoint memory. However, aspects are not limited to the above.

Unlike the non-volatile memory 31, the volatile memory 32 may be a memory that continuously requires power to maintain stored information. For example, the volatile memory 32 may include at least one of a Dynamic Random Access Memory (DRAM), a Static Random Access Memory (SRAM), a Synchronous Dynamic Random Access Memory (SDRAM), and a Double Data Rate SDRAM (DDR SDRAM). However, aspects are not limited to the above.

For example, each of the first non-volatile memory interface 40 and the second non-volatile memory interface 60 may include at least one of a Parallel Advanced Technology Attachment (PATA), a Small Computer System Interface (SCSI), a Serial Attached SCSI (SAS), a Serial Advanced Technology Attachment (SATA), and a PCI Express (PCIe). However, aspects are not limited to the above.

For example, each of first volatile memory interface 50 and the second volatile memory interface 70 may be at least one of a Single Data Rate (SDR), a Double Data Rate (DDR), a Quad Data Rate (QDR), an extreme Data Rate (XDR), and an octal data rate (ODR). However, aspects are not limited to the above.

The control interface 80 may be an interface for delivering control signals between the CPU 20 and the neural core SoC 10. The control interface 80 may transmit a command of the CPU 20 and transmit a response of the neural core SoC 10 to the command. For example, the control interface 80 may be PCI Express (PCIe), but is not limited thereto.

Figure 3:
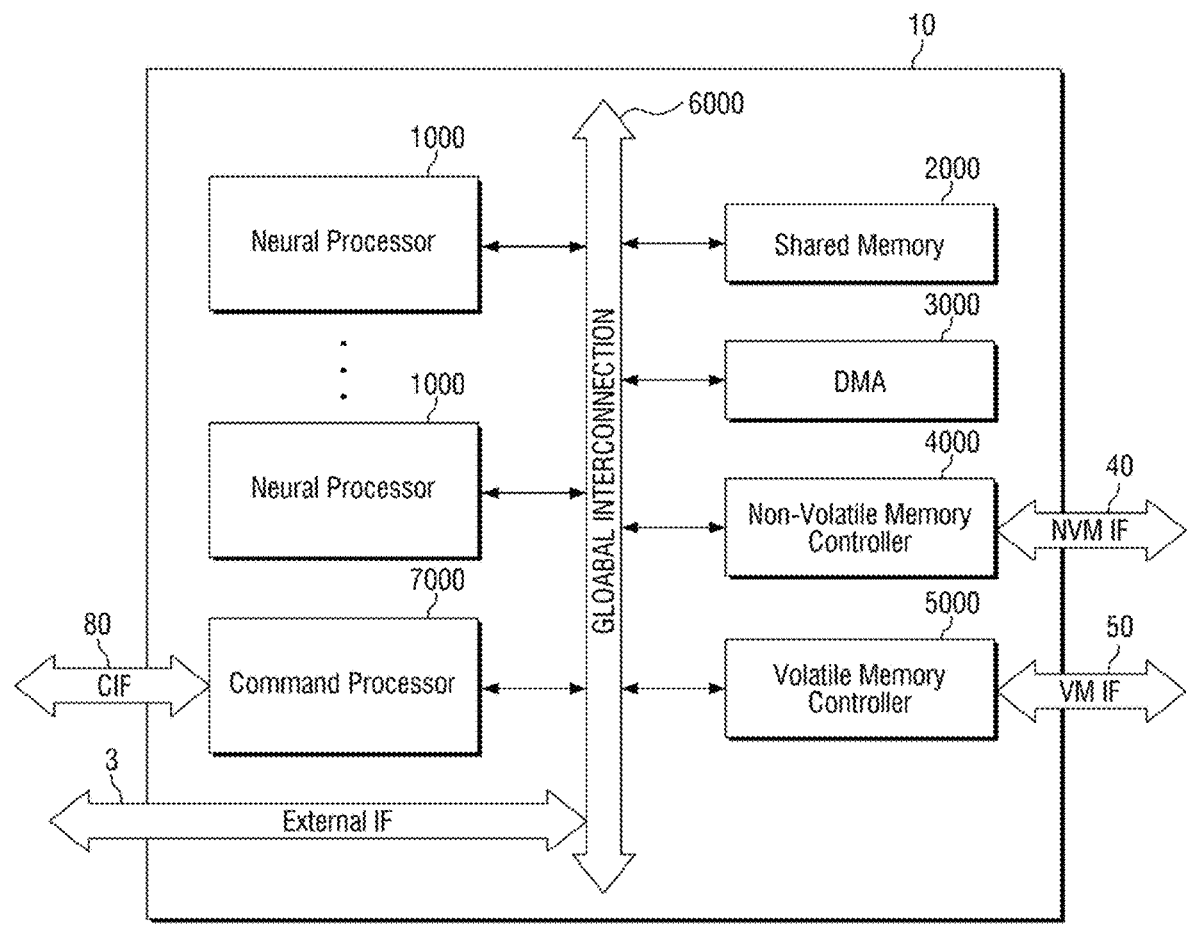
FIG. 3 is a block diagram provided to explain the neural core SoC of FIG. 2 in detail.

FIG. 3 is a block diagram provided to explain the neural core SoC of FIG. 2 in detail.

Referring to FIGS. 2 and 3, the neural core SoC 10 may include at least one neural processor 1000, a shared memory 2000, a Direct Memory Access (DMA) 3000, a non-volatile memory controller 4000, a volatile memory controller 5000, a command processor 7000, and a global interconnection 6000.

The neural processor 1000 may be a compute unit that directly performs computational works. If there are a plurality of neural processors 1000, the computational works may be allocated to each of the neural processors 1000. Each of the neural processors 1000 may be connected to each other through the global interconnection 6000.

The shared memory 2000 may be a memory shared by several neural processors 1000. The shared memory 2000 may store data of each neural processor 1000. In addition, the shared memory 2000 may receive data from the off-chip memory 30, temporarily store the data, and transmit the data to each neural processor 1000. Conversely, the shared memory 2000 may receive data from the neural processor 1000, temporarily store the data, and transmit the data to the off-chip memory 30 of FIG. 2.

The shared memory 2000 may require a relatively fast memory. Accordingly, the shared memory 2000 may include SRAM, for example. However, aspects are not limited to the above. That is, the shared memory 2000 may include DRAM.

The shared memory 2000 may be a memory corresponding to an SoC level, that is, to level 2 (L2). Accordingly, the shared memory 2000 may be defined as the L2 shared memory.

The DMA 3000 may directly control data movement without requiring the CPU 20 or the neural processor 1000 to control input/output of data. Accordingly, the DMA 3000 may control the data movement between memories to minimize the number of interrupts of the CPU 20 or the neural processor 1000.

The DMA 3000 may control the data movement between the shared memory 2000 and the off-chip memory 30. The non-volatile memory controller 4000 and the volatile memory controller 5000 may perform the movement of data through the authority of the DMA 3000.

The non-volatile memory controller 4000 may control read or write work for the non-volatile memory 31. The non-volatile memory controller 4000 may control the non-volatile memory 31 through the first non-volatile memory interface 40.

The volatile memory controller 5000 may control the read or write work for the volatile memory 32. In addition, the volatile memory controller 5000 may perform a refresh work of the volatile memory 32. The volatile memory controller 5000 may control the volatile memory 32 through the first volatile memory interface 50.

The command processor 7000 may be connected to the control interface 80. The command processor 7000 may receive a control signal from the CPU 20 through the control interface 80. The command processor 7000 may generate a task through a control signal received from the CPU 20 and transmit the task to each neural processor 1000. In addition, the command processor 7000 may receive a task completion report from each neural processor 1000.

The global interconnection 6000 may connect at least one neural processor 1000, the shared memory 2000, the DMA 3000, the non-volatile memory controller 4000, the command processor 7000, and the volatile memory controller 5000 to one another. In addition, the external interface 3 may also be connected to the global interconnection 6000. The global interconnection 6000 may be a path through which data moves between at least one neural processor 1000, the shared memory 2000, the DMA 3000, the non-volatile memory controller 4000, the volatile memory controller 5000, the command processor 7000, and the external interface 3.

The global interconnection 6000 may transmit not only the data, but also control signals and signals for synchronization. In the neural processing device according to some examples of the disclosure, each neural processor 1000 may directly transmit and receive the synchronization signal. Accordingly, latency due to transmission of the synchronization signal generated by the command processor 7000 may be minimized.

That is, if there are the plurality of neural processors 1000, there may be a dependency of individual works in which the work of one neural processor 1000 must be completed before the next neural processor 1000 may start a new work. The end and start of these individual tasks may be confirmed through synchronization signals, but according to the existing technology, the command processor 7000 or the host, that is, the CPU 20 is in full charge of receiving the synchronization signal and instructing the start of a new task.

However, if the number of neural processors 1000 increases and the dependency of the works is designed more complexly, the number of synchronization signals will increase exponentially, and the latency according to each synchronization signal may significantly reduce the efficiency of the works.

Therefore, in the neural processing device according to some examples of the disclosure, instead of the command processor 7000, each neural processor 1000 may directly transmit part of the synchronization signals to the other neural processors 1000 according to the dependency of the work. In this case, compared to the way of managing by the command processor 7000, the plurality of neural processors 1000 may perform synchronization works in parallel, thereby minimizing latency due to synchronization.

In addition, the command processor 7000 also performs work scheduling of the neural processors 1000 according to work dependency, and the overhead of such scheduling may increase significantly as the number of neural processors 1000 increases. Accordingly, in the neural processing device according to some examples of the disclosure, the scheduling work is partially performed by the individual neural processor 1000, which may reduce the scheduling burden and thus improve the performance of the device.

In addition, the neural processing device according to some examples may monitor completion of task, occurrence of event, delay in performing task, etc. in the neural core of each neural processor 1000 and minimize the intervention of the command processor 7000, thus reducing the load on the command processor 7000 and improving the performance of the device.

In addition, the neural processing device according to some examples may be configured to selectively generate a completion report by setting, for each task, whether or not to monitor the task, and modify whether or not to generate a completion report depending on whether reporting to the command processor 7000 is required. Accordingly, it is possible to report tasks requiring warnings without performing monitoring for all tasks, and reduce the load on the command processor 7000 and also enable stable monitoring of the tasks.

Figure 4:
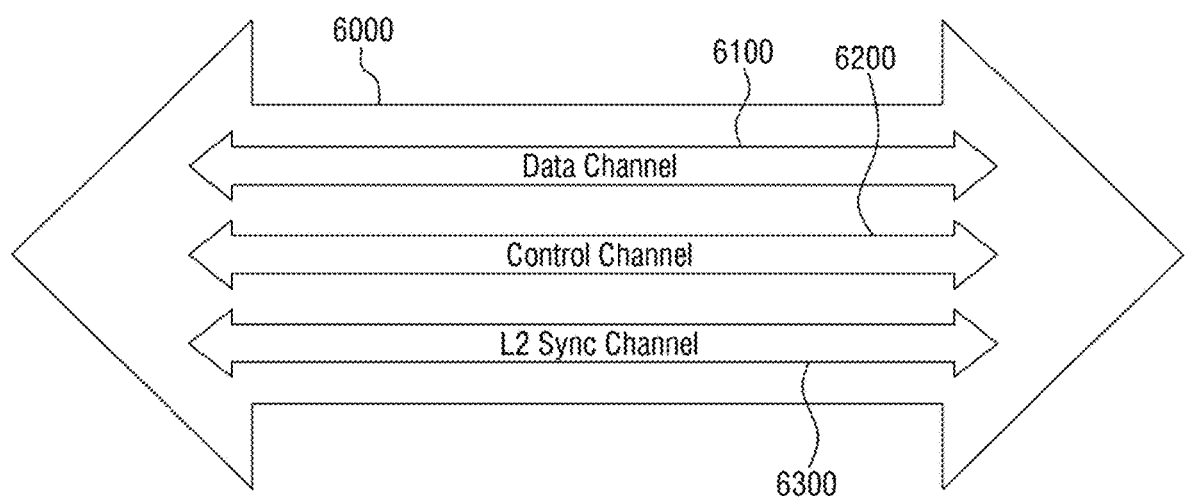
FIG. 4 is a structural diagram provided to explain the global interconnection of FIG. 3 in detail.

FIG. 4 is a structural diagram provided to explain the global interconnection of FIG. 3 in detail.

Referring to FIG. 4, the global interconnection 6000 may include a data channel 6100, a control channel 6200, and an L2 sync channel 6300.

The data channel 6100 may be a private channel for transmitting data. Through the data channel 6100, at least one neural processor 1000, the shared memory 2000, the DMA 3000, the non-volatile memory controller 4000, the volatile memory controller 5000, and the external interface 3 may exchange data with each other.

The control channel 6200 may be a private channel for transmitting control signals. Through the control channel 6200, at least one neural processor 1000, the shared memory 2000, the DMA 3000, the non-volatile memory controller 4000, the volatile memory controller 5000, the command processor 7000, and the external interface 3 may exchange control signals with each other. In particular, the command processor 7000 may transmit various control signals to each of the neural processors 1000.

The L2 sync channel 6300 may be a private channel for transmitting the synchronization signals. Through the L2 sync channel 6300, at least one neural processor 1000, the shared memory 2000, the DMA 3000, the non-volatile memory controller 4000, the volatile memory controller 5000, the command processor 7000, and the external interface 3 may exchange the synchronization signals with each other.

The L2 sync channel 6300 may be set as a private channel inside the global interconnection 6000 so as to allow fast transmission of the synchronization signals without overlapping with other channels. Accordingly, the neural processing device according to some examples may smoothly perform synchronization using the existing global interconnection 6000 without requiring new wiring work.

Figure 5:
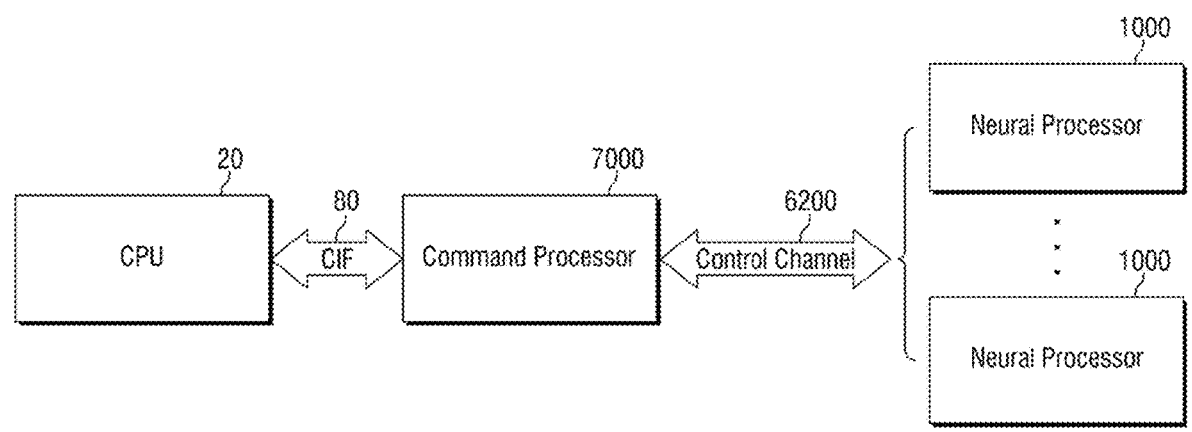
FIG. 5 is a block diagram provided to explain the flow of control signals of the neural processing device of FIG. 1.

FIG. 5 is a block diagram provided to explain the flow of control signals of the neural processing device of FIG. 1.

Referring to FIG. 5, the CPU 20 may transfer the control signal to the command processor 7000 through the control interface 80. The control signal may be a signal to instruct to perform each operation including a computational work, a data load/store work, etc.

The command processor 7000 may receive the control signal and transmit the control signal to at least one neural processor 1000 through the control channel 6200. Each control signal may be stored as each task in the neural processor 1000.

Figure 6:
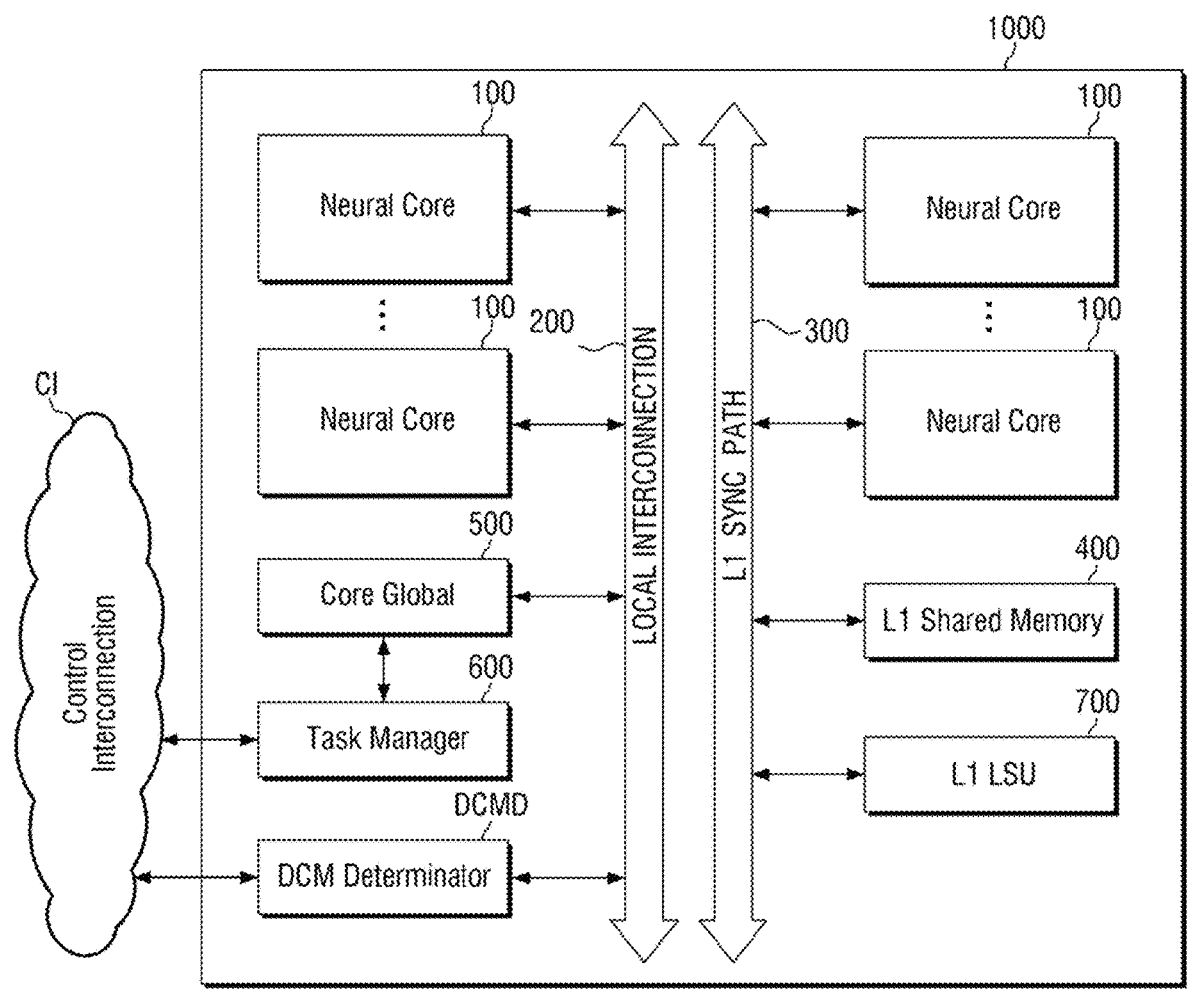
FIG. 6 is a block diagram provided to explain the neural processor of FIG. 3 in detail.

FIG. 6 is a block diagram provided to explain the neural processor of FIG. 3 in detail.

Referring to FIGS. 3 and 6, the neural processor 1000 may include at least one neural core 100, a local interconnection 200, an L1 sync path 300, an L1 shared memory 400, a core global 500, a task manager 600, an L1 LSU 700, and a data communication mode determiner (DCMD).

At least one neural core 100 may divide and perform the work of the neural processor 1000. For example, there may be eight neural cores 100. However, aspects are not limited to the above. Although it is shown in FIGS. 3 and 5 that several neural cores 100 are included in the neural processor 1000, aspects are not limited to the above. That is, the neural processor 1000 may be configured with only one neural core 100.

The neural core 100 may receive task information from the core global 500 and perform a task according to the task information. The task may be defined by the control signals, and the task may be either a compute operation or a memory operation. The memory operation may be, for example, any one of micro DMA (μDMA), LP micro DMA (low priority μDMA), store μDMA (STμDMA), and pre-processing works.

The L1 shared memory 400 may be a memory shared by each neural core 100 in the neural processor 1000. The L1 shared memory 400 may store data of each neural core 100. In addition, the L1 shared memory 400 may receive data from the shared memory 2000 of FIG. 4, temporarily store the data, and transmit the data to each neural core 100. Conversely, the L1 shared memory 400 may receive data from the neural core 100, temporarily store the data, and transfer the data to the shared memory 2000 of FIG. 3.

The L1 shared memory 400 may be a memory corresponding to the neural processor level, that is, to level 1 (L1). The L2 shared memory, that is, the shared memory 2000 may be shared by the neural processor 1000, and the L1 shared memory 400 may be shared by the neural core 100.

The L1 LSU 700 may receive at least one of data, control signals, and synchronization signals from the outside through the global interconnection 6000. The L1 LSU 700 may transmit at least one of the data, the control signals, and the synchronization signals received by the L1 shared memory 400. Likewise, the L1 LSU 700 may transmit at least one of the data, the control signals, and the synchronization signals to the outside through the global interconnection 6000. In addition, for each of the neural cores 100, the L1 LSU 700 may transmit and receive at least one of the data, the control signals, and the synchronization signals.

The neural core 100 may receive task information from the core global 500 and perform a task according to the task information. The task may be a work related to the computational work or the memory operation. The task may be defined by the control signals. The task information is information on the task, and it may be information on type of task, form of task, additional information on task, etc.

The neural core 100 may transmit a completion signal indicating completion of the task to the core global 500.

The task manager 600 may receive a task from the control interconnection (CI). The control interconnection (CI) may be a general term for the transmission interfaces that transmit the tasks from the command processor 7000.

The task manager 600 may receive a task, generate task information, and transmit the result to the core global 500. In addition, the task manager 600 may receive a completion signal through the core global 500, generate a completion report accordingly, and transmit the result to the command processor 7000 through the control interconnection (CI).

The core global 500 may be a wire structure connected in hardware within the neural core 100. Although not illustrated, the core global 500 may be a structure that connects the neural core 100, the L1 shared memory 400, the L1 LSU 700, and the task manager 600.

The core global 500 may receive the task information from the task manager 600, transmit the same to the neural core 100, and receive a corresponding completion signal from the neural core 100. The core global 500 may transmit the completion signal to the task manager 600.

The local interconnection 200 may connect at least one neural core 100, the L1 shared memory 400, the core global 500, the task manager 600, and the L1 LSU 700 to each other. The local interconnection 200 may be a path through which data moves among at least one neural core 100, the L1 shared memory 400, the core global 500, the task manager 600, and the L1 LSU 700. The local interconnection 200 may be connected to the global interconnection 6000 of FIG. 3 to transmit the data.

The L1 sync path 300 may connect at least one neural core 100, the L1 shared memory 400, the core global 500, the task manager 600, and the L1 LSU 700 to each other. The L1 sync path 300 may be a path through which the synchronization signals of at least one neural core 100, the L1 shared memory 400, the core global 500, the task manager 600, and the L1 LSU 700 move.

The L1 sync path 300 may be physically separated from the local interconnection 200. Unlike the global interconnection 6000, the local interconnection 200 may not have sufficient channels formed therein. In this case, the L1 sync path 300 may be formed separately such that it is possible to perform transfer of the synchronization signal quickly and without delay. The L1 sync path 300 may be used for the synchronization performed at a level that is one level lower than the L2 sync channel 6300 of the global interconnection 6000.

The data communication mode determiner (DCMD) may determine a mode of data communication between components included in the neural processor 1000 in accordance with the operating frequencies of the components. Specifically, the data communication mode determiner (DCMD) may determine whether the components included in the neural processor 1000 is to operate in a synchronous data communication mode or an asynchronous data communication mode.

According to some examples, the data communication mode determiner (DCMD) may receive information on the operating frequencies for the components included in the neural processor 1000. The data communication mode determiner (DCMD) may determine the data communication mode of the components included in the neural processor 1000 based on the information on the operating frequencies of the components included in the neural processor 1000.

According to some examples, the data communication mode determiner (DCMD) may operate under the control of the command processor 7000, but aspects are not limited thereto. For example, the data communication mode determiner (DMCD) may be implemented as a part of the function of the task manager 600 and may also operate under the control of the task manager 600. However, for convenience of explanation, it will be described below that the data communication mode determiner (DCMD) operates under the control of the command processor 7000.

Figure 7:
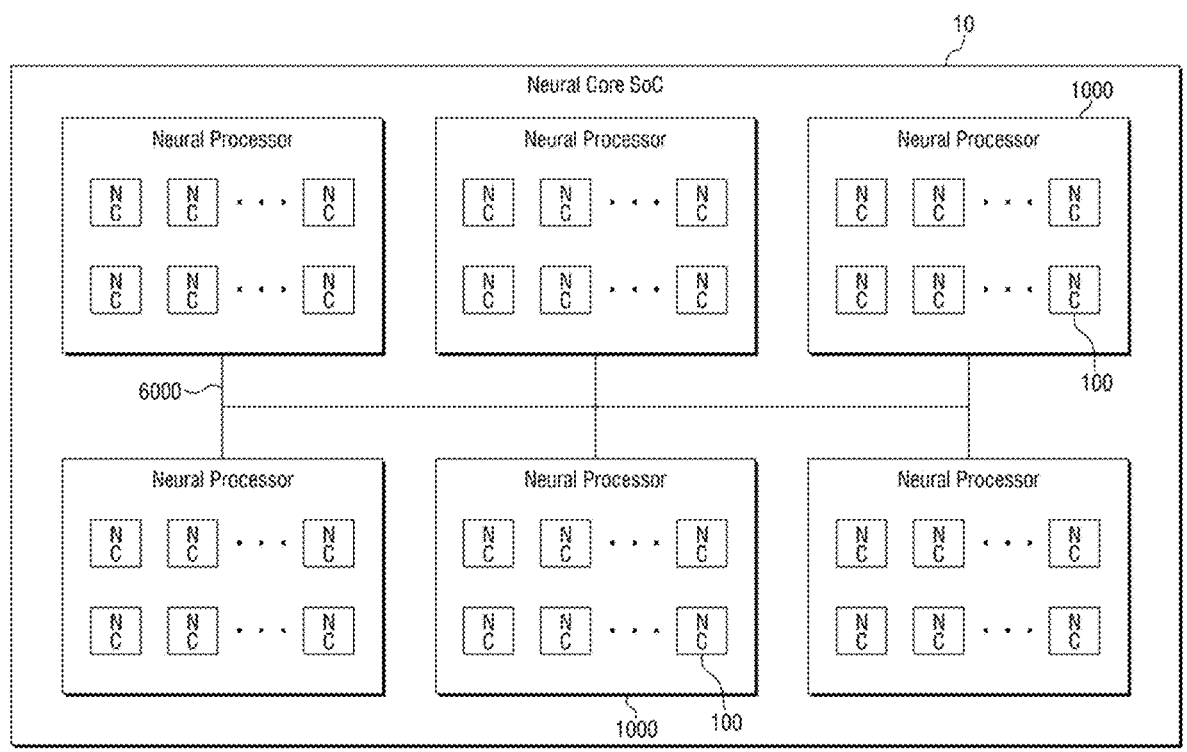
FIG. 7 is a diagram provided to explain a hierarchical structure of the neural processing device according to some examples of the present disclosure.

FIG. 7 is a diagram provided to explain a hierarchical structure of a neural processing device according to some examples of the disclosure.

Referring to FIG. 7, the neural core SoC 10 may include at least one neural processor 1000. Each neural processor 1000 may transmit data to each other through the global interconnection 6000.

Each neural processor 1000 may include at least one neural core 100. The neural core 100 may be a processing unit optimized for deep learning computational works. The neural core 100 may be a processing unit corresponding to one operation of the deep learning computational work. That is, the deep learning computational work may be expressed as a sequential or parallel combination of several operations. The neural core 100 is a processing unit that may each process one operation, and may be the minimum unit of computation that can be considered for scheduling from a compiler's perspective.

The neural processing device may achieve fast and efficient scheduling and performance of computational works by configuring the minimum unit of computations considered for scheduling from a compiler's perspective and the hardware processing unit on the same scale.

That is, if the hardware processing unit that may be divided is too large compared to the computational work, inefficiency in the computational work may occur when operating the processing unit. Conversely, it is not appropriate to always schedule the processing unit smaller than the operation which is the compiler's minimum scheduling unit, as this may result in scheduling inefficiencies and also increase hardware design costs.

Therefore, the scale of the compiler's scheduling unit and the hardware processing unit may be similarly adjusted to satisfy both the fast computational work scheduling and the efficient computational work performance without wasting hardware resources.

Figure 8:
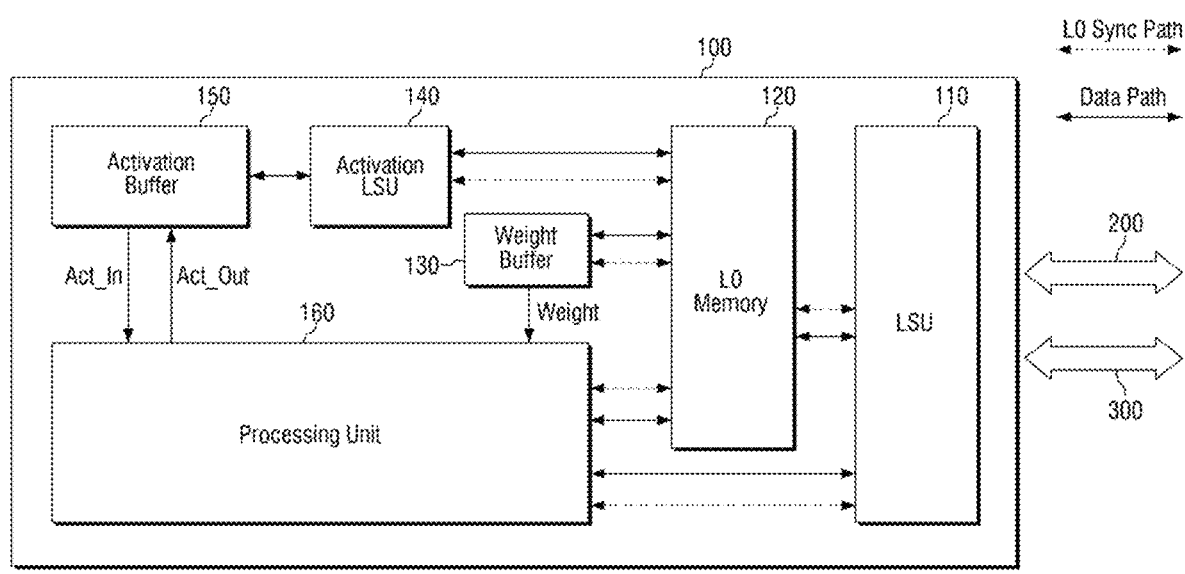
FIG. 8 is a block diagram provided to explain the neural core of FIG. 6 in detail.

FIG. 8 is a block diagram provided to explain the neural core of FIG. 6 in detail.

Referring to FIG. 8, the neural core 100 may include a load/store unit (LSU) 110, an L0 memory 120, a weight buffer 130, an activation LSU 140, an activation buffer 150, and a processing unit 160.

The LSU 110 may receive at least one of data, control signals, and synchronization signals from the outside through the local interconnection 200 and the L1 sync path 300. The LSU 110 may transmit at least one of the data, the control signals, and the synchronization signals received by the L0 memory 120. Likewise, the LSU 110 may transmit at least one of the data, the control signals, and the synchronization signals to the outside through the local interconnection 200 and the L1 sync path 300.

Specifically, a micro DMA work may be a work of the neural core 100 loading program or data from the shared memory 2000 or the off-chip memory 30 to the L0 memory 120. Unlike the typical micro DMA work, the LP micro DMA work may be a work of loading program or data to be used later, rather than the current program or data. Because these works have a low priority, they may be identified differently from the micro DMA works. An ST Micro DMA work may be a store work of the L0 memory 120 of the neural core 100 to store data in the shared memory 2000 or the off-chip memory 30. The pre-processing work may include a work of the CPU 20 to pre-load data such as a large amount of lookup tables.

Figure 9:
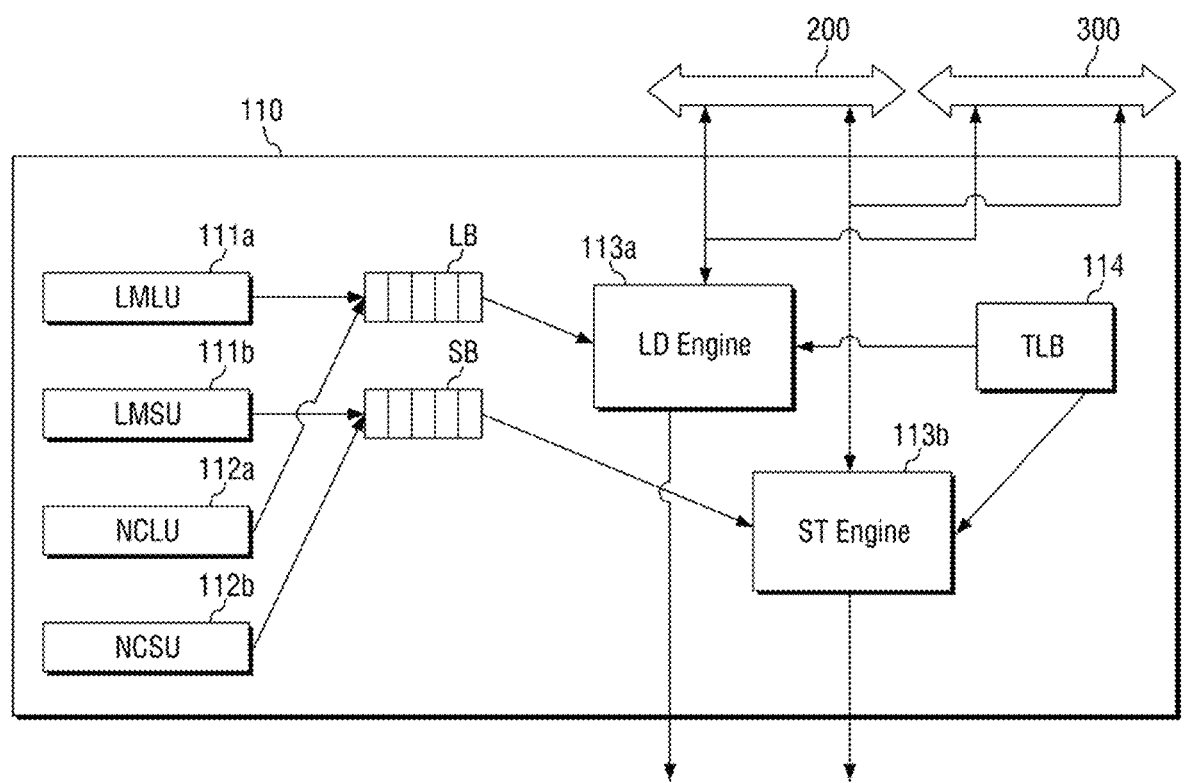
FIG. 9 is a block diagram provided to explain the LSU of FIG. 8 in detail.

FIG. 9 is a block diagram provided to explain the LSU of FIG. 8 in detail.

Referring to FIG. 9, the LSU 110 may include a local memory load unit 111*a*, a local memory store unit 111*b*, a neural core load unit 112*a*, a neural core store unit 112*b*, a load buffer (LB), and a store buffer (SB), a load engine 113*a*, a store engine 113*b*, and a translation index buffer 114.

The local memory load unit 111*a* may fetch a load instruction for the L0 memory 120 and issue the load instruction. If the local memory load unit 111*a* provides the issued load instruction to the load buffer (LB), the load buffer LB may send the memory access requests to the load engine 113*a* in order of input.

Further, the local memory store unit 111*b* may fetch a store instruction for the L0 memory 120 and issue the store instruction. If the local memory store unit 111*b* provides the issued store instruction to the store buffer (SB), the store buffer (SB) may send the memory access requests to the store engine 113*b* in order of input.

The neural core load unit 112*a* may fetch a load instruction for the neural core 100 and issue the load instruction. If the neural core load unit 112*a* provides the issued load instruction to the load buffer (LB), the load buffer (LB) may send the memory access requests to the load engine 113*a* in order of input.

In addition, the neural core store unit 112*b* may fetch a store instruction for the neural core 100 and issue the store instruction. If the neural core store unit 112*b* provides the issued store instruction to the store buffer (SB), the store buffer SB may send the memory access requests to the store engine 113b in order of input.

The load engine 113a may receive the memory access request and call up the data through the local interconnection 200. The load engine 113a may quickly find the data using the translation table of the recently used logical addresses and physical addresses in the translation index buffer 114. If the logical address of the load engine 113a is not in the translation index buffer 114, the address translation information may be found in another memory.

The store engine 113b may receive the memory access request and call up the data through the local interconnection 200. The store engine 113b may quickly find the data using the translation table of the recently used logical addresses and physical addresses in the translation index buffer 114. If the logical address of the store engine 113b is not in the translation index buffer 114, the address translation information may be found in another memory.

The load engine 113a and the store engine 113b may send a synchronization signal to the L1 sync path 300. The synchronization signal may indicate that the work is completed.

Referring to FIG. 8, the L0 memory 120 may be a memory located within the neural core 100, and the neural core 100 may receive all of input data required for the work from the outside and temporarily store the received data in the L0 memory 120. Further, the L0 memory 120 may temporarily store output data computed by the neural core 100 so as to transmit the same to the outside.

The L0 memory 120 may, by the activation LSU 140, transmit input activation (Act_In) to the activation buffer 150 and receive output activation (Act_Out). Other than the activation LSU 140, the L0 memory 120 may directly transmit and receive data to and from the processing unit 160. That is, the L0 memory 120 may exchange data with each of the PE array 163 and the vector unit 164. The L0 memory 120 may be a memory corresponding to the neural core level. The L0 memory 120 may be a private memory of the neural core.

The L0 memory 120 may transmit data such as activation or weight through a data path. The L0 memory 120 may transmit and receive synchronization signals through an L0 sync path which is a separate private path. For example, the L0 memory 120 may exchange the synchronization signals with the LSU 110, the weight buffer 130, the activation LSU 140, and the processing unit 160, through the L0 sync path.

The weight buffer 130 may receive weight from the L0 memory 120. The weight buffer 130 may transmit the weight to the processing unit 160. The weight buffer 130 may temporarily store the weight before transmitting the same.

The input activation (Act_In) and the output activation (Act_Out) may refer to input and output values of the layers of the neural network. If the neural network has a plurality of layers, the output value of the previous layer becomes the input value of the next layer, and therefore, the output activation (Act_Out) of the previous layer may be used as the input activation (Act_In) of the next layer.

The weight may refer to a parameter multiplied by the input activation (Act_In) which is input from each layer. The weight is adjusted and confirmed in the deep learning stage, and may be used to derive the output activation (Act_Out) through a fixed value in the inference stage.

The activation LSU 140 may transmit the input activation (Act_In) from the L0 memory 120 to the activation buffer 150 and transmit the output activation (Act_Out) from the activation buffer 150 to the on-chip buffer. That is, the activation LSU 140 may perform both load and store works of the activation.

The activation buffer 150 may provide the input activation (Act_In) to the processing unit 160 and receive the output activation (Act_Out) from the processing unit 160. The activation buffer 150 may temporarily store the input activation (Act_In) and the output activation (Act_Out).

The activation buffer 150 may quickly provide the activation to the processing unit 160 with a large computation load, and quickly receive the activation so as to increase the computing speed of the neural core 100.

The processing unit 160 may be a module that performs computations. The processing unit 160 may perform not only one-dimensional computations but also two-dimensional matrix computations, that is, convolution computations. The processing unit 160 may receive the input activation (Act_In), multiply it by the weight, and add the result to generate the output activation (Act_Out).

Figure 10:
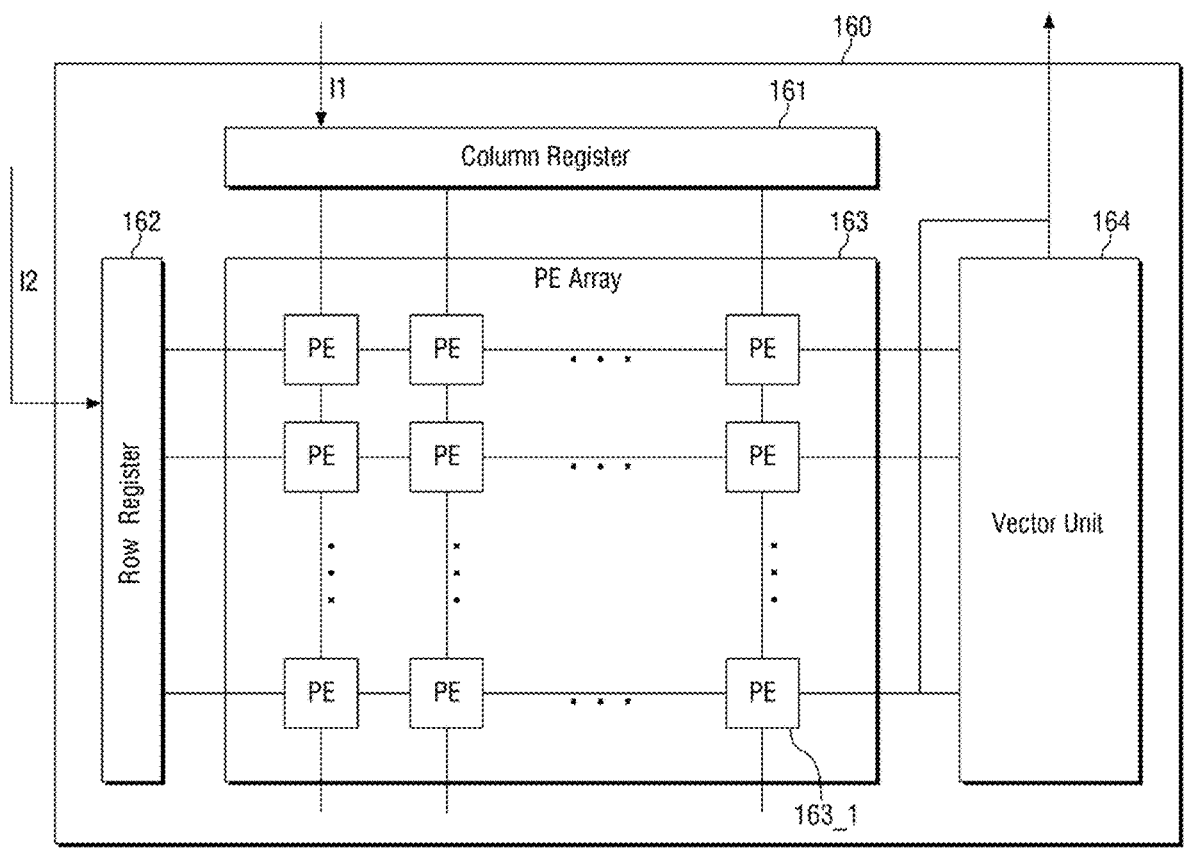
FIG. 10 is a block diagram provided to explain the processing unit of FIG. 8 in detail.

FIG. 10 is a block diagram provided to explain the processing unit of FIG. 8 in detail.

Referring to FIGS. 8 and 10, the processing unit 160 may include the PE array 163, the vector unit 164, a column register 161, and a row register 162.

The PE array 163 may receive the input activation (Act_In) and the weight (Weight) and perform multiplication. The input activation (Act_In) and the weight (Weight) may each be computed through convolution in matrix form. Through this, the PE array 163 may generate the output activation (Act_Out). However, aspects are not limited to the above. The PE array 163 may generate any type of output other than the output activation (Act_Out).

The PE array 163 may include at least one or more processing elements 163_1. The processing elements 163_1 may be aligned with one another and perform multiplication of one input activation (Act_In) and one weight (Weight), respectively.

The PE array 163 may generate a subtotal of the resultant values of each multiplication. The partial sum may be used as the output activation (Act_Out). The PE array 163 may also be called a two-dimensional matrix computing unit as it performs two-dimensional matrix multiplication.

The vector unit 164 may perform one-dimensional computation. The vector unit 164 may perform deep learning computation with the PE array 163. Through this, the processing unit 160 may be specialized for necessary computations. That is, the neural core 100 may include computation modules to perform a large amount of two-dimensional matrix multiplications and one-dimensional computations, and thus be able to perform the deep learning computation efficiently.

The column register 161 may receive a first input (I1). The column register 161 may receive the first input (I1), divide it, and provide the result to each column of the PE array 163.

The row register 162 may receive a second input (I2). The row register 162 may receive the second input (I2), divide the same, and provide the result to each row of the PE array 163.

A first input (I1) may be the input activation (Act_In) or the weight (Weight). The second input (I2) may be either the input activation (Act_In) or the weight (Weight), which is not the first input (I1). Alternatively, the first input (I1) and the second input (I2) may be values other than the input activation (Act_In) and the weight (Weight).

Figure 11:
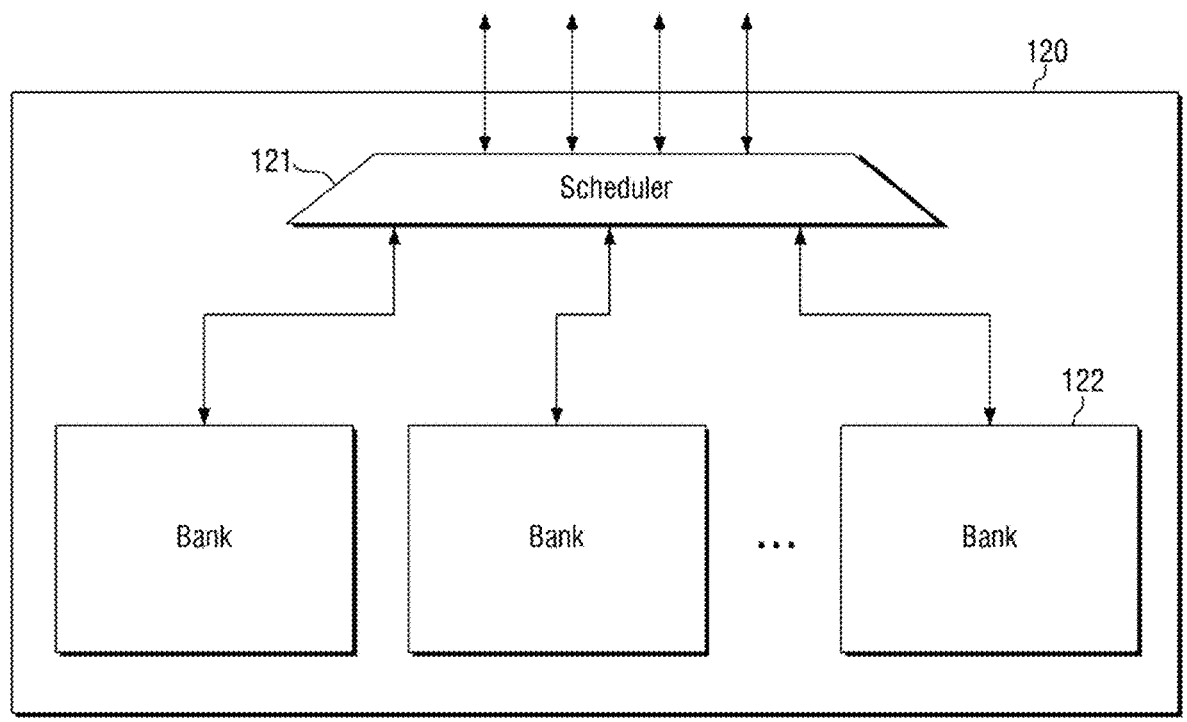
FIG. 11 is a block diagram provided to explain the L0 memory of FIG. 8 in detail.

FIG. 11 is a block diagram provided to explain the L0 memory of FIG. 8 in detail.

Referring to FIG. 11, the L0 memory 120 may include a scheduler 121 and at least one local memory bank 122.

When data is stored in the L0 memory 120, the scheduler 121 may receive the data from the load engine 113a. The data may be allocated to the local memory bank 122 in a round robin manner. Accordingly, the data may be stored in any one of at least one local memory bank 122.

Conversely, when the data is loaded from the L0 memory 120, the scheduler 121 may receive the data from the local memory bank 122 and transmit the same to the store engine 113b. The store engine 113b may store the data to the outside through the local interconnection 200.

Figure 12:
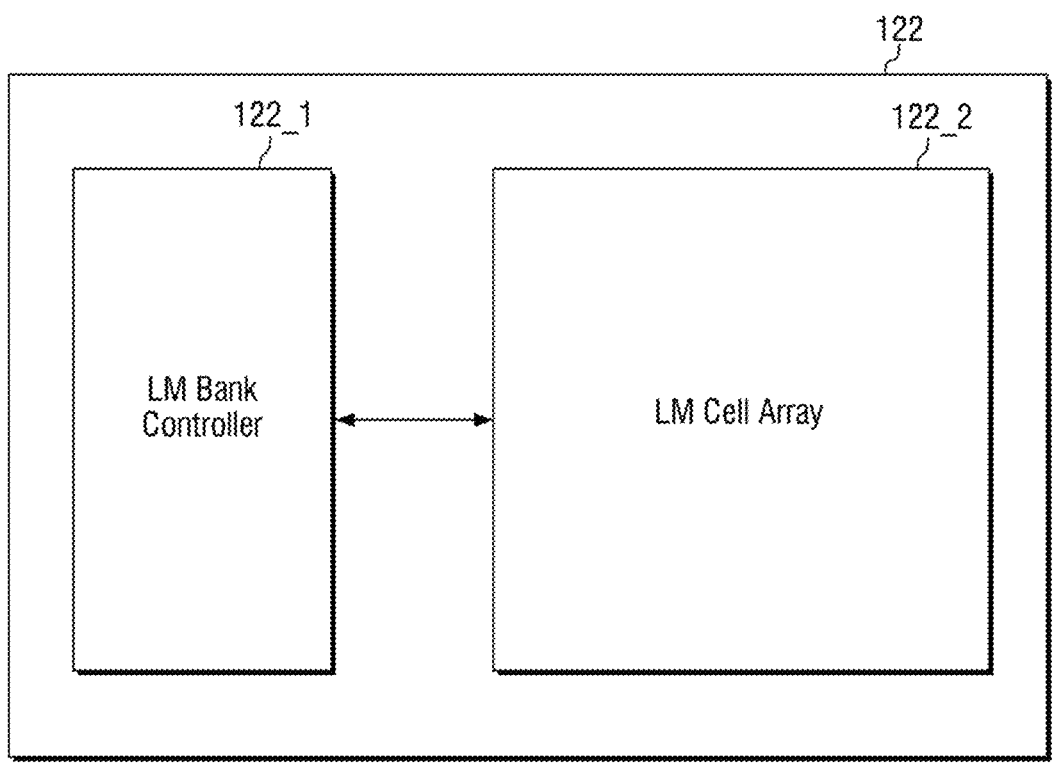
FIG. 12 is a block diagram provided to explain the local memory bank of FIG. 11 in detail.

FIG. 12 is a block diagram provided to explain the local memory bank of FIG. 11 in detail.

Referring to FIG. 12, the local memory bank 122 may include a local memory bank controller 122_1 and a local memory bank cell array 122_2.

The local memory bank controller 122_1 may manage read and write operations through address of data stored in the local memory bank 122. That is, the local memory bank controller 122_1 may manage the overall data input and output.

The local memory bank cell array 122_2 may have a structure in which cells directly stored with data are aligned in rows and columns. The local memory bank cell array 122_2 may be controlled by the local memory bank controller 122_1.

Figure 13:
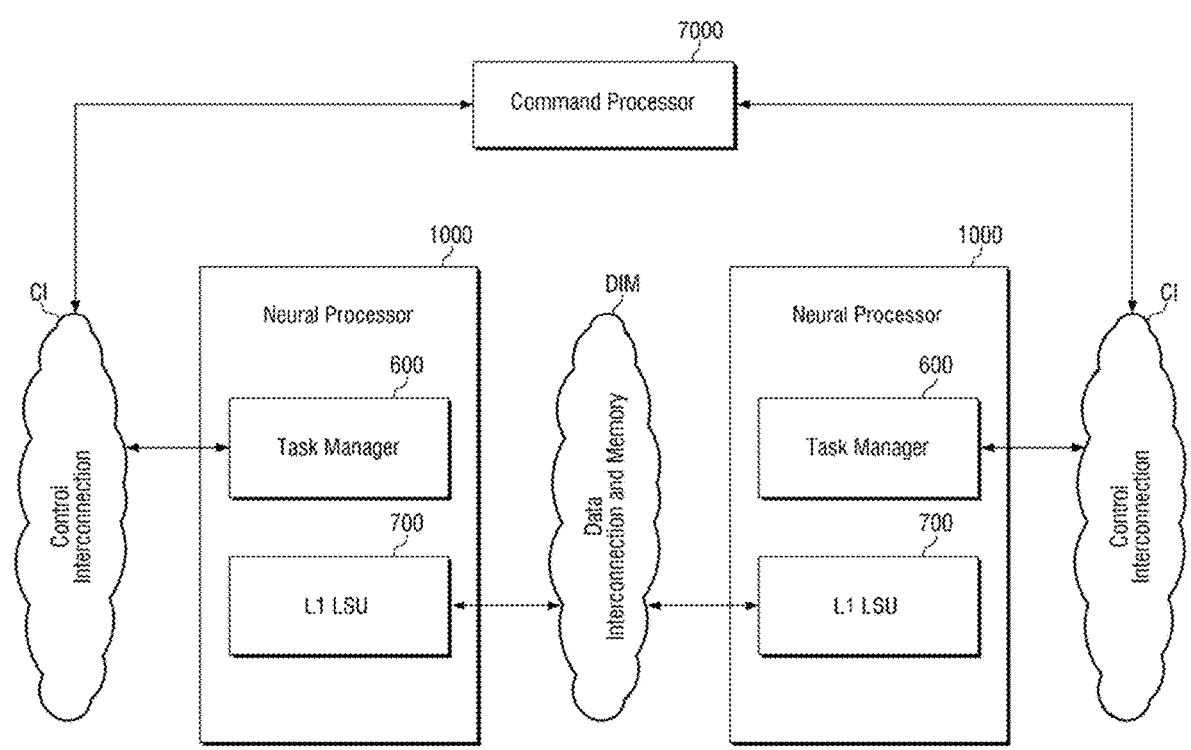
FIG. 13 is a block diagram provided to explain the flow of data and control signals of the neural processing device of FIG. 1.
Figure 14:
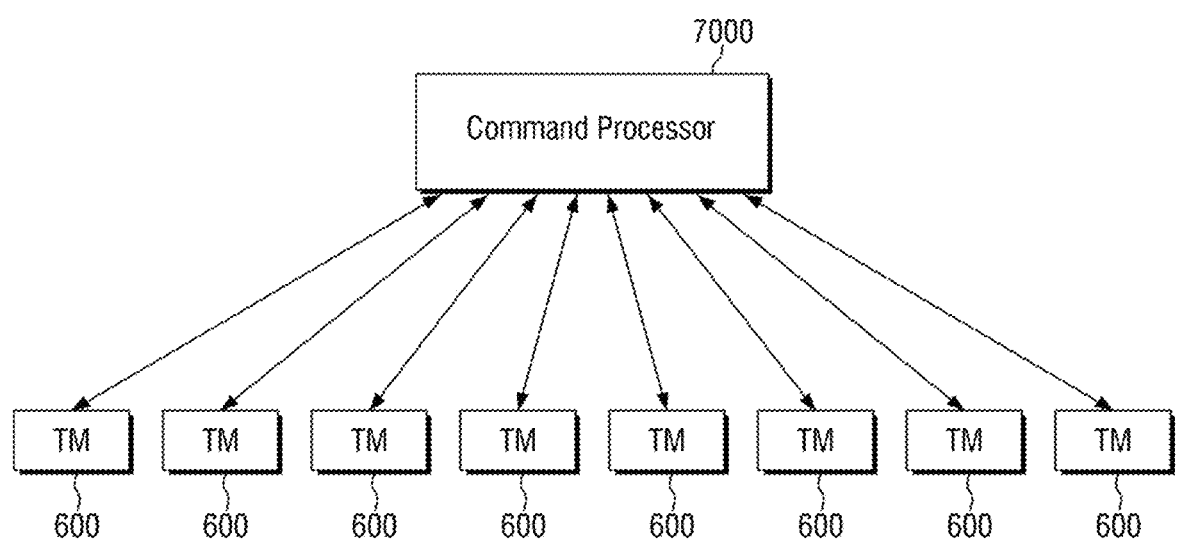
FIG. 14 is a block diagram provided to explain the relations between the command processor and the task manager of FIG. 13.

FIG. 13 is a block diagram provided to explain the flow of data and control signals of the neural processing device of FIG. 1, and FIG. 14 is a block diagram provided to explain the relations between the command processor and the task manager of FIG. 13.

Referring to FIGS. 13 and 14, the neural processor 1000 may include at least one neural core 100. Each neural processor 1000 may include the task manager 600 and the L1 LSU 700 therein, respectively. The task managers 600 may exchange control signals and responses with the command processor 7000 through the control interconnection (CI).

Conversely, the L1 LSU 700 may exchange data through the data interconnection and the memory (DIM). The data interconnection and the memory (DIM) may include an interconnection for transmitting data, and a memory for sharing the data. Specifically, the data interconnection and the memory (DIM) may include the local interconnection 200 and the data channel 6100. Further, the data interconnection and the memory (DIM) may include the L1 shared memory 400, the shared memory 2000, and the volatile memory 32. However, aspects are not limited to the above.

The task manager 600 may be controlled by the command processor 7000. That is, the command processor 7000 may transmit a task to the task manager 600 through the control signals, and the task manager 600 may transmit a task completion report to the command processor 7000. The neural processor 1000 may include at least one task manager 600. Further, if there are a plurality of neural processors 1000, the number of task managers 600 may increase. All of the plurality of task managers 600 may be controlled by the command processor 7000.

Figure 15:
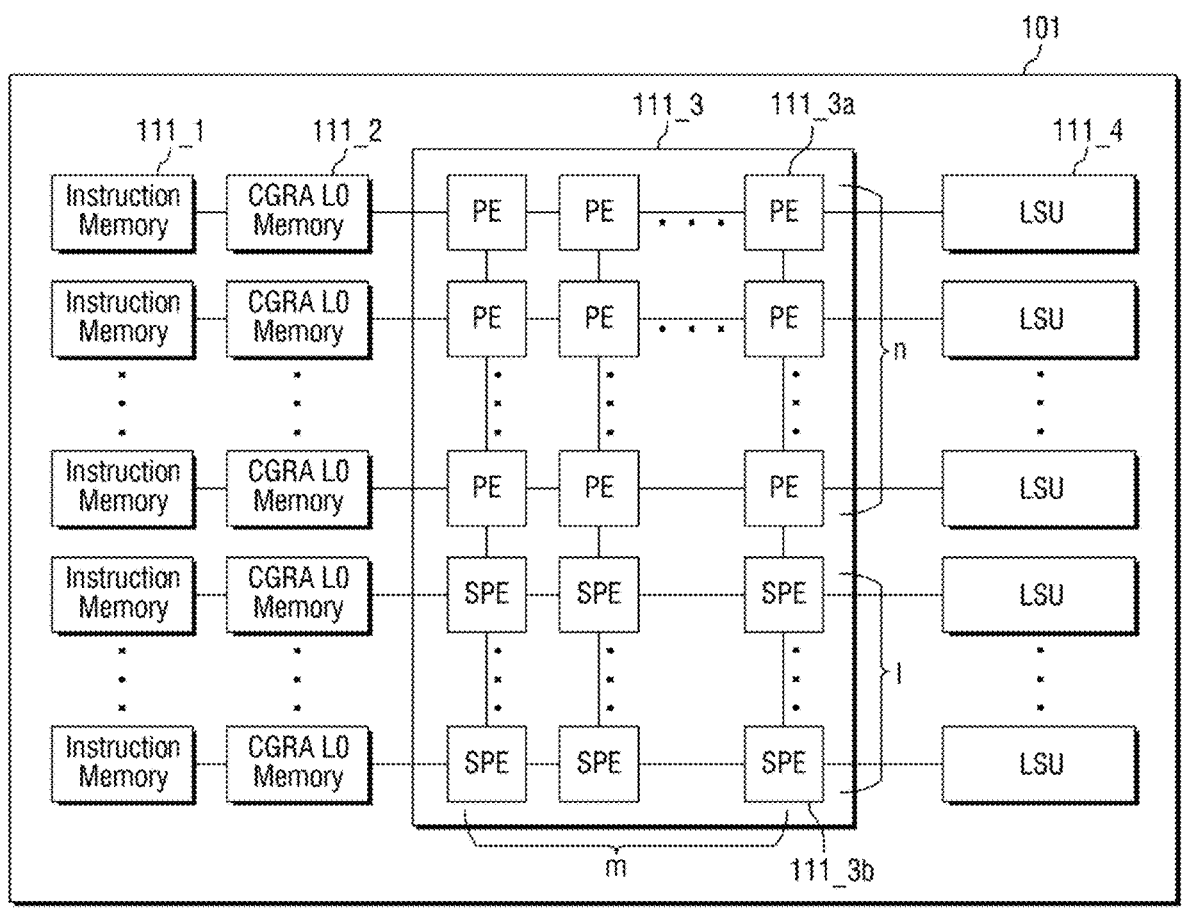
FIG. 15 is a block diagram provided to explain the structure of the neural processing device of FIG. 1 in detail.

FIG. 15 is a block diagram provided to explain in detail the structure of the neural processing device according to some examples of the disclosure.

Referring to FIG. 15, unlike the neural core 100, a neural core 101 may have a CGRA structure. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 111_1 may sequentially store the instructions therein and provide the stored instructions to the PE array 111_3. The instruction may instruct the operation of a processing element 111_3a included in each PE array 111_3.

The CGRA L0 memory 111_2 may be a memory located within the neural core 101, and the neural core 101 may receive all of input data required for the work from the outside and temporarily store the same in the CGRA L0 memory 111_2. In addition, the CGRA L0 memory 111_2 may temporarily store the output data computed by the neural core 101 so as to transmit the same to the outside. The CGRA L0 memory 111_2 may play a role of a cache memory of the neural core 101.

The CGRA L0 memory 111_2 may transmit and receive data to and from the PE array 111_3. The CGRA L0 memory 111_2 may be a memory corresponding to level 0 (L0) lower than L1. The L0 memory may be a private memory of the neural core 101 which is not shared. The CGRA L0 memory 111_2 may transmit data and programs such as activation or weight to the PE array 111_3.

The PE array 111_3 may be a module that performs computations. The PE array 111_3 may perform not only the one-dimensional computations but also the two-, or higher-dimensional matrix/tensor computations. The PE array 111_3 may include a plurality of processing elements 111_3a and specific processing elements 111_3b therein.

The processing elements 111_3a and the specific processing elements 111_3b may be aligned in rows and columns. The processing elements 111_3a and the specific processing elements 111_3b may be aligned in m columns. In addition, the processing elements 111_3a may be aligned in n rows, and the specific processing elements 111_3b may be aligned in 1 rows. Accordingly, the processing elements 111_3a and the specific processing elements 111_3b may be aligned in (n+1) rows and m columns.

The LSU 111_4 may receive at least one of data, control signals, and synchronization signals from the outside through the local interconnection 200. The LSU 111_4 may transmit at least one of the data, the control signals, and the synchronization signals received by the CGRA L0 memory 111_2. Similarly, the LSU 111_4 may transmit at least one of the data, the control signals, and the synchronization signals to the outside through the local interconnection 200.

The neural core 101 may have a Coarse Grained Reconfigurable Architecture (CGRA) structure. Accordingly, for the neural core 101, each of the processing elements 111_3a and the specific processing elements 111_3b of the PE array 111_3 may be connected to at least one of the CGRA L0 memory 111_2, the instruction memory 111_1, and the LSU 111_4, respectively. That is, the processing elements 111_3a and the specific processing elements 111_3b may not necessarily be connected to all of CGRA L0 memories 111_2, the instruction memories 111_1, and the LSUs 111_4, but may be connected to some of them.

In addition, the processing elements 111_3a and the specific processing elements 111_3b may be different types of processing elements. Accordingly, among the CGRA L0 memory 111_2, the instruction memory 111_1, and the LSU 111_4, the element connected to the processing element 111_3a may be different from the element connected to the specific processing element 111_3b.

The neural core 101 with the CGRA structure is capable of high-level parallel computations and direct data exchanges between the processing elements 111_3a and the specific processing elements 111_3b, thus greatly saving power consumption. In addition, inclusion of two or more types of processing elements 111_3a also enable optimization according to various computational works.

For example, if the processing element 111_3a is a processing element that performs two-dimensional computation, the specific processing element 111_3b may be a processing element that performs one-dimensional computation. However, aspects are not limited to the above.

Figure 16:
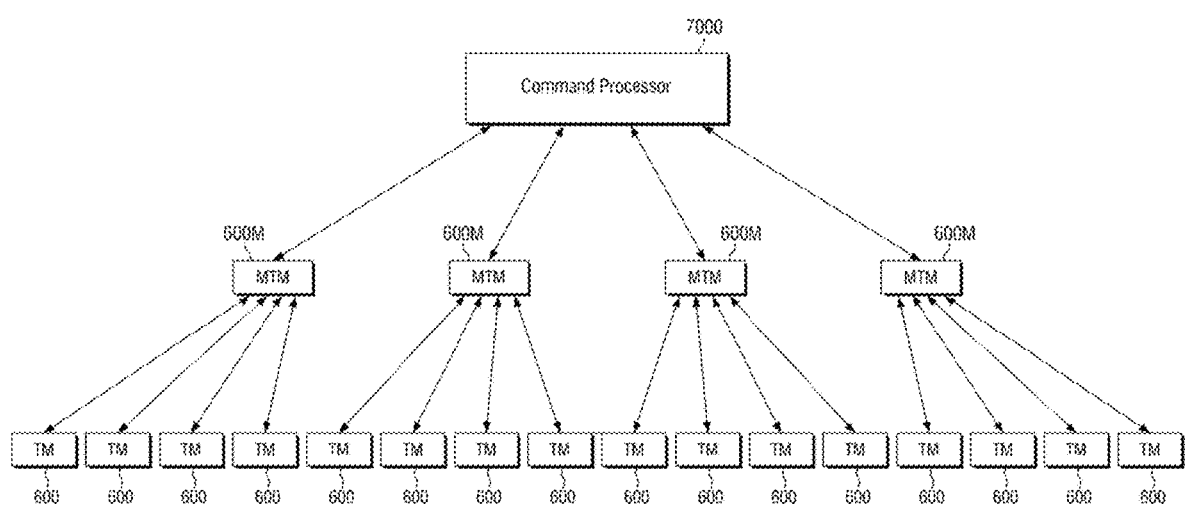
FIG. 16 is a diagram provided to explain the hierarchical structure of the command processor and the task managers of the neural processing device according to some examples of the present disclosure.
Figure 17:
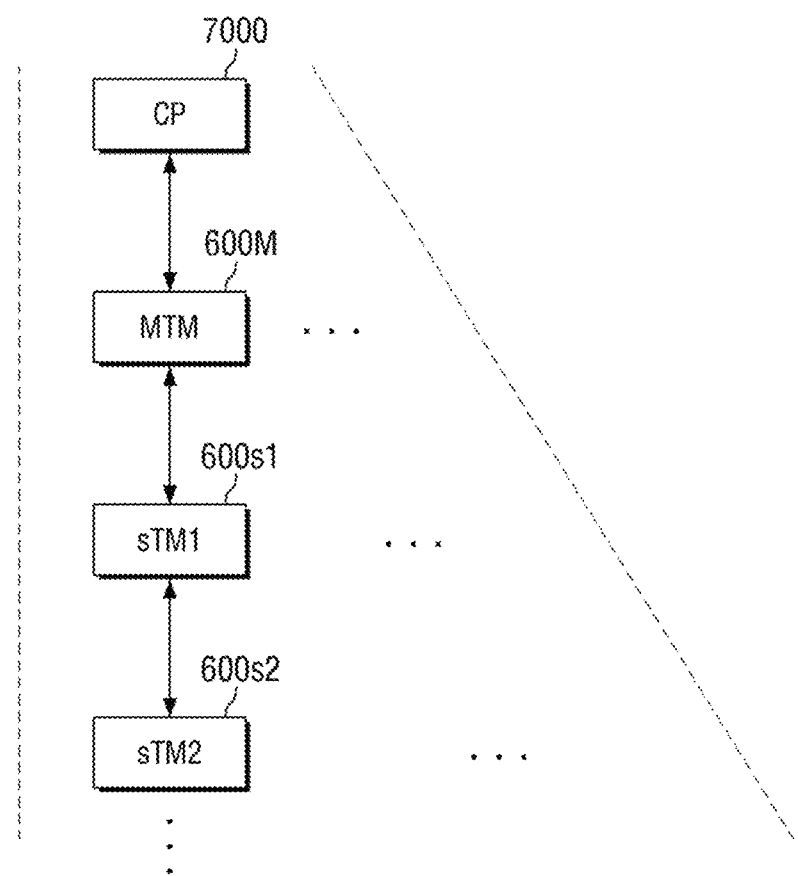
FIG. 17 is a diagram provided to explain the hierarchical structure of the command processor and the task managers of the neural processing device according to some examples of the present disclosure.

FIG. 16 is a diagram provided to explain the hierarchical structure of the command processor and the task managers of the neural processing device according to some examples of the disclosure. FIG. 17 is a diagram provided to explain the hierarchical structure of the command processor and the task managers of the neural processing device according to some examples of the disclosure.

Referring to FIGS. 16 and 17, as the number of task managers 600 increases, it may be more difficult for the command processor 7000 to manage all of the task managers 600. Accordingly, the neural processing device 1 according to some examples may have hierarchical structure in which a master task manager 600M manages a plurality of task managers 600, and the command processor 7000 manages the master task manager 600M.

In addition, referring to FIG. 17, levels below the master task manager 600M may also be subdivided in various ways. For example, a first sub-task manager 600s1 and a second sub-task manager 600s2 may form respective classes. That is, one first sub-task manager 600s1 may manage at least one second sub-task manager 600s2, and one master task manager 600M may manage at least one first sub-task manager 600s1. Further, several classes may be added below the second sub-task manager 600s2.

That is, although three levels of the task manager 600, the master task manager 600M, and the command processor 7000 are illustrated in FIGS. 16 and 17, the number of levels may be four or more. That is, depth of the hierarchical structure may vary depending on the number of task managers 600.

Figure 18:
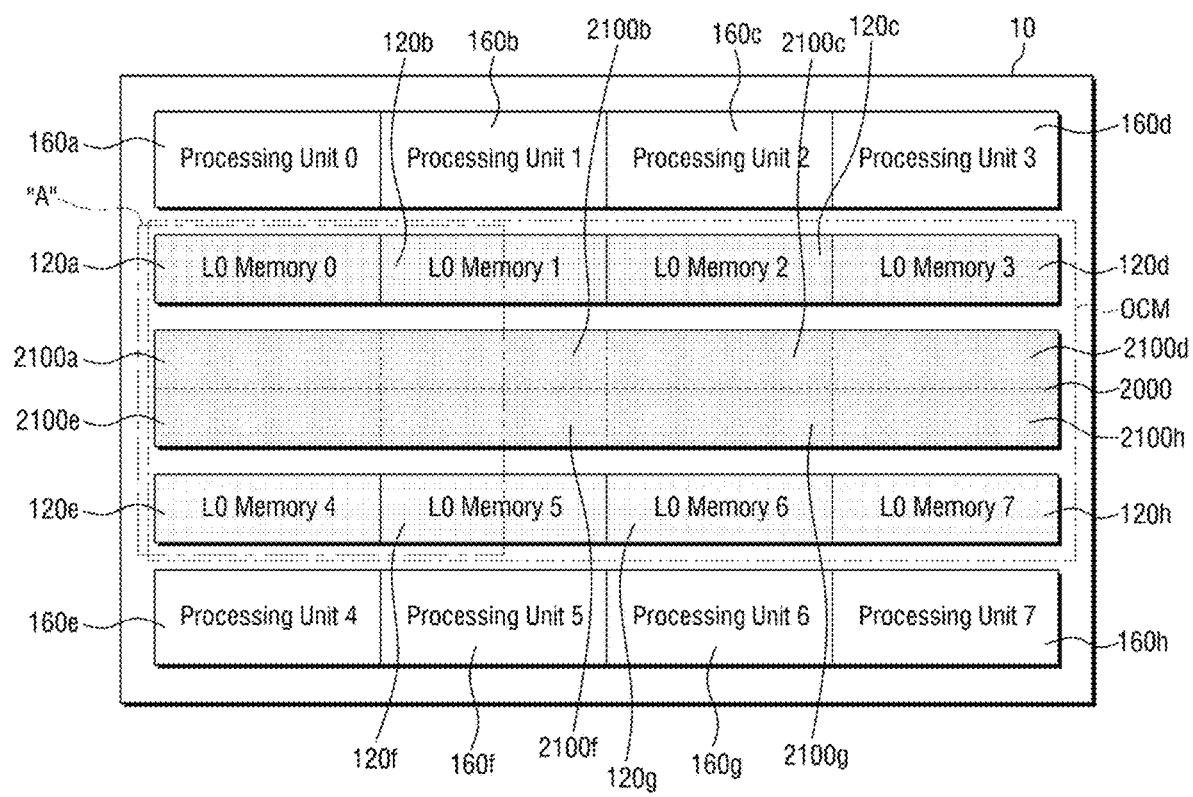
FIG. 18 is a block diagram provided to explain memory reorganization of the neural processing system of FIG. 1.

FIG. 18 is a block diagram provided to explain memory reorganization of the neural processing system according to some examples of the present disclosure.

Referring to FIG. 18, the neural core SoC 10 may include first to eighth processing units 160a to 160h and an on-chip memory (OCM). Although eight processing units are illustrated as an example, this is only an example and the number of processing units may vary.

The on-chip memory (OCM) may include first to eighth L0 memories 120a to 120h and the shared memory 2000.

The first to eighth L0 memories 120a to 120h may be used as private memories for the first to eighth processing units 160a to 160h, respectively. That is, the first to eighth processing units 160a to 160h and the first to eighth L0 memories 120a to 120h may correspond to each other on a 1:1 basis.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be 8, which is same as the number of processing units and L0 memories.

The shared memory 2000 may operate in any one of two formats of the on-chip memory. That is, the shared memory 2000 may operate in any one of the L0 memory format or the global memory format. The shared memory 2000 may implement two logical memories with one hardware.

If the shared memory 2000 is implemented in the L0 memory format, the shared memory 2000 may operate as a private memory for each of the first to eighth processing units 160a to 160h, such as the first to eighth L0 memories 120a to 120h. The L0 memory may operate at a relatively higher clock speed compared to the global memory, and the shared memory 2000 may also use a relatively faster clock when operating in the L0 memory format.

If the shared memory 2000 is implemented in the global memory format, the shared memory 2000 may operate as a common memory used by both a first processing unit 100a and a second processing unit 100b. The shared memory 2000 may be shared not only by the first to eighth processing units 160a to 160h, but also by the first to eighth L0 memories 120a to 120h.

The global memory may generally use a lower clock than the L0 memory, but aspects are not limited thereto. If the shared memory 2000 operates in the global memory format, the first to eighth processing units 160a to 160h may share the shared memory 2000. In this case, the shared memory 2000 may be connected to the volatile memory 32 of FIG. 2 through the global interconnection 6000, and may operate as a buffer of the volatile memory 32.

At least part of the shared memory 2000 may operate in the L0 memory format, and the remainder of the shared memory may operate in the global memory format. That is, the entire shared memory 2000 may operate in the L0 memory format, or the entire shared memory 2000 may operate in the global memory format. Alternatively, part of the shared memory 2000 may operate in the L0 memory format, and the other of the shared memory may operate in the global memory format.

Figure 19:
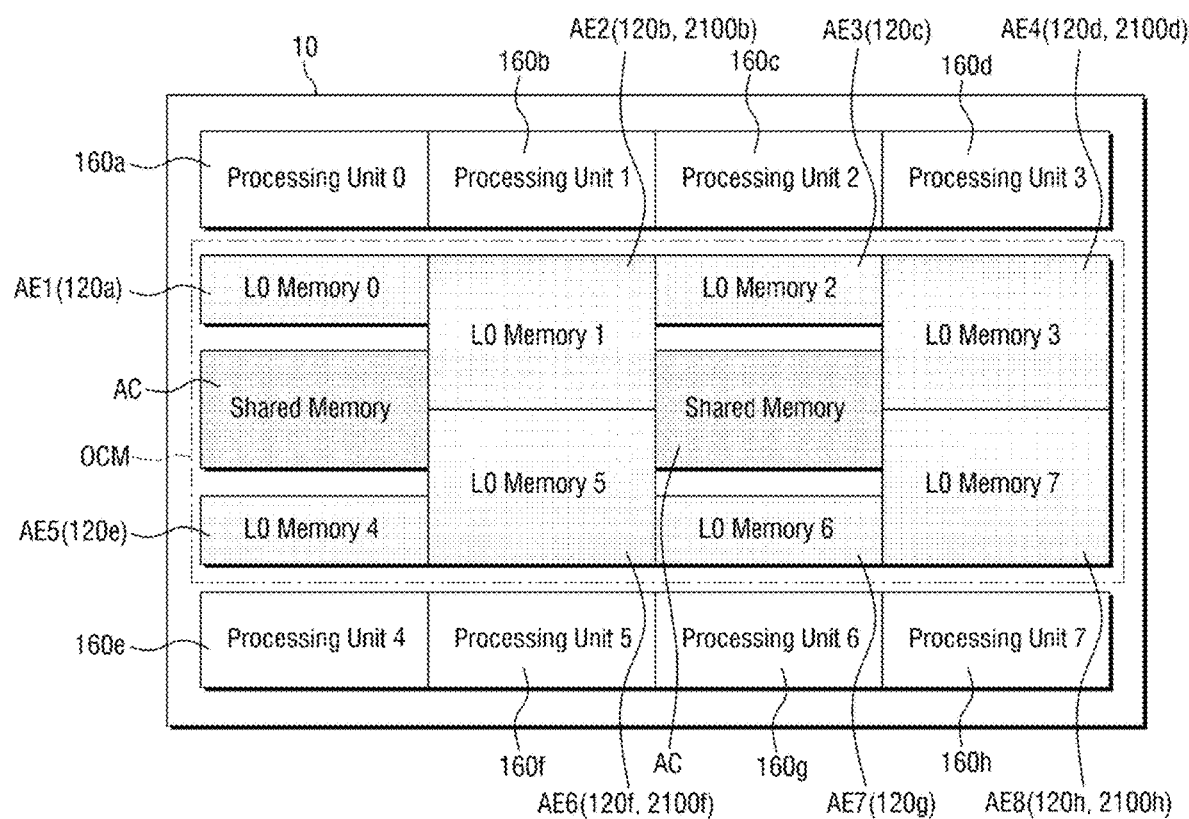
FIG. 19 is a block diagram illustrating an example of memory reorganization of the neural processing system of FIG. 1.

FIG. 19 is a block diagram provided to explain an example of memory reorganization of the neural processing system according to some examples of the present disclosure.

Referring to FIGS. 18 and 19, first, third, fifth, and seventh private areas AE1, AE3, AE5, and AE7 of each of the first, third, fifth, and seventh processing units 100a, 100c, 100e, and 100g may include only the first, third, fifth, and seventh L0 memories 120a, 120c, 120e, and 120g. In addition, second, fourth, sixth, and eighth private areas AE2, AE4, AE6, and AE8 of each of the second, fourth, sixth, and eighth processing units 100b, 100d, 100f, and 100h may include the second, fourth, sixth, and eighth L0 memories 120b, 120d, 120f, and 120h. In addition, the second, fourth, sixth, and eighth private areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area (AC).

The common area (AC) may be a memory shared by the first to eighth processing units 160a to 160h. The second private area (AE2) may include the second L0 memory 120b and the second memory unit 2100b. The second private area (AE2) may be an area where the hardware-separated second L0 memory 120b and second memory unit 2100b operate in the same manner so as to logically operate as one L0 memory. Further, the fourth, sixth, and eighth private areas AE4, AE6, and AE8 may operate in the same manner as the second private area (AE2).

The shared memory 2000 may be configured such that the areas corresponding to each neural core may be converted into an optimized ratio of logical L0 memories and logical global memories. The shared memory 2000 may perform adjustment of such ratio at run time.

That is, each neural core may perform the same works, or may perform different works. Accordingly, the capacity of the L0 memories and the capacity of the global memories required for the work performed by each neural core are different each time. Accordingly, if the ratio of the L0 memories and the shared memories is fixed as in the case of the related on-chip memory, inefficiency may occur due to the computational works assigned to each neural core.

Accordingly, the shared memory 2000 of the neural processing device can improve efficiency and speed of computation by setting an optimal ratio of the L0 memories and the global memories depending on the computational work at run time.

Figure 20:
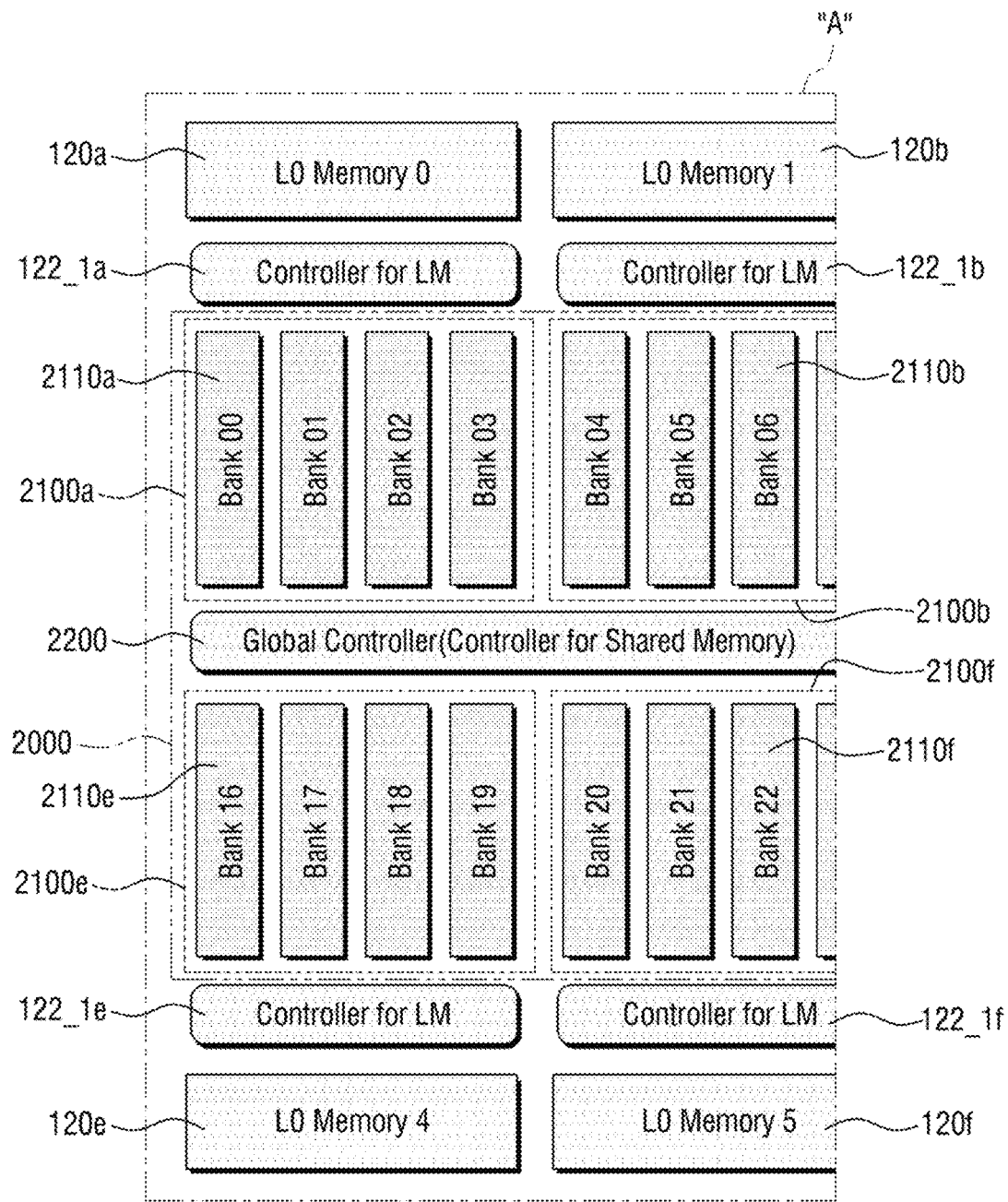
FIG. 20 is an enlarged block diagram of the area A in FIG. 18.

FIG. 20 is an enlarged block diagram of the area A in FIG. 18.

Referring to FIGS. 18 and 20, the shared memory 2000 may include a first L0 memory controller 122_1a, a second L0 memory controller 122_1b, a fifth L0 memory controller 122_1e, a sixth L0 memory controller 122_1f, first to eighth memory units 2100a to 2100h, and a global controller 2200. Although not illustrated, the other L0 memory controllers may also be included, but they will not be described herein for convenience of description.

The first L0 memory controller 122_1a may control the first L0 memory 120a. In addition, the first L0 memory controller 122_1a may control the first memory unit 2100a. Specifically, if the first memory unit 2100a is implemented in a logical L0 memory format, control by the first L0 memory controller 122_1a may be performed over the first memory unit 2100a.

The second L0 memory controller 122_1b may control the second L0 memory 120b. Further, the second L0 memory controller 122_1b may control the second memory unit 2100b. That is, if the second memory unit 2100b is implemented in the logical L0 memory format, control by the first L0 memory controller 122_1a may be performed over the second memory unit 2100b.

The fifth L0 memory controller 122_1e may control the fifth L0 memory 120e. Further, the fifth L0 memory controller 122_1e may control the fifth memory unit 2100e. That is, if the fifth memory unit 2100e is implemented in the logical L0 memory format, control by the fifth L0 memory controller 122_1e may be performed over the fifth memory unit 2100e.

The sixth L0 memory controller 122_1f may control the sixth L0 memory 120f. Further, the sixth L0 memory controller 122_1f may control the sixth memory unit 2100f. That is, if the sixth memory unit 2100f is implemented in the logical L0 memory format, control by the sixth L0 memory controller 122_1f may be performed over the sixth memory unit 2100f.

The global controller 2200 may control all of the first to eighth memory units 2100a to 2100h. Specifically, if each of the first to eighth memory units 2100a to 2100h logically operates in the global memory format (i.e., not logically operating in the L0 memory format), the global controller 2200 may control the first memory unit 2100a to eighth memory unit 2100h.

That is, each of the first to eighth memory units 2100a to 2100h may be controlled by the first to eighth L0 memory controllers 122_1a to 122_1h, or by the global controller 2200, depending on which of the memory formats they are implemented logically.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 141h, which control the first to eighth memory units 2100a to 2100h in the same manner as the first to eighth L0 memories 120a to 120h, may control as the private memories of the first to eighth processing units 160a to 160h. Accordingly, the first to eighth memory units 2100a to 2100h may operate at a clock frequency corresponding to the clock frequency of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 8.

If the global controller 2200 controls at least one of the first to eighth memory units 2100a to 2100h, the global controller 2200 may control each of the first to eighth memory units 2100a to 2100h by the global memory of the first to eighth processing units 160a to 160h. Accordingly, at least one of the first to eighth memory units 2100a to 2100h may operate at a clock frequency not related to the clock frequencies of each of the first to eighth processing units 160a to 160h. However, aspects are not limited to the above.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 1 by the global controller 2200, or exchange data with each of the first to eighth L0 memories 120a to 120h.

The first to eighth memory units 2100a to 2100h may each include at least one memory bank. The first memory unit 2100a may include at least one or more first memory banks 2110a. The first memory banks 2110a may be the areas of the first memory unit 2100a divided by a specific size. The first memory banks 2110a may all be the memory elements of a same size. However, aspects are not limited to the above. In FIG. 20, it is illustrated that four memory banks are included in one memory unit.

Similarly, the second, fifth, and sixth memory units 2100b, 2100e, and 2100f may include at least one second memory bank 2110b, at least one fifth memory bank 2110e, and at least one sixth memory bank 2110f, respectively.

Hereinbelow, the first memory bank 2110a and the fifth memory bank 2110e will be mainly described, but it is to be noted that the same applies to the other memory banks including the second and sixth memory banks 2110b and 2110f.

The first memory bank 2110a may logically operate in the L0 memory format or logically operate in the global memory format. The first memory bank 2110a may operate independently of the other memory banks in the first memory unit 2100a. However, aspects are not limited to the above.

If each memory bank operates independently, the first memory unit 2100a may include a first area operating in the same manner as the first L0 memory 120a, and a second area operating in a different manner from the first L0 memory 120a. The first area and the second area may not necessarily exist in parallel, and any one area may occupy the entire area of the first memory unit 2100a.

Likewise, the second memory unit 2100b may include a third area operating in the same manner as the second L0 memory 120b, and a fourth area operating in a different manner from the second L0 memory 120b. The third area and the fourth area may not necessarily exist in parallel, and any one area may occupy the entire area of the first memory unit 2100a.

The ratio of the first area and the second area may be different from the ratio of the third area and the fourth area. However, aspects are not limited to the above. Accordingly, the ratio of the first area and the second area may be same as the ratio of the third area and the fourth area. That is, the ratio of the memories configured in each memory unit may vary as desired.

In the related system-on-chip, high-density, low-power SRAM is used for configuring the on-chip memories excluding high-speed L0 memory. This is because SRAM has high efficiency in terms of chip size and power consumption compared to the required capacity. However, inefficiency occurs, because the processing speed of the related on-chip memory will considerably slow down if it is necessary to use the data that exceeds the predetermined capacity of the L0 memory quickly, and besides, there is no way to utilize the remaining global memory even when the need for the global memory is not so large.

Conversely, the shared memory 2000 according to some examples may be selectively controlled by one of the two controllers if necessary. In this case, the shared memory 2000 may not be controlled as a whole by only one of the two controllers, but may be independently controlled on a memory unit basis or a memory bank basis.

Through this, the shared memory 2000 may obtain the optimal ratio of memories according to the computational work during run time, and may thus be able to perform faster and more efficient computational work. For the processing unit specialized for artificial intelligence, different sizes of the L0 memory and global memory may be needed on a specific application basis. Further, even for the same application, if a deep learning network is used, the sizes of the L0 memory and global memory required for each layer may vary. The shared memory 2000 may enable fast and efficient deep learning work because the memory ratio can change during run time according to changes in the computation steps of each layer.

Figure 21:
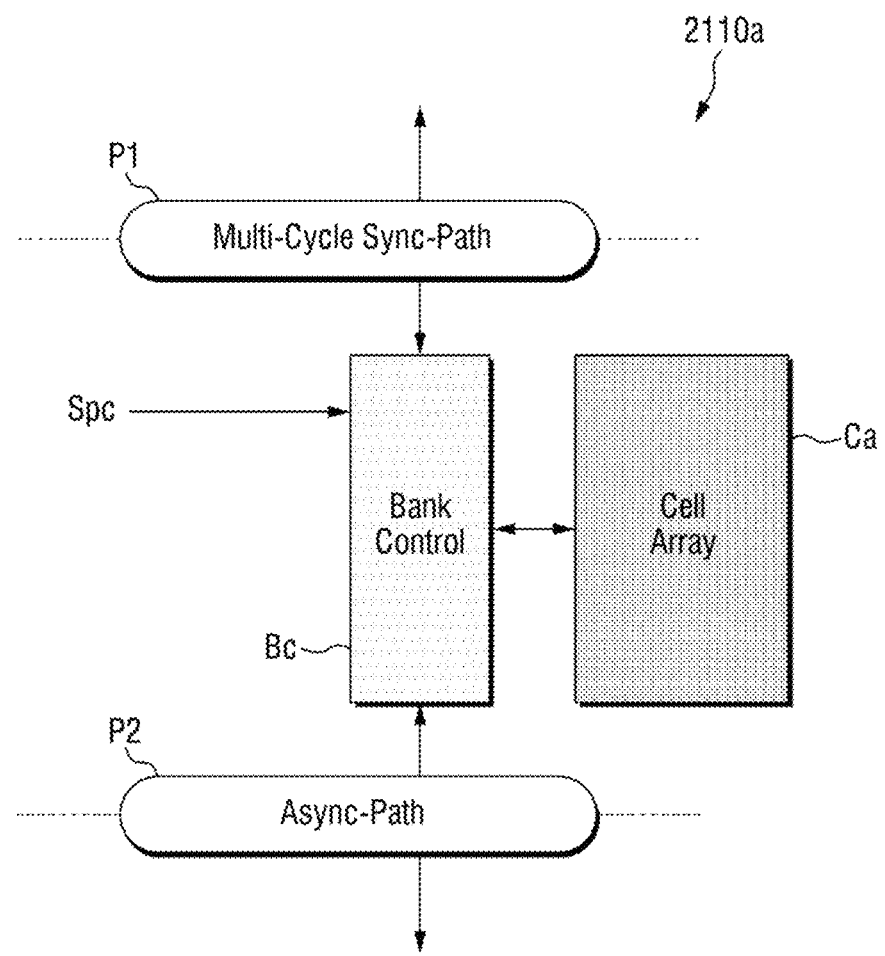
FIG. 21 is a diagram provided to explain the first memory bank of FIG. 20 in detail.

FIG. 21 is a diagram provided to explain the first memory bank of FIG. 20 in detail. Although FIG. 21 illustrates the first memory bank 2110a, the other memory banks may also have the same structure as the first memory bank 2110a.

Referring to FIG. 21, the first memory bank 2110a may include a cell array (Ca), a bank controller (Bc), a first path unit (P1), and a second path unit (P2).

The cell array (Ca) may include a plurality of memory elements (Cells) therein. For the cell array (Ca), a plurality of memory elements may be aligned and disposed in lattice structure. For example, the cell array (Ca) may be a Static Random Access Memory (SRAM) cell array.

The bank controller (Bc) may control the cell array (Ca). The bank controller (Bc) may determine whether the cell array (Ca) is to operate in the L0 memory format or the global memory format, and control the cell array (Ca) accordingly.

Specifically, the bank controller (Bc) may determine during run time whether to transmit and receive data in a direction of the first path unit (P1) or in a direction of the second path unit (P2). The bank controller (Bc) may determine a direction of transmitting and receiving data according to the path control signal (Spc).

The path control signal (Spc) may be generated by a previously designed device driver or compiler. The path control signal (Spc) may be generated according to the features of the computational work. Alternatively, the path control signal (Spc) may be generated by the input received from the user. That is, user may directly apply the input to the path control signal (Spc) in order to select the most optimal memory ratio.

The bank controller (Bc) may determine, through the path control signal (Spc), a path for transmitting and receiving the data stored in the cell array (Ca). The data exchange interface may vary according to the determination of the bank controller (Bc) regarding the path for transmitting and receiving the data. That is, the bank controller (Bc) may use a first interface for exchanging data with the first path unit (P1), and use a second interface for exchanging data with the second path unit (P2). The first interface and the second interface may be different from each other.

Further, an address system for storing the data may vary. That is, if a specific interface is selected, read and write operations may be performed by the corresponding address system.

The bank controller (Bc) may operate at a specific clock frequency. For example, if the cell array (Ca) is an SRAM cell array, the bank controller (Bc) may operate at a general SRAM operating clock frequency.

The first path unit (P1) may be connected to the bank controller (Bc). The first path unit (P1) may directly exchange data of the cell array (Ca) with the first processing unit 100a. By "direct" exchange, it may mean exchange without intervention of the global interconnection 6000. That is, the first processing unit 100a may directly exchange data with the first L0 memory 120a, and the first processing unit 100a may exchange data through the first path unit (P1) when the shared memory 2000 is logically implemented in the L0 memory format. The first path unit (P1) may include the L0 memory controllers including the first L0 memory controller 122_1a and the second L0 memory controller 122_1b of FIG. 20.

The first path unit (P1) may configure a multi-cycle sync path. That is, the operating clock frequency of the first path unit (P1) may be the same as the operating clock frequency of the first processing unit 100a. The first L0 memory 120a may quickly exchange data at the same clock frequency as the operating clock frequency of the first processing unit 100a so as to quickly exchange data with the same speed as that of the operation of the first processing unit 100a. The first path unit (P1) may also operate at the same clock frequency as the operating clock frequency of the first processing unit 100a.

The operating clock frequency of the first path unit (P1) may be a multiple of the operating clock frequency of the bank controller (Bc). In this case, clock domain crossing (CDC) work for clock synchronization between the bank controller (Bc) and the first path unit (P1) is not required, and accordingly, a delay in data transmission may not occur. Accordingly, faster and more efficient data exchange is possible.

In FIG. 21, for example, the operating clock frequency of the first path unit (P1) may be 1.5 GHZ. This may be two times the frequency of 750 MHz of the bank controller (Bc). However, aspects are not limited to the above, and other examples are possible as long as the first path unit (P1) operates at an integer multiple of the clock frequency of the bank controller (Bc).

The second path unit (P2) may be connected to the bank controller (Bc). The second path unit (P2) may exchange data of the cell array (Ca) through the global interconnection 6000 instead of directly exchanging the data with the first processing unit 100a. That is, the first processing unit 100a may exchange the data with the cell array (Ca) through the global interconnection 6000 and the second path unit (P2).

The cell array (Ca) may exchange the data with not only the first processing unit 100a but also the other neural cores.

That is, the second path unit (P2) may be a data exchange path between the cell array (Ca) and all of the neural cores, if the first memory bank 2110a is logically implemented in the global memory format. The second path unit (P2) may include the global controller 2200 of FIG. 19.

The second path unit (P2) may configure async-path. The operating clock frequency of the second path unit (P2) may be the same as that of the global interconnection 6000. The second path unit (P2) may also operate at the same clock frequency as the operating clock frequency of the global interconnection 6000.

The operating clock frequency of the second path unit (P2) may not be synchronized with the operating clock frequency of the bank controller (Bc). In this case, a clock domain crossing (CDC) work may be required to synchronize the clocks between the bank controller (Bc) and the second path unit (P2). If the operating clock frequency of the bank controller (Bc) and the operating clock frequency of the second path unit (P2) are not synchronized with each other, the degree of freedom in designing the clock domain may increase. Accordingly, difficulty of hardware design can be lowered and hardware operation can be derived more easily.

The bank controller (Bc) may use different address systems when exchanging data through the first path unit (P1) and when exchanging data through the second path unit (P2). That is, the bank controller (Bc) may use a first address system through the first path unit (P1) and use a second address system through the second path unit (P2). The first address system and the second address system may be different from each other.

The bank controller (Bc) may not necessarily exist for each memory bank. That is, because the bank controller (Bc) is not a part of scheduling, but plays a role of transmitting signals, it is not an essential part for each memory bank having two ports. Therefore, one bank controller (Bc) may control several memory banks. Even when the bank controller (Bc) controls the several memory banks, the several memory banks may operate independently. However, aspects are not limited to the above.

Of course, the bank controller (Bc) may exist for each memory bank. In this case, the bank controller (Bc) may individually control each memory bank.

Referring to FIGS. 20 and 21, the first memory unit 2100a may use the first address system for exchanging data through the first path unit (P1), and use the second address system for exchanging data through the second path unit (P2). Similarly, the second memory unit 2100b may use the third address system for exchanging data through the first path unit (P1), and use the second address system for exchanging data through the second path unit (P2). The first address system and the third address system may be the same as each other. However, aspects are not limited to the above.

The first address system and the third address system may be used exclusively for the first processing unit 100a and the second processing unit 100b, respectively. The second address system may be commonly applied to the first processing unit 100a and the second processing unit 100b.

In FIG. 21, for example, the second path unit (P2) may operate at an operating clock frequency of 1 GHz. This frequency may not be synchronized with 750 MHz of the operating clock frequency of the bank controller (Bc). That is, the operating clock frequency of the second path unit (P2) may be freely set and may not be dependent on the operating clock frequency of the bank controller (Bc).

In the general global memory that uses a slow SRAM (e.g., 750 MHz) with a faster global interconnection (e.g., 1 GHZ), delay inevitably occurs according to CDC work. Conversely, because it is possible that the shared memory 2000 according to some examples uses the first path unit (P1) in addition to the second path unit (P2), delay according to CDC work can be avoided.

Further, because a plurality of neural cores use a single global interconnection 6000 in the general global memory, decrease in overall processing speed easily occurs when data transmission traffics occur simultaneously. Conversely, it is possible that the shared memory 2000 according to some examples uses the first path unit (P1) in addition to the second path unit (P2), thereby providing effects of dispersing the data processing load congesting the global controller 2200.

Figure 22:
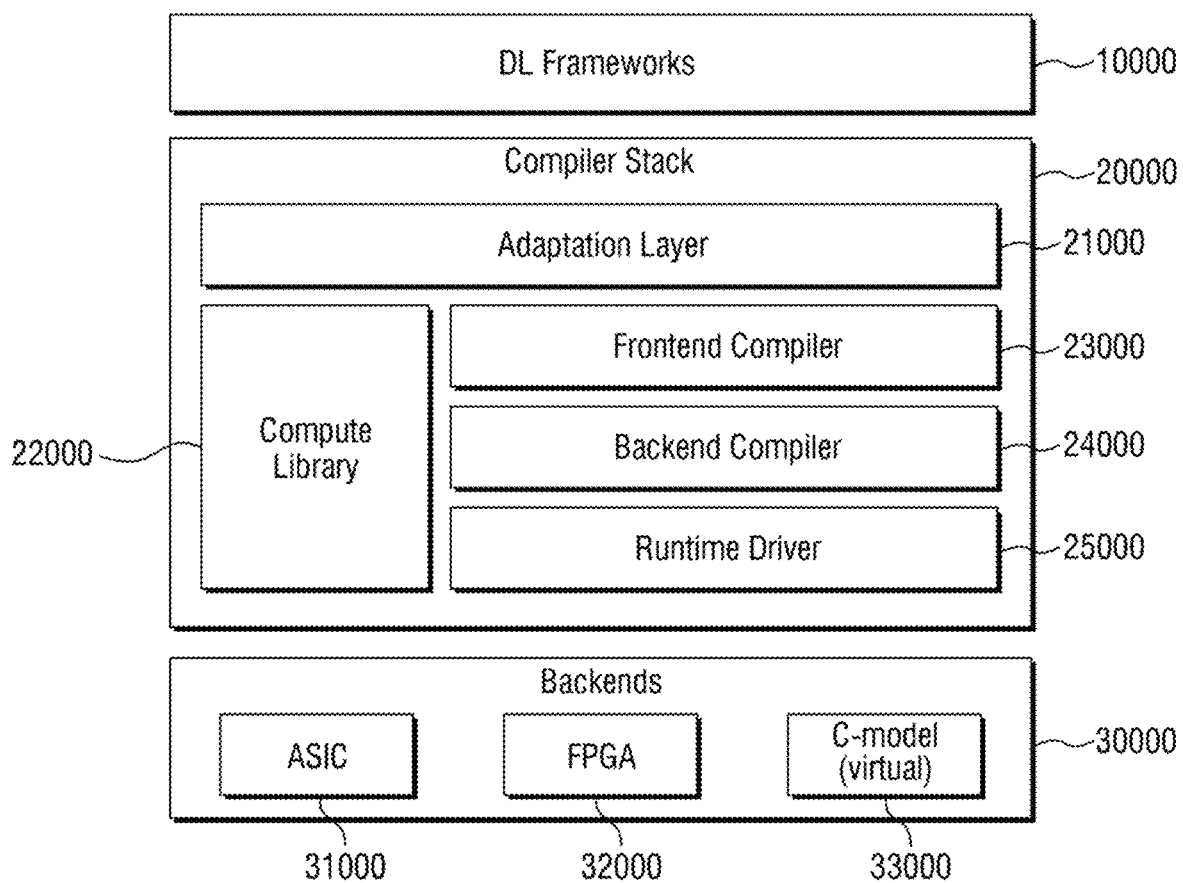
FIG. 22 is a block diagram provided to explain the software hierarchical structure of the neural processing device of FIG. 1.

FIG. 22 is a block diagram provided to explain a software hierarchical structure of the neural processing device according to some examples of the present disclosure.

Referring to FIG. 22, the software hierarchical structure of the neural processing device according to some examples may include a DL framework 10000, a compiler stack 20000, and a backend module 30000.

The DL framework 10000 may refer to a framework for a deep learning model network used by the user. For example, a fully trained neural network may be generated using programs such as TensorFlow or PyTorch.

The compiler stack 20000 may include an adaptation layer 21000, a compute library 22000, a frontend compiler 23000, a backend compiler 24000, and a runtime driver 25000.

The adaptation layer 21000 may be a layer in contact with the DL framework 10000. The adaptation layer 21000 may quantize the user's neural network model generated in the DL framework 10000 and modify the graph. In addition, the adaptation layer 21000 may convert the type of the model into a required type.

The frontend compiler 23000 may convert various neural network models and graphs received from the adaptation layer 21000 into a certain intermediate representation (IR). The converted IR may be a preset expression that is easy to handle later in the backend compiler 24000.

The IR of the frontend compiler 23000 may be optimized in advance at the graph level. In addition, the frontend compiler 23000 may generate the IR by way of conversion into a hardware-optimized layout.

The backend compiler 24000 optimizes the IR converted in the frontend compiler 23000, and converts this into a binary file for use by the runtime driver. The backend compiler 24000 may generate optimized code by dividing the job at a scale that matches the details of the hardware.

Among various operations, the compute library 22000 may store template operations designed in a form suitable for hardware. The compute library 22000 provides the backend compiler 24000 with several template operations that require hardware, thereby generating optimized code.

During operation, the runtime driver 25000 may continuously perform monitoring so as to operate the neural network device according to some examples. Specifically, it may be responsible for executing the interface of the neural network device.

The backend module 30000 may include an application specific integrated circuit (ASIC) 31000, a field programmable gate array (FPGA) 32000, and a C-model 33000. The ASIC 31000 may refer to a hardware chip determined according to a predetermined way of design. The FPGA 32000 may be a programmable hardware chip. The C-model 33000 may refer to a model implemented by simulating hardware on software.

The backend module 30000 may perform various works and derive results using binary code generated through the compiler stack 20000.

Figure 23:
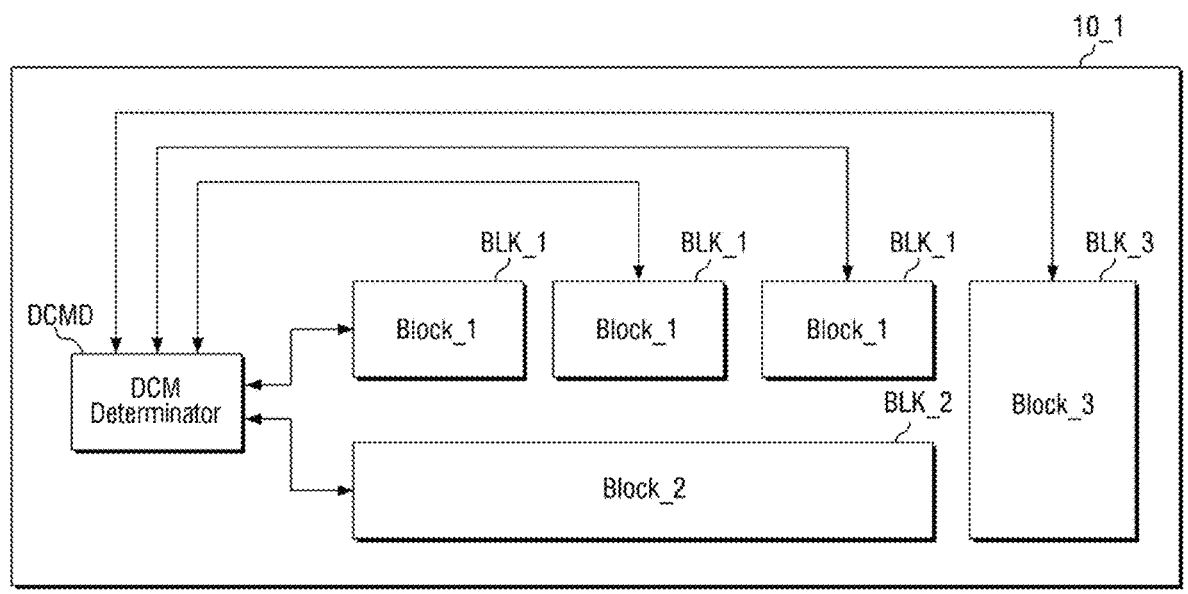
FIG. 23 is a diagram provided to explain the neural core SoC according to some examples of the present disclosure.

FIG. 23 is a diagram provided to explain a neural core SoC according to some examples of the present disclosure.

Referring to FIG. 23, a first neural core SoC 10_1 according to some examples of the present disclosure may include a first block (BLK_1), a second block (BLK_2), a third block (BLK_3), and the data communication mode determiner (DCMD). The term "block" as used herein may refer to any component that forms the neural core SoC 10. For example, the "block" may include at least one of the neural processor 1000, the command processor 7000, the shared memory 2000, the DMA 3000, the neural core 100, the L1 shared memory 400, the L0 memory 120, and the processing unit 160. However, this is only one example, and the "block" may also refer to other components within the neural core SoC (10 in FIG. 3) not mentioned above.

The data communication mode determiner (DCMD) may determine either the asynchronous data communication mode or the synchronous data communication mode for the data communication among the first block (BLK_1), the second block (BLK_2), and the third block (BLK_3). For example, the data communication mode determiner (DCMD) may receive the operating frequencies of each of the first block (BLK_1), the second block (BLK_2), and the third block (BLK_3). If the operating frequencies of the first block (BLK_1), the second block (BLK_2), and the third block (BLK_3) are different from each other or are not multiples, the data communication mode determiner (DCMD) may determine the asynchronous data communication mode for the data communication mode of the first block (BLK_1), the second block (BLK_2), and the third block (BLK_3). In addition, if the operating frequencies of the first block (BLK_1), the second block (BLK_2), and the third block (BLK_3) are the same or are multiples of each other, the data communication mode determiner (DCMD) may determine the synchronous data communication mode for the data communication mode of the first block (BLK_1), the second block (BLK_2), and the third block (BLK_3).

For example, a phase lock loops (PLL) may generate a clock from internal and external oscillators and provide the generated clock to the system control unit (SCU). The SCU may use the clock provided from the PLL to generate clocks that are multiples of each other and provide the generated clock as an operating frequency to at least one of the first block (BLK_1) to the third block (BLK_3). For example, if a clock frequency of 500 MHz is provided from the PLL, the SCU may generate clock frequencies such as 500 MHz, 1 GHZ, or 1.5 GHz that are multiples of each other and provide the generated clock frequency as the operating frequency to at least one of the first block (BLK_1) to the third block (BLK_3). Hereinafter, the PLL, SCU, etc. that provide clocks to each block will not be described in detail, but those skilled in the art will fully understand that the configuration for synchronous or asynchronous operation and corresponding communication mode, which will be described below, are also included. The synchronous data communication mode refers to a communication mode according to the clock domain with the same operating frequencies of the blocks. For example, the blocks provided with the clocks from the same clock source operate synchronously, and this may be referred to as synchronous data mode. For example, since the first block (BLK_1) of 500 MHz and the second block (BLK_2) of 1 GHz operate at the operating frequency generated by the same clock domain, the data communication may be performed in the synchronous data communication mode. Meanwhile, the asynchronous data communication mode refers to a communication mode according to the clock domains with the different operating frequencies of the blocks. For example, blocks provided with clocks from different clock sources operate asynchronously, and this may be referred to as the asynchronous data mode. For example, since the first block (BLK_1) of 500 MHz and the second block (BLK_2) of 600 MHz operate at the operating frequencies generated by the different clock domains, the data communication may be performed in the asynchronous data communication mode. In the asynchronous data communication mode, an additional process of matching clocks between transmitters and receivers using a separate synchronizer may be required.

Meanwhile, in some cases, even if the operating frequency generated by the same clock domain is used, clock skew (or timing skew or timing issues) may occur due to physical characteristics inside the chip, such as the physical distance between blocks, etc. In this case, the same clock domain is used, but there may be cases in which data communication is not possible in the synchronous data communication mode. At this time, the problem with the clock skew may be solved by switching the synchronous data communication mode to the asynchronous data communication mode using the data communication mode determiner (DCMD) according to some examples of the present disclosure.

Controlling the data communication mode determiner (DCMD) may be performed by the command processor 7000, but aspects are not limited thereto. Examples will be described below by referring to FIGS. 24A and 24B.

Figure 24A:
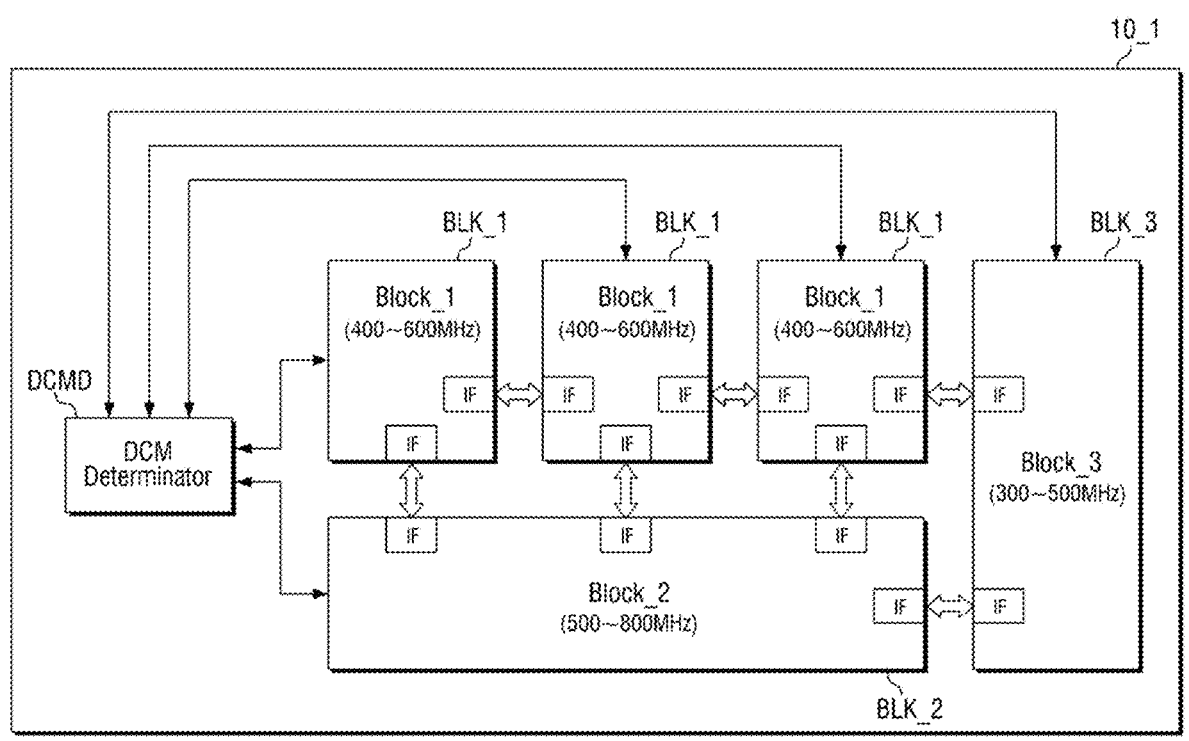
FIG. 24A is a diagram provided to explain a configuration of the neural core SoC according to some examples of the present disclosure.

FIG. 24A is a diagram provided to explain a configuration of the neural core SoC according to some examples of the present disclosure.

Referring to FIG. 24A, the first neural core SoC 10_1 may include a first block (BLK_1), a second block (BLK_2), a third block (BLK_3), and a data communication mode determiner (DCMD).

The first block (BLK_1) may include an interface (IF) for data communication with the other components (e.g., the first block (BLK_1), the second block (BLK_2), and the third block (BLK_3) different from the corresponding first block (BLK_1)). The data communication mode determiner (DCMD) may determine the mode of data communication between the first block (BLK_1) and the other components. The second block (BLK_2) may include an interface IF for data communication with the other components (e.g., the first block (BLK_1) and the third block (BLK_3)). The data communication mode determiner (DCMD) may determine the mode of data communication between the second block (BLK_2) and the other components.

The third block (BLK_3) may include an interface IF for data communication with the other components (e.g., the first block (BLK_1) and the second block (BLK_2)). The data communication mode determiner (DCMD) may determine the mode of data communication between the third block (BLK_3) and the other components.

According to some examples, the data communication mode determiner (DCMD) may receive, from one or more first blocks BLK_1, one or more second blocks BLK_2, and one or more third blocks BLK_3, an operating frequency for each of these. Based on the respective operating frequencies received from the one or more first blocks BLK_1, the one or more second blocks BLK_2, and the one or more third blocks BLK_3, the data communication mode determiner (DCMD) may determine the data communication mode for the one or more first blocks BLK_1, the one or more second blocks BLK_2, and the one or more third blocks BLK_3. For example, the data communication mode determiner (DCMD) may receive the operating frequencies of the first block (BLK_1) and the other first block (BLK_1) and, based on this, determine the data communication mode of the interface (IF) between the first block (BLK_1) and the first block (BLK_1). As described above, the data communication mode may be either the synchronous data communication mode or the asynchronous data communication mode. In addition, the data communication mode determiner (DCMD) may receive the operating frequencies of the first block (BLK_1) and the second block (BLK_2) and, based on this, determine the data communication mode of the interface (IF) between the first block (BLK_1) and the second block (BLK_2). In addition, the data communication mode determiner (DCMD) may receive the operating frequencies of the first block (BLK_1) and the third block (BLK_3) and, based on this, determine the data communication mode of the interface (IF) between the first block (BLK_1) and the third block (BLK_3). In addition, the data communication mode determiner (DCMD) may receive the operating frequencies of the second block (BLK_2) and the third block (BLK_3) and, based on this, determine the data communication mode of the interface (IF) between the second block (BLK_2) and the third block (BLK_3). The example configuration of the interfaces (IF) included in the first block (BLK_1), the second block (BLK_2), and the third block (BLK_3) will be described with further reference to FIG. 24B.

Figure 24B:
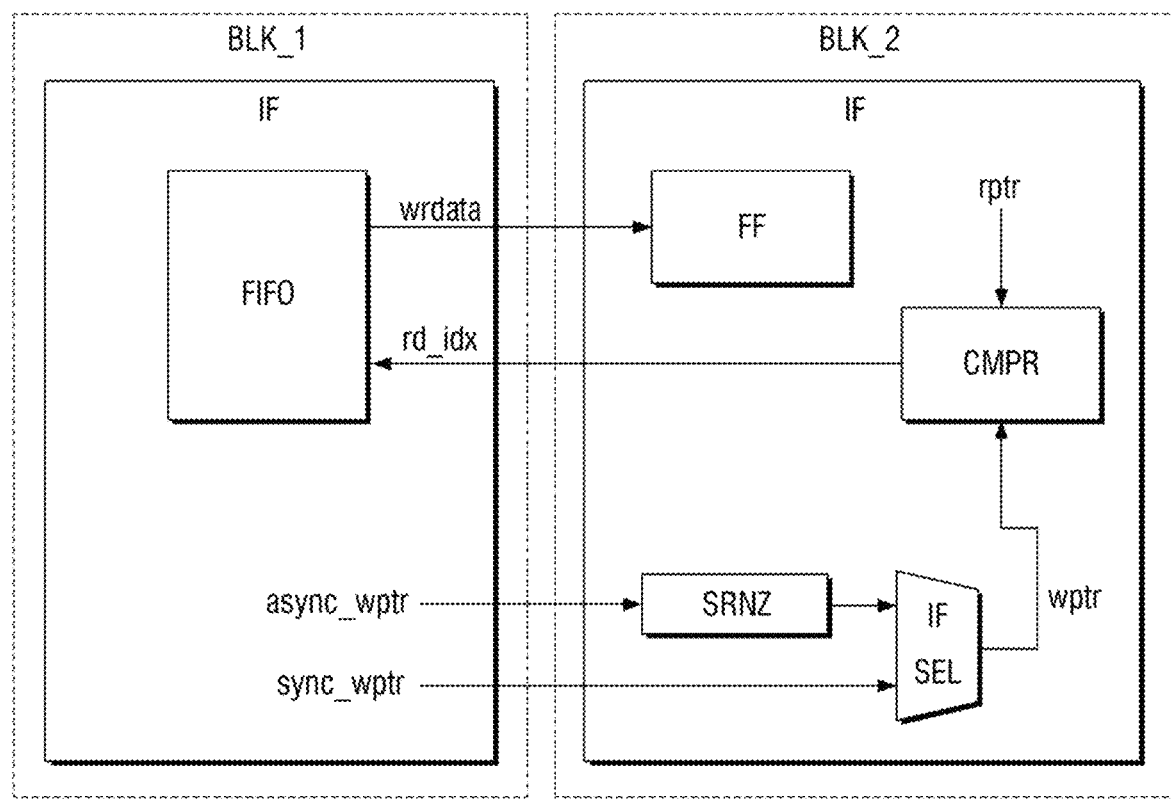
FIG. 24B is a diagram provided to explain an example of an interface configuration included in a block according to some examples of the present disclosure.

FIG. 24B is a diagram provided to explain an example of the interface configuration included in the block according to some examples of the present disclosure.

Referring to FIG. 24B, the first block (BLK_1) and the second block (BLK_2) may each include the interface (IF). This will be described in detail below based on the assumption that data is provided from the first block (BLK_1) to the second block (BLK_2). The interface (IF) of the first block (BLK_1) may include a FIFO register (FIFO).

The register (FIFO) may store data to be provided to the second block (BLK_2). The interface (IF) of the second block (BLK_2) may include a flip-flop (FF), a pointer comparator (CMPR), a synchronizer (SRNZ), and a pointer selector (IFSEL). The flip-flop (FF) may store the data read from the first block (BLK_1). The pointer comparator (CMPR) may compare a write pointer (wptr) provided from the first block (BLK_1) and a read pointer (rptr) counted in the second block (BLK_2) to generate a read index (rd_idx). The synchronizer (SRNZ) may control the clock of an asynchronous write pointer (async_wptr) provided from the first block (BLK_1). The pointer selector (IFSEL) may provide either a synchronous write pointer (sync_wptr) or an asynchronous write pointer (async_wptr) to the pointer comparator (CMPR). For convenience of explanation, FIG. 24B illustrates only the components used when data is transferred from the first block (BLK_1) to the second block (BLK_2), and the components included in the interface (IF) of the first block (BLK_1) may also be included in the interface (IF) of the second block (BLK_2), and vice versa.

First, in the synchronous data mode, the synchronous write pointer (sync_wptr) may be provided from the first block (BLK_1) to the second block (BLK_2). The synchronous write pointer (sync_wptr) provided to the second block (BLK_2) may be provided to the pointer selector (IFSEL).

The pointer selector (IFSEL) may provide the synchronous write pointer (sync_wptr) to the pointer comparator (CMPR) as the write pointer (wptr). The write pointer (wptr) may be an indicator of how much data the first block (BLK_1) includes, and the read pointer (rptr) may be an indicator of how much data the second block (BLK_2) has received.

The pointer comparator (CMPR) may compare the read pointer (rptr) and the write pointer (wptr) to generate a read index (rd_idx) indicating data to further read from the first block (BLK_1). The read index (rd_idx) generated by the comparator (CMPR) may be provided to the FIFO register (FIFO) included in the first block (BLK_1). The register (FIFO) may provide the write data (wrdata) to the flip-flop (FF) of the second block (BLK_2) in accordance with the read index (rd_idx). At this time, providing the read index (rd_idx) from the second block (BLK_2) and providing the write data (wrdata) from the first block (BLK_1) may be performed within the same clock.

Next, in the asynchronous data mode, the asynchronous write pointer (async_wptr) may be provided from the first block (BLK_1) to the second block (BLK_2). The asynchronous write pointer (async_wptr) provided to the second block (BLK_2) may be provided to the synchronizer (SRNZ). The synchronizer (SRNZ) may receive the asynchronous write pointer (async_wptr), control the clock of the asynchronous write pointer (async_wptr), and provide the result to the pointer selector (IFSEL). The pointer selector (IFSEL) may provide, as the write pointer (wptr), the clock-controlled asynchronous write pointer (async_wptr) to the pointer comparator (CMPR).

The pointer comparator (CMPR) may compare the read pointer (rptr) and the write pointer (wptr) to generate a read index (rd_idx) indicating data to further read from the first block (BLK_1). The read index (rd_idx) generated by the comparator (CMPR) may be provided to the FIFO register (FIFO) included in the first block (BLK_1). The register (FIFO) may provide the write data (wrdata) to the flip-flop (FF) of the second block (BLK_2) in accordance with the read index (rd_idx). At this time, providing the read index (rd_idx) from the second block (BLK_2) and providing the write data (wrdata) from the first block (BLK_1) may be performed within the same clock.

Referring again to FIG. 24A, according to some examples, the data communication mode determiner (DCMD) may be controlled by the command processor 7000, but aspects are not limited thereto.

For example, examples will be described below based on the assumption that the operating frequency of the first block (BLK_1) is 400 to 600 MHZ, the operating frequency of the second block (BLK_2) is 500 to 800 MHZ, and the operating frequency of the third block (BLK_3) is 300 to 500 MHz.

It is assumed that the three first blocks BLK_1 operate at 500 MHZ, the second block (BLK_2) operates at 500 MHz, and the third block (BLK_3) operates at 500 MHz. The data communication mode determiner (DCMD) may receive, from each of the first blocks BLK 1, the operating frequency of each first block (BLK_1) being 500 MHz. The data communication mode determiner (DCMD) may receive, from the second block (BLK_2), the operating frequency of the second block (BLK_2) being 500 MHz. The data communication mode determiner (DCMD) may receive, from the third block (BLK_3), the operating frequency of the third block (BLK_3) being 500 MHz.

The data communication mode determiner (DCMD) may determine the data communication mode of the interface (IF) between the first block (BLK_1) and the first block (BLK_1), the data communication mode of the interface (IF) between the first block (BLK_1) and the second block (BLK_2), the data communication mode of the interface (IF) between the first block (BLK_1) and the third block (BLK_3), and the data communication mode of the interface (IF) between the second block (BLK_2) and the third block (BLK_3) to be the synchronous data communication mode.

It is assumed that the three first blocks BLK_1 operate at 500 MHZ, the second block (BLK_2) operates at 800 MHZ, and the third block (BLK_3) operates at 500 MHz. The data communication mode determiner (DCMD) may receive, from each of the first blocks BLK 1, the operating frequency of each first block (BLK_1) being 500 MHz. The data communication mode determiner (DCMD) may receive, from the second block (BLK_2), the operating frequency of the second block (BLK_2) being 800 MHZ. The data communication mode determiner (DCMD) may receive, from the third block (BLK_3), the operating frequency of the third block (BLK_3) being 500 MHz.

The data communication mode determiner (DCMD) may determine the data communication mode of the interface (IF) between the first block (BLK_1) and the first block (BLK_1) and the data communication mode of the interface (IF) between the first block (BLK_1) and the third block (BLK_3) to be the synchronous data communication mode, and determine the mode of data communication between the first block (BLK_1) and the second block (BLK_2) and the mode of data communication between the second block (BLK_2) and the third block (BLK_3) to be the asynchronous data communication mode.

It is assumed that the three first blocks BLK_1 operate at 400 MHZ, the second block (BLK_2) operates at 500 MHZ, and the third block (BLK_3) operates at 300 MHz. The data communication mode determiner (DCMD) may receive, from each of the first blocks BLK 1, the operating frequency of each first block (BLK_1) being 400 MHZ. The data communication mode determiner (DCMD) may receive, from the second block (BLK_2), the operating frequency of the second block (BLK_2) being 500 MHz. The data communication mode determiner (DCMD) may receive, from the third block (BLK_3), the operating frequency of the third block (BLK_3) being 300 MHz.

The data communication mode determiner (DCMD) may determine the data communication mode of the interface (IF) between the first block (BLK_1) and the first block (BLK_1) to be the synchronous data communication mode, and determine the mode of data communication between the first block (BLK_1) and the second block (BLK_2), the mode of data communication between the first block (BLK_1) and the third block (BLK_3), and the mode of data communication between the second block (BLK_2) and the third block (BLK_3) to be the asynchronous data communication mode.

It is assumed that one first block (BLK_1) operates at 400 MHz, the other two first blocks BLK_1 operate at 600 MHz, the second block (BLK_2) operates at 600 MHZ, and the third block (BLK_3) operates at 400 MHz. For convenience of explanation, the first block (BLK_1) operating at 400 MHz is defined as a 1-1-th block, and the first block (BLK_1) operating at 600 MHz is defined as a 1-2-th block. The data communication mode determiner (DCMD) may receive, from the 1-1-th block, the operating frequency of the 1-1-th block being 400 MHz. The data communication mode determiner (DCMD) may receive, from the 1-2-th block, the operating frequency of the 1-2-th block being 600 MHz. The data communication mode determiner (DCMD) may receive, from the second block (BLK_2), the operating frequency of the second block (BLK_2) being 600 MHZ. The data communication mode determiner (DCMD) may receive, from the third block (BLK_3), the operating frequency of the third block (BLK_3) being 400 MHz.

The data communication mode determiner (DCMD) may determine the data communication mode of the interface (IF) between the 1-1-th block and the 1-2-th block, the data communication mode of the interface (IF) between the 1-1-th block and the second block (BLK_2), the data communication mode of the interface (IF) between the 1-2-th block and the third block (BLK_3), and the data communication mode of the interface (IF) between the second block (BLK_2) and the third block (BLK_3) to be the asynchronous data communication mode, and may determine the data communication mode of the interface (IF) between the 1-1-th block and the third block (BLK_3), the data communication mode of the interface (IF) between the 1-2-th block, and the data communication mode of the interface (IF) between the 1-2-th block and the second block (BLK_2) to be the synchronous data communication mode.

Figure 25:
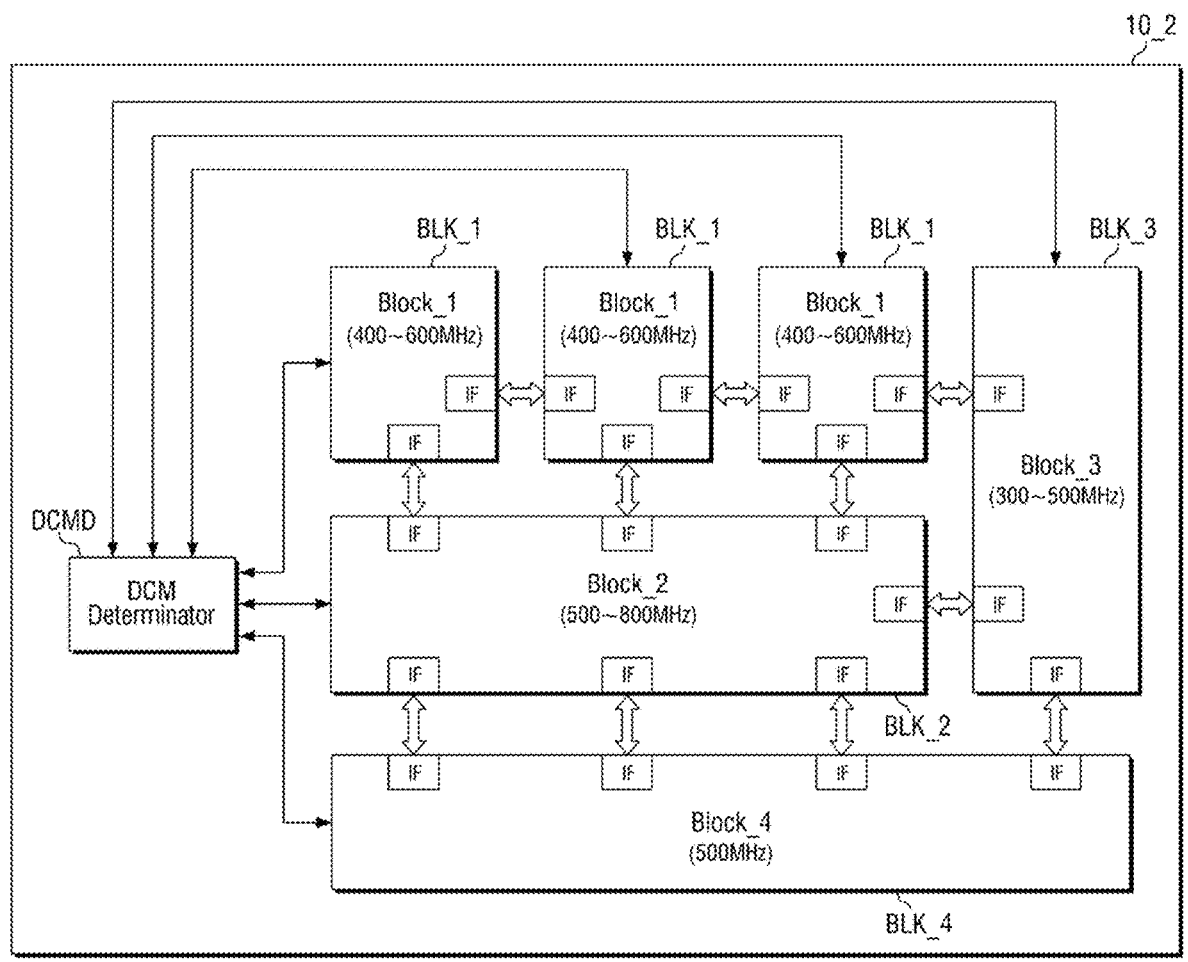
FIG. 25 is a diagram provided to explain a configuration of the neural core SoC according to some other examples of the present disclosure.

FIG. 25 is a diagram provided to explain a configuration of the neural core SoC according to some other examples of the present disclosure. For convenience of explanation, the elements or operations same as or similar to those described above will not be described or briefly described.

Referring to FIG. 25, a second neural core SoC 10_2 may include a first block (BLK_1), a second block (BLK_2), a third block (BLK_3), a fourth block (BLK_4), and the data communication mode determiner (DCMD).

The first block (BLK_1) may perform data communication between the first block (BLK_1) and the first block (BLK_1), between the first block (BLK_1) and the second block (BLK_2), and between the first block (BLK_1) and the third block (BLK_3). The second block (BLK_2) may perform data communication between the second block (BLK_2) and the first block (BLK_1), between the second block (BLK_2) and the third block (BLK_3), and between the second block (BLK_2) and the fourth block (BLK_4). The third block (BLK_3) may perform data communication between the third block (BLK_3) and the first block (BLK_1), between the third block (BLK_3) and the second block (BLK_2), and between the third block (BLK_3) and the fourth block (BLK_4). The fourth block (BLK_4) may perform data communication between the fourth block (BLK_4) and the second block (BLK_2) and between the fourth block (BLK_4) and the third block (BLK_3).

The data communication mode determiner (DCMD) may determine the data communication mode for the interface (IF) between the first block (BLK_1) and the first block (BLK_1), between the first block (BLK_1) and the second block (BLK_2), between the first block (BLK_1) and the third block (BLK_3), between the second block (BLK_2) and the third block (BLK_3), between the second block (BLK_2) and the fourth block (BLK_4), and between the third block (BLK_3) and the fourth block (BLK_4).

According to some examples, compared to the first neural core SoC 10_1, the second neural core SoC 10_2 may further include the fourth block (BLK_4). In general, adding a specific block to a semiconductor chip may involve many calculations and trials and errors to determine the modes of data communication between the block to be added and the existing blocks in the semiconductor chip. This is because, when determining the specifications of the added block, it is necessary to take the specifications of the existing blocks in the semiconductor chip into consideration, and even if the specifications between the block to be added and the existing blocks in the semiconductor chip are considered, timing issues may occur due to unexpected delays. If the timing issue occurs, the semiconductor chip cannot be used, and it is necessary to newly perform designing a semiconductor chip to resolve the issue. However, the second neural core SoC 10_2 according to some examples of the present disclosure minimizes this problem because it includes the data communication mode determiner (DCMD) capable of selecting the data communication mode. For example, if the timing issue occurs in the second neural core SoC 10_2, the second neural core SoC 10_2 can change the data communication mode of the newly added fourth block (BLK_4) to the asynchronous data communication mode, thereby solving the timing issue. Therefore, according to some examples of the present disclosure, it is possible to minimize waste of time and economic costs when designing a new semiconductor chip and manufacturing a prototype product.

Figure 26:
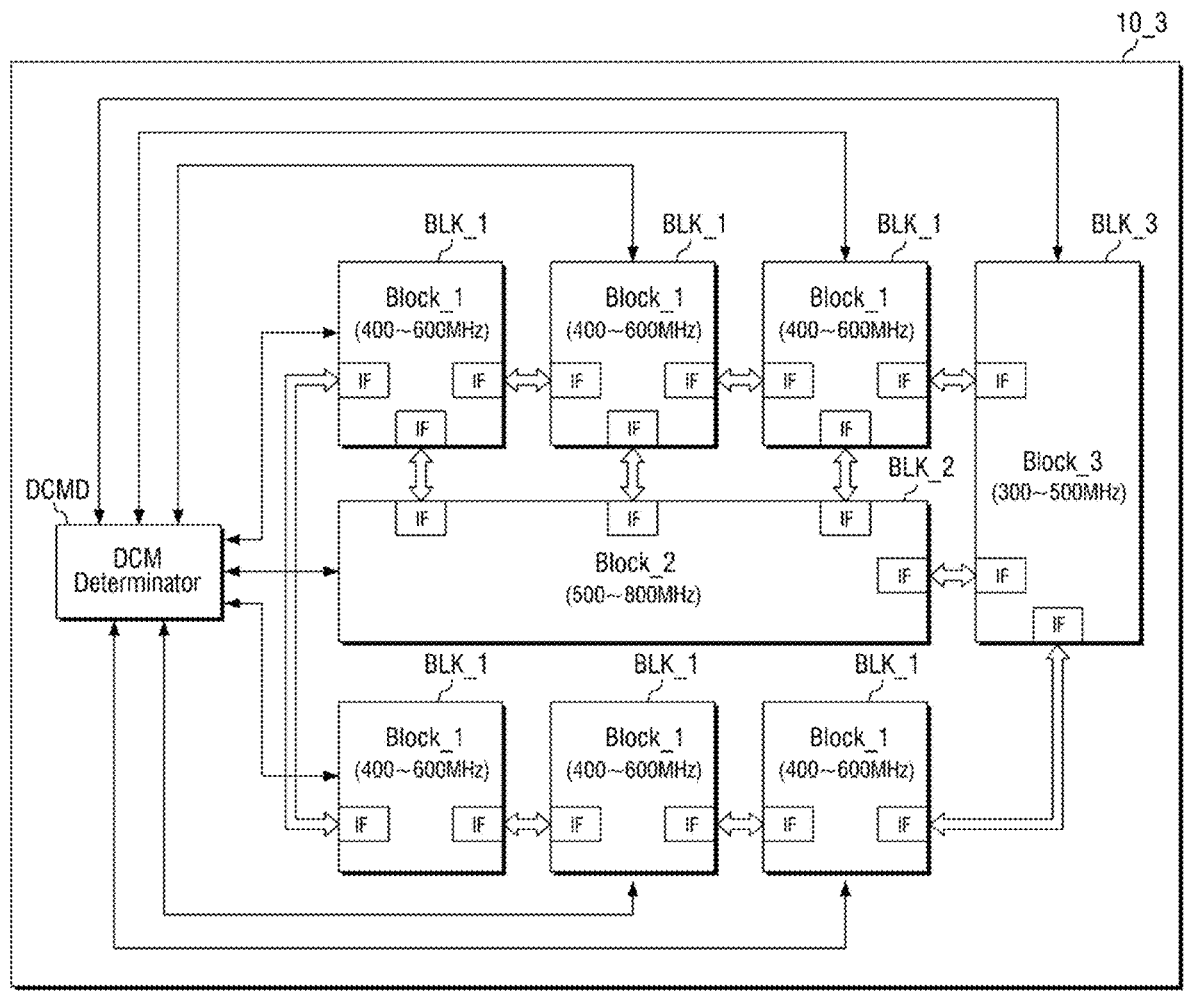
FIG. 26 is a diagram provided to explain a configuration of the neural core SoC according to some other examples of the present disclosure.

FIG. 26 is a diagram provided to explain a configuration of the neural core SoC according to some other examples of the present disclosure. For convenience of explanation, the elements or operations same as or similar to those described above will not be described or briefly described.

Referring to FIG. 26, a third neural core SoC 10_3 may include a first block (BLK_1), a second block (BLK_2), a third block (BLK_3), and a data communication mode determiner (DCMD).

The third neural core SoC 10_3 shows a case in which three more first blocks BLK 1 are added to the first neural core SoC 10_1. At this time, the first block (BLK_1) added to the third neural core SoC 10_3 may be physically separated from the first block (BLK_1) included in the first neural core SoC 10_1. At this time, when the physical distance between the first blocks BLK_1 is relatively large, timing issues may occur even if the first blocks BLK_1 operate at the same operating frequency. Even in this case, the third neural core SoC 10_3 includes the data communication mode determiner (DCMD), and thus is capable of easily resolving the timing issues and minimizing the waste of time and economic costs can be minimized, especially in situations in which new semiconductor chips are designed and prototype products are manufactured.

Figure 27:
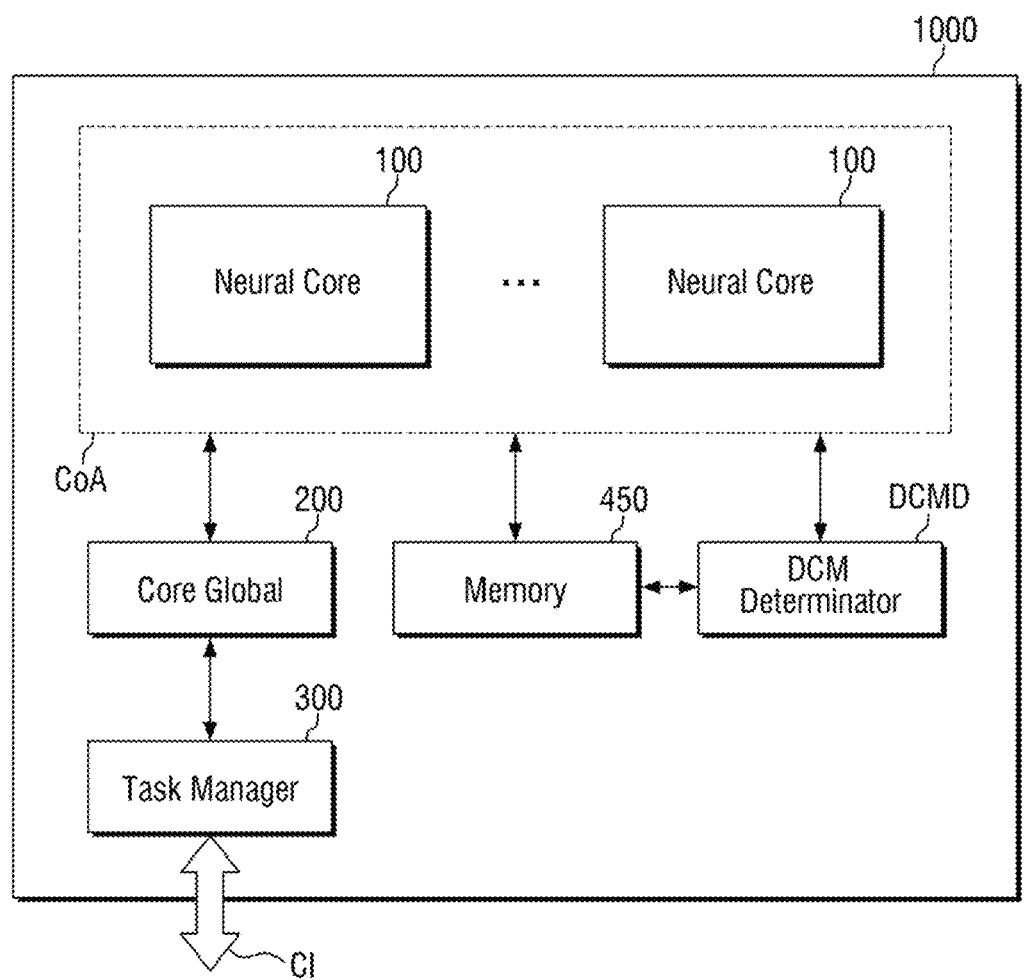
FIG. 27 is a block diagram provided to schematically explain the neural processor according to some other examples of the present disclosure.

FIG. 27 is a block diagram provided to schematically explain the neural processor according to some other examples of the present disclosure.

Referring to FIG. 27, the neural processor 1000 may include a core array (CoA), the core global 500, the task manager 600, a memory 450, and the data communication mode determiner (DCMD).

The core array (CoA) may include a plurality of neural cores 100. That is, the core array (CoA) is defined as a specific arrangement of a plurality of neural cores 100. The plurality of neural core 100 may divide and perform the work of the neural processor 1000. For example, there may be eight neural cores 100. However, aspects are not limited to the above.

The neural core 100 may receive task information from the core global 500 and perform a task according to the task information. The task may be defined by the control signals, and the task may be either a compute operation or a memory operation. The memory operation may be, for example, any one of micro DMA (μDMA), LP micro DMA (low priority μDMA), store μDMA (STμDMA), and pre-processing works.

The memory 450 may be a memory shared by each neural core 100 in the neural processor 1000. The memory 450 may store data of each neural core 100. In addition, the memory 450 may transmit the data to each neural core 100. Meanwhile, the memory 450 may be a memory shared by each neural processor 1000 in the neural core SoC 10. At this time, the memory 450 may store the data of each neural processor 1000 and transmit the data to each neural processor 1000.

In other words, the memory 450 may be an on-chip memory included inside the neural processor 1000, or may be an off-chip memory included outside the neural processor 1000. For example, the memory 450 may be the L1 shared memory included in the neural processor 1000, or the memory 450 may be the shared memory 2000 of FIG. 3. The shared memory 2000 of FIG. 3 may also be expressed in another term, that is, the L2 shared memory. The L1 shared memory may be a memory corresponding to the neural processor level, that is, to level 1 (L1). The L2 shared memory may be a memory corresponding to the neural processing device, that is, to level 2 (L2). That is, the L2 shared memory may be shared by the neural processor 1000, and the L1 shared memory 400 may be shared by the neural core 100.

The neural core 100 may receive task information from the core global 500 and perform a task according to the task information. At this time, the task may be a computation work or a work related to memory computation, and may include information on the data path. The task may be defined by the control signals. The task information is information on the task, and it may be information on type of task, form of task, additional information on task, etc.

The neural core 100 may transmit a completion signal indicating completion of the task to the core global 500.

The task manager 600 may receive a task from the control interconnection (CI). The control interconnection (CI) may be a general term for the transmission interfaces that transmit the tasks from the command processor 7000.

The task manager 600 may receive a task, generate task information, and transmit the result to the core global 500. At this time, the task information may include information on the data path. In addition, the task manager 600 may receive a completion signal through the core global 500, generate a completion report accordingly, and transmit the result to the command processor 7000 through the control interconnection (CI).

The core global 500 may be a wire structure connected in hardware within the neural core 100. Although not illustrated, the core global 500 may be a structure that connects the neural core 100, the memory 450, and the task manager 600.

The core global 500 may receive the task information from the task manager 600, transmit the same to the neural core 100, and receive a corresponding completion signal from the neural core 100. The core global 500 may transmit the completion signal to the task manager 600.

The data communication mode determiner (DCMD) may determine the mode of data communication between the neural cores 100 and the mode of data communication between the neural core 100 and the memory 450.

According to some examples, the data communication mode determiner (DCMD) may be a component included in a port manager. The port manager may control the data communication between blocks by determining the port type of each block. However, this is an illustrative description and aspects are not limited thereto. For example, the port manager may have the same structure as the data communication mode determiner (DCMD), or may be implemented as a structure separate from the data communication mode determiner (DCMD). Hereinafter, for convenience of explanation, it is explained that the data communication mode determiner (DCMD) controls data communication between blocks.

Figure 28:
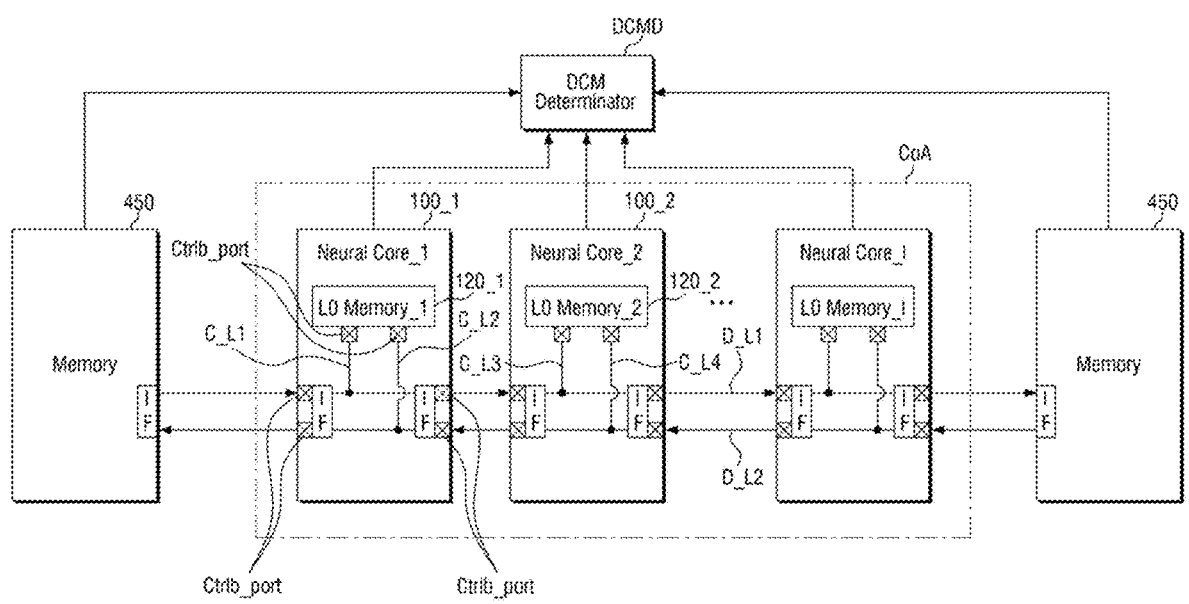
FIG. 28 is a diagram provided to explain data lines and connection lines connecting the memory and neural cores included in the neural processor according to some examples of the present disclosure.

FIG. 28 is a diagram provided to explain data lines and connection lines connecting the memory and the neural core included in the neural processor according to some examples of the present disclosure.

Referring to FIGS. 27 and 28, the core array (CoA) may include a plurality of neural cores 100. The data communication mode determiner (DCMD) may determine a mode of data communication between the plurality of neural cores 100 and/or between the neural core 100 and the memory 450. FIGS. 28 to 32 illustrate that the neural core 100 includes only the L0 memory 120, but this is merely for easy description of the disclosure and aspects are not limited thereto.

The core array (CoA) may include a first data line (D_L1) through which data is transmitted in a first direction, and a second data line (D_L2) through which data is transmitted in a second direction opposite to the first direction. In other words, the core array (CoA) may be capable of transmitting data in both directions.

The plurality of neural cores 100 may be connected to each other in series through the first data line (D_L1). In addition, the plurality of neural cores 100 may be connected to each other in series through the second data line (D_L2). In other words, the plurality of neural cores 100 may have a structure in which they are connected in series to each other through the first data line (D_L1) and the second data line (D_L2).

The first data line (D_L1) may connect the memory 450 and the core array (CoA). In addition, the second data line (D_L2) may connect the memory 450 and the core array (CoA). The memory 450 and the core array (CoA) may be connected directly through the first data line (D_L1) and the second data line (D_L2), or indirectly through a local interconnector which will be described below. For convenience of explanation, the neural core 100 connected to the memory 450 is defined as a first neural core 100_1, and the neural core 100 connected in series to the first neural core 100_1 is defined as a second neural core 100_2. In addition, the L0 memory 120 included in the first neural core 100_1 is defined as a first L0 memory 120_1, and the L0 memory 120 included in the second neural core 100_2 is defined as a second L0 memory 120_2. However, the terms used herein are selected merely for convenience of explanation, and aspects are not limited to these terms.

In addition, the core array (CoA) may include a connection line connecting the first data line (D_L1) and the L0 memory 120, and a connection line connecting the second data line (D_L2) and the L0 memory 120. For example, the core array (CoA) may include a first connection line (C_L1) connecting the first data line (D_L1) and the first L0 memory 120_1, and a second connection line (C_L2) connecting the second data line (D_L2) and the first L0 memory 120_1. In addition, the core array (CoA) may include a third connection line (C_L3) connecting the first data line (D_L1) and the second L0 memory 120_2, and a fourth connection line (C_L4) connecting the second data line (D_L2) and the second L0 memory 120_2.

In other words, the first neural core 100_1 and the second neural core 100_2 may be connected in series to each other through the first data line (D_L1) and the second data line (D_L2). In addition, the first L0 memory 120_1 included in the first neural core 100_1 may be connected to the first data line (D_L1) through the first connection line (C_L1). In addition, the first L0 memory 120_1 included in the first neural core 100_1 may be connected to the second data line (D_L2) through the second connection line (C_L2). In addition, the second L0 memory 120_2 included in the second neural core 100_2 may be connected to the first data line (D_L1) through the third connection line (C_L3). In addition, the second L0 memory 120_2 included in the second neural core 100_2 may be connected to the second data line (D_L2) through the fourth connection line (C_L4).

According to some examples, the core array (CoA) may include a controllable port (Ctrlb_port) that may be controlled on/off by software or firmware. According to some examples, the controllable port (Ctrlb_port) may be implemented as software or firmware. The task manager 600 of the neural processor 1000 may control on/off the controllable port (Ctrlb_port) included in each core array (CoA) through a descriptor. The controllable port (Ctrlb_port) is installed on the first data line (D_L1), the second data line (D_L2), and the connection line to set a data movement path. In other words, the controllable port (Ctrlb_port) may be placed between the memory 450 and the neural core 100, between the plurality of neural cores 100, and among the connection line and the L0 memory 120, and the task manager 600 may appropriately control the controllable port (Ctrlb_port) so as to configure the data movement path. At this time, the task manager 600 may fix the configured data path or reconfigure the data path in real time.

For example, the first data line (D_L1) may include the controllable port (Ctrlb_port) between the memory 450 and the first neural core 100_1, and between the first neural core 100_1 and the second neural core 100_2. That is, the task manager 600 may control the controllable port (Ctrlb_port) between the memory 450 and the first neural core 100_1 so as to configure a data movement path in a first direction between the memory 450 and the first neural core 100_1. In addition, the task manager 600 may control the controllable port (Ctrlb_port) between the first neural core 100_1 and the second neural core 100_2 so as to configure the data movement path in the first direction between the first neural core 100_1 and the second neural core 100_2.

In addition, for example, the second data line (D_L2) may include a controllable port (Ctrlb_port) between the memory 450 and the first neural core 100_1, and between the first neural core 100_1 and the second neural core 100_2. That is, the task manager 600 may control the controllable port (Ctrlb_port) between the memory 450 and the first neural core 100_1 so as to configure a data movement path in a second direction between the memory 450 and the first neural core 100_1. In addition, the task manager 600 may control the controllable port (Ctrlb_port) between the first neural core 100_1 and the second neural core 100_2 to configure a data movement path in the second direction between the first neural core 100_1 and the second neural core 100_2.

In addition, for example, the first connection line (C_L1) may include a controllable port (Ctrlb_port) between the first data line (D_L1) and the first L0 memory 120_1. That is, the task manager 600 may control the controllable port (Ctrlb_port) between the first data line (D_L1) and the first L0 memory 120_1 so as to configure a data movement path in a first direction between the first data line (D_L1) and the first L0 memory 120_1. Likewise, the second connection line (C_L2), the third connection line (C_L3), and the fourth connection line (C_L4) may each include a controllable port (Ctrlb_port), and the task manager 600 may control the controllable port (Ctrlb_port) so as to configure a data movement path in a first or second direction. Hereinafter, for convenience of explanation, it is assumed that the data moves to the L0 memory 120, and the computation is performed in the processing unit (160 in FIG. 20) corresponding to the L0 memory 120. However, this is merely for convenience of explanation, and aspects are not limited thereto. If necessary, data may be provided to the L0 memory 120 and may be output without computation.

In summary, the plurality of neural cores 100 included in the core array (CoA) according to some examples may be connected in series to each other by the first data line (D_L1) and the second data line (D_L2). In addition, each of the L0 memories 120 may be connected to the first data line (D_L1) and the second data line (D_L2) through the first data line (D_L1) and the second data line (D_L2). In addition, the core array (CoA) may include a controllable port (Ctrlb_port) that can be controlled on/off. Accordingly, the task manager 600 may control on/off the controllable port (Ctrlb_port) so as to configure the movement path of the data provided from the memory 450 to the plurality of neural cores 100. Hereinafter, the data movement path configured at the task manager 600 will be described by way of example.

Figure 29:
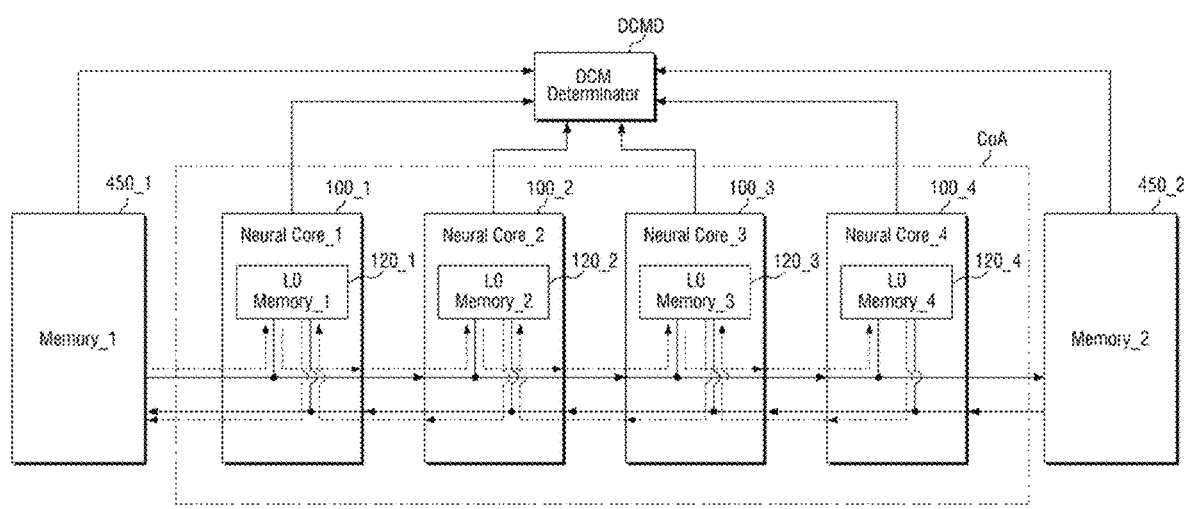
FIG. 29 is a diagram provided to explain a first data path according to some examples of the present disclosure.

FIG. 29 is a diagram provided to explain a first data path according to some examples of the present disclosure. For convenience of explanation, examples will be described below based on the assumption that the neural processor 1000 includes four neural cores 100, although it is obvious that the aspects are not limited to the example number of neural cores 100. In addition, hereinafter, for convenience of explanation, the same or similar elements or operations as those described above will not be described or briefly described.

Referring to FIGS. 27, 28, and 29, the neural processor 1000 may include a first memory 450_1, a second memory 450_2, and a core array (CoA). The core array (CoA) may include a first neural core 100_1, a second neural core 100_2, a third neural core 100_3, a fourth neural core 100_4, and a data communication mode determiner (DCMD). The first memory 450_1 and the second memory 450_2 may be the same or different memories. The term "data path" as used herein is defined to mean a path through which the data output from the memory 450 is input to the memory 450. In other words, the "data path" refers to the path through which the data moves from the memory 450 to the core array (CoA) and from the core array (CoA) to the memory 450. However, these terms are selected for convenience of explanation, and the aspects are not limited to these terms.

According to some examples, the task manager 600 may control the controllable port (Ctrlb_port) so as to configure a first data path. The first data path may include a data movement path in a first direction in which data is provided from the first memory 450_1 to the first L0 memory 120_1, from the first L0 memory 120_1 to the second L0 memory 120_2, from the second L0 memory 120_2 to a third L0 memory 120_3, and from the third L0 memory 120_3 to a fourth L0 memory 120_4, and a data movement path in a second direction in which data is provided from the fourth L0 memory 120_4 to the third L0 memory 120_3, from the third L0 memory 120_3 to the second L0 memory 120_2, from the second L0 memory 120_2 to the first L0 memory 120_1, and from the first L0 memory 120_1 to the first memory 450_1.

In other words, the task manager 600 may configure the first data path to control the data to be transmitted from the first memory 450_1, through the first neural core 100_1, the second neural core 100_2, the third neural core 100_3, and the fourth neural core 100_4, and back to the third neural core 100_3, the second neural core 100_2, the first neural core 100_1, and the first memory 450_1.

It is assumed that the first to fourth neural cores 100_1 to 100_4 can operate at the first to second operating frequencies, and the first memory 450_1 can operate at the third to first operating frequencies. At this time, the second operating frequency may be greater than the first operating frequency, and the third operating frequency may be less than the first operating frequency. At this time, it is assumed that the first to third operating frequencies are frequencies generated in different clock domains. In addition, communication among the first to fourth neural cores 100_1 to 100_4 and the first memory 450_1 may be controlled by the port manager. In addition, the data communication mode determiner (DCMD) may determine the operating frequency at which the first to fourth neural cores 100_1 to 100_4 and the first memory 450_1 operate.

If computation at a relatively high speed is required, that is, in the maximum computation speed mode, the first to fourth neural cores 100_1 to 100_4 and the first memory 450_1 may need to operate at the maximum operating frequency. Therefore, in this case, the data communication mode determiner (DCMD) may operate the first to fourth neural cores 100_1 to 100_4 at the second operating frequency and operate the first memory 450_1 at the first operating frequency. At this time, since the second operating frequency, which is the maximum operating frequency of the first to fourth neural cores 100_1 to 100_4, and the first operating frequency, which is the maximum operating frequency of the first memory 450_1, are different from each other, the data communication mode determiner (DCMD) may determine the data communication mode of the first memory 450_1 and the first neural core 100_1 to be the asynchronous data communication mode. Meanwhile, since the operating frequencies of the first to fourth neural cores 100_1 to 100_4 are the same as the second operating frequency, the data communication mode determiner (DCMD) may determine the mode of data communication among the first to fourth neural cores 100_1 to 100_4 to be the synchronous data communication mode.

However, according to some examples, even when the operating frequencies of the first to fourth neural cores 100_1 to 100_4 are the same as the second operating frequency, processing in the synchronous data communication mode may not be possible due to problems such as timing issues. In this case, the data communication mode determiner (DCMD) may determine the data communication mode of the neural cores having the timing issues in the first to fourth neural cores 100_1 to 100_4 to be the asynchronous data communication mode.

Meanwhile, if relatively low power consumption is required, that is, in the minimum power use mode, the first to fourth neural cores 100_1 to 100_4 and the first memory 450_1 may need to operate at the minimum operating frequency. Therefore, in this case, the data communication mode determiner (DCMD) may operate the first to fourth neural cores 100_1 to 100_4 at the first operating frequency and operate the first memory 450_1 at the third operating frequency. At this time, since the first operating frequency, which is the minimum operating frequency of the first to fourth neural cores 100_1 to 100_4, and the third operating frequency, which is the minimum operating frequency of the first memory 450_1, are different from each other, the data communication mode determiner (DCMD) may determine the data communication mode of the first memory 450_1 and the first neural core 100_1 to be the asynchronous data communication mode. Meanwhile, since the operating frequencies of the first to fourth neural cores 100_1 to 100_4 are the same as the first operating frequency, the data communication mode determiner (DCMD) may determine the mode of data communication among the first to fourth neural cores 100_1 to 100_4 to be the synchronous data communication mode.

However, according to some examples, even when the operating frequencies of the first to fourth neural cores 100_1 to 100_4 are the same as the first operating frequency, processing in the synchronous data communication mode may not be possible due to problems such as timing issues. In this case, the data communication mode determiner (DCMD) may determine the data communication mode of the neural cores having the timing issues in the first to fourth neural cores 100_1 to 100_4 to be the asynchronous data communication mode.

In addition, if power consumption is lower than in the maximum computation speed mode and it is required to process computations faster than in the minimum power use mode, that is, in the normal use mode, the data communication mode determiner (DCMD) may operate the first to fourth neural cores 100_1 to 100_4 at the first operating frequency and the first memory 450_1 at the first operating frequency. At this time, since the operating frequencies of the first to fourth neural cores 100_1 to 100_4 and the operating frequency of the first memory 450_1 are the same as the first operating frequency, the data communication mode determiner (DCMD) may determine the mode of data communication among the first memory 450_1 and the first to fourth neural cores 100_1 to 100_4 to be the synchronous data communication mode.

However, according to some examples, even when the operating frequencies of the first to fourth neural cores 100_1 to 100_4 and the first memory 450_1 are the same as the first operating frequency, processing in the synchronous data communication mode may not be possible due to problems such as timing issues. In this case, the data communication mode determiner (DCMD) may determine the data communication mode of the neural cores and the memory having the timing issues in the first to fourth neural cores 100_1 to 100_4 and the first memory 450_1 to be the asynchronous data communication mode.

Figure 30:
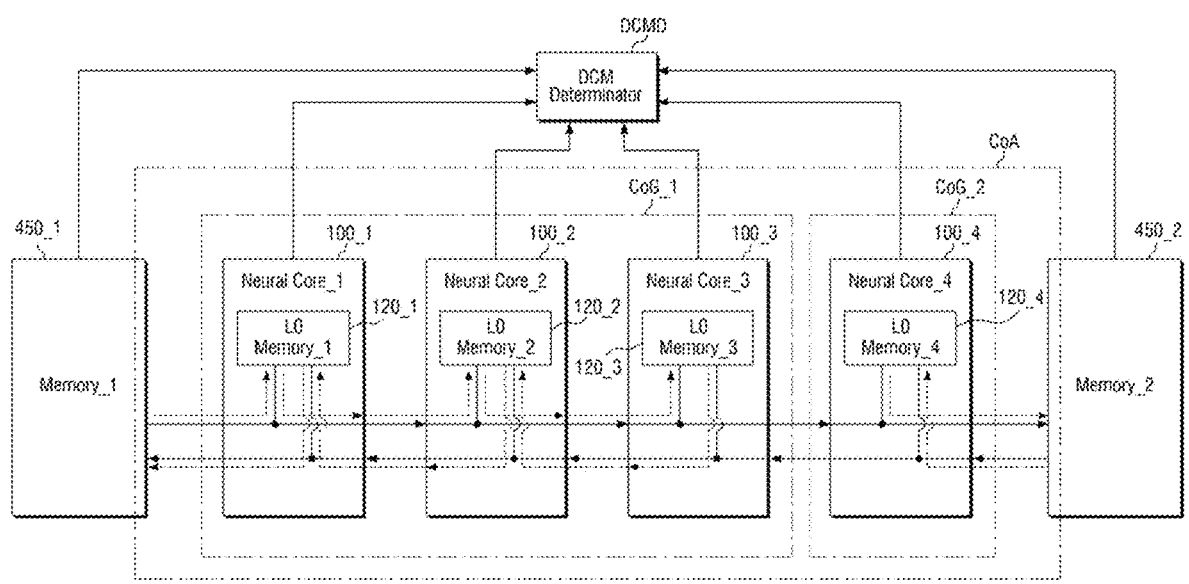
FIG. 30 is a diagram provided to explain a second data path and a third data path according to some examples of the present disclosure.

FIG. 30 is a diagram provided to explain a second data path and a third data path according to some examples of the present disclosure.

Referring to FIGS. 27, 28, and 30, the neural processor 1000 may include a core array (CoA), a first memory 450_1, and a second memory 450_2. The core array (CoA) may include a first compute group (CoG_1) and a second compute group (CoG_2). The first compute group (CoG_1) and the second compute group (CoG_2) may execute different programs, applications, or computations. The first compute group (CoG_1) may include the first neural core 100_1, the second neural core 100_2, and the third neural core 100_3, and the second compute group (CoG_2) may include the fourth neural core 100_4. The first memory 450_1 and the second memory 450_2 may be the same or different memories.

According to some examples, the task manager 600 may control the controllable port (Ctrlb_port) so as to configure the second data path. The second data path may be a data path for the first compute group (CoG_1). The task manager 600 may configure a data movement path in a first direction in which data is provided from the first memory 450_1 to the first L0 memory 120_1, from the first L0 memory 120_1 to the second L0 memory 120_2, and from the second L0 memory 120_2 to the third L0 memory 120_3, and configure a data movement path in a second direction in which data is provided from the third L0 memory 120_3 to the second L0 memory 120_2, from the second L0 memory 120_2 to the first L0 memory 120_1, and from the first L0 memory 120_1 to the first memory 450_1, thereby configuring the second data path.

In addition, the task manager 600 may control the controllable port (Ctrlb_port) so as to configure a third data path. The third data path may be a data path for the second compute group (CoG_2). The task manager 600 may configure a data movement path in the second direction in which data is provided from the second memory 450_2 to the fourth L0 memory 120_4, and a data movement path in the first direction in which data is provided from the fourth L0 memory 120_4 back to the second memory 450_2, thereby configuring a third data path.

It is assumed that the first to fourth neural cores 100_1 to 100_4 can operate at the first to second operating frequencies, and the first memory 450_1 can operate at the third to first operating frequencies. In addition, it is assumed that the second memory 450_2 can operate at the third to second operating frequencies. At this time, the second operating frequency may be greater than the first operating frequency, and the third operating frequency may be less than the first operating frequency. At this time, the data communication mode determiner (DCMD) may determine the operating frequencies of the first to fourth neural cores 100_1 to 100_4, the first memory 450_1, and the second memory 450_2.

According to some examples, the first compute group (CoG_1) may operate in the minimum power use mode, and the second compute group (CoG_2) may operate in the maximum computation speed mode. In this case, the data communication mode determiner (DCMD) may operate the first to third neural cores 100_1 to 100_3 at the first operating frequency and operate the first memory 450_1 at the third operating frequency. At this time, the data communication mode determiner (DCMD) may determine the data communication mode of the first memory 450_1 and the first neural core 100_1 to be the asynchronous data communication mode, and determine the mode of data communication among the first to third neural core 100_1 to 100_3 to be the synchronous data communication mode.

However, even when the operating frequencies of the first to third neural cores 100_1 to 100_3 are the same as the first operating frequency, processing in the synchronous data communication mode may not be possible due to problems such as timing issues. In this case, the data communication mode determiner (DCMD) may determine the data communication mode of the neural cores having the timing issues in the first to third neural cores 100_1 to 100_3 to be the asynchronous data communication mode.

Meanwhile, the data communication mode determiner (DCMD) may operate the fourth neural core 100_4 at the second operating frequency and operate the second memory 450_2 at the second operating frequency. In this case, the data communication mode determiner (DCMD) may determine the data communication mode of the second memory 450_2 and the fourth neural core 100_4 to be the synchronous data communication mode.

However, according to some examples, even when the operating frequencies of the fourth neural core 100_4 and the second memory 450_2 are the same as the second operating frequency, processing in the synchronous data communication mode may not be possible due to problems such as timing issues. In this case, the data communication mode determiner (DCMD) may determine the data communication mode of the fourth neural core 100_4 and the second memory 450_2 to be the asynchronous data communication mode.

Figure 31:
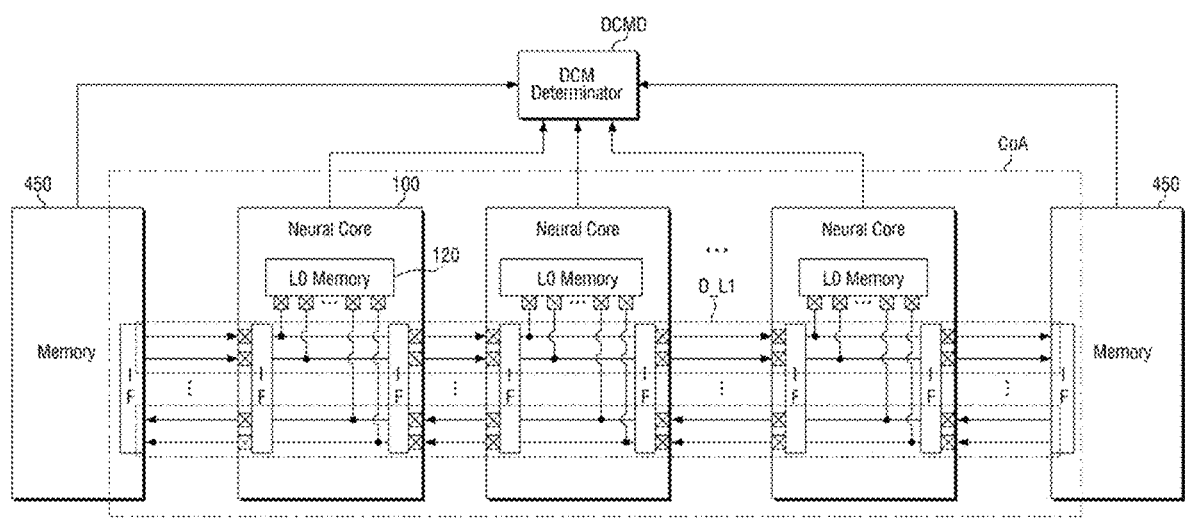
FIG. 31 is a diagram provided to explain an example in which the bandwidth of the data line connecting the memory and the neural core included in the neural processor according to some examples of the present disclosure is adjustable.

FIG. 31 is a diagram provided to explain an example in which the bandwidth of the data line connecting the memory and the neural core included in the neural processor according to some examples of the present disclosure is adjustable. For convenience of explanation, the elements or operations same as or similar to those described above will not be described or briefly described.

Referring to FIGS. 27 and 31, the core array (CoA) may include a first data line (D_L1) through which data is transmitted in a first direction, and a second data line (D_L2) through which data is transmitted in a second direction. In other words, the core array (CoA) may be capable of transmitting data in both directions.

The core array (CoA) may include a plurality of neural cores 100, the first data line (D_L1), and a second data line (D_L2).

The plurality of neural cores 100 may be connected to each other in series through the first data line (D_L1). In addition, the plurality of neural cores 100 may be connected to each other in series through the second data line (D_L2). In other words, the plurality of neural cores 100 may have a structure in which they are connected in series to each other through the first data line (D_L1) and the second data line (D_L2).

The first data line (D_L1) and the second data line (D_L2) may each include a plurality of data lines. In other words, the first data line (D_L1) may include a plurality of data lines through which data is transmitted in the first direction. In addition, the second data line (D_L2) may include a plurality of data lines through which data is transmitted in the second direction.

In addition, the core array (CoA) may include a connection line connecting the first data line (D_L1) and the L0 memory 120, and a connection line connecting the second data line (D_L2) and the L0 memory 120. As described above, since the first data line (D_L1) and the second data line (D_L2) each include a plurality of data lines, there may be a plurality of connection lines connecting the first data line (D_L1) and the L0 memory 120, and there may also be a plurality of connection lines connecting the second data line (D_L2) and the L0 memory 120.

According to some examples, the core array (CoA) may include a controllable port (Ctrlb_port) that may be controlled on/off by software or firmware. The controllable port (Ctrlb_port) is installed on the first data line (D_L1), the second data line (D_L2), and the connection line to set a data movement path.

According to some examples, the task manager 600 may control the controllable port (Ctrlb_port) so as to turn on/off at least some of the plurality of data lines included in the first data line (D_L1). For example, the task manager 600 may control the controllable port (Ctrlb_port) so as to turn off some of the plurality of data lines included in the first data line (D_L1). For another example, the task manager 600 may control the controllable port (Ctrlb_port) so as to turn on all of the plurality of data lines included in the first data line (D_L1).

Similarly, the task manager 600 may control the controllable port (Ctrlb_port) so as to turn on/off at least some of the plurality of data lines included in the second data line (D_L2). For example, the task manager 600 may control the controllable port (Ctrlb_port) so as to turn off some of the plurality of data lines included in the second data line (D_L2). For another example, the task manager 600 may control the controllable port (Ctrlb_port) so as to turn on all of the plurality of data lines included in the second data line (D_L2).

It is assumed that the neural core 100 can operate at the first to second operating frequencies, and the memory 450 can operate at the third to second operating frequencies. At this time, the second operating frequency may be greater than the first operating frequency, and the third operating frequency may be less than the first operating frequency. At this time, the data communication mode determiner (DCMD) may determine the operating frequency at which the neural core 100 and the memory 450 operate.

In the minimum power use mode, the data communication mode determiner (DCMD) may determine the operating frequency of the neural core 100 to be the first operating frequency and determine the operating frequency of the memory 450 to be the third operating frequency. In this case, the data communication mode determiner (DCMD) may determine the data communication mode of the neural core 100 and the memory 450 to be the asynchronous data communication mode. At this time, in a situation in which the operating frequencies of the memory 450 and the neural core 100 are relatively low, using all of the plurality of data lines included in the first data line (D_L1) and the second data line (D_L2) may be a waste of power. Accordingly, the task manager 600 may turn off at least some of the data lines included in the first data line (D_L1) and the second data line (D_L2).

Meanwhile, in the maximum computation speed mode, the data communication mode determiner (DCMD) may determine the operating frequency of the neural core 100 to be the second operating frequency and determine the operating frequency of the memory 450 to be the second operating frequency. In this case, the data communication mode determiner (DCMD) may determine the data communication mode to be the synchronous data communication mode. Further, even in this case, if timing issue occurs, the data communication mode determiner (DCMD) may change the data communication mode to the asynchronous data communication mode. At this time, the task manager 600 may turn on all data lines included in the first data line (D_L1) and the second data line (D_L2).

Figure 32:
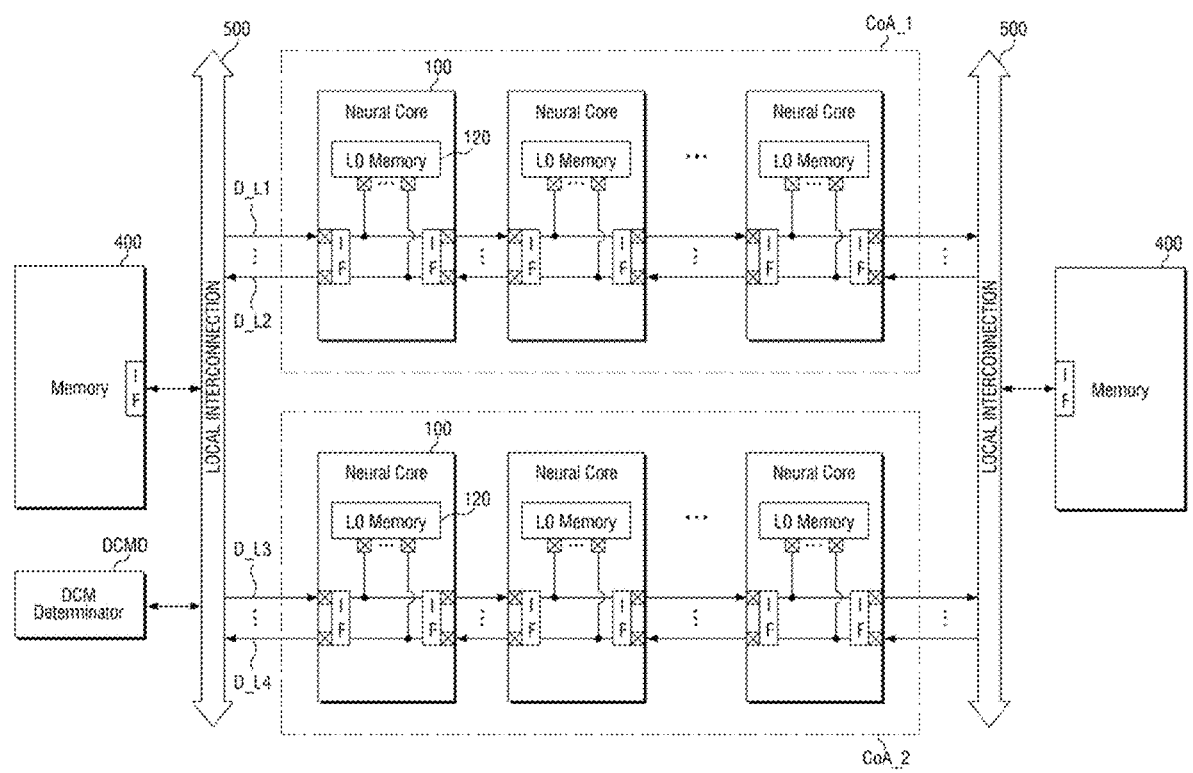
FIG. 32 is a diagram provided to explain an example in which the neural core and the memory are connected to each other through a local interconnection according to some examples of the present disclosure.

FIG. 32 is a diagram provided to explain an example in which the neural core and the memory are connected to each other through a local interconnection according to some examples of the present disclosure. For convenience of explanation, the elements or operations same as or similar to those described above will not be described or briefly described.

Referring to FIGS. 27 and 32, the core array (CoA) may include a first core array (CoA_1) and a second core array (CoA_2). The first core array (CoA_1) may include a first data line (D_L1) through which data is transmitted in a first direction. In addition, the first core array (CoA_1) may include a second data line (D_L2) through which data is transmitted in a second direction. In other words, the first core array (CoA_1) may be capable of transmitting data in both directions.

In addition, the second core array (CoA_2) may include a third data line D_L3 through which data is transmitted in the first direction. In addition, the second core array (CoA_2) may include a fourth data line D_L4 through which data is transmitted in the second direction. In other words, the second core array (CoA_2) may be capable of transmitting data in both directions.

The data communication mode determiner (DCMD) may determine the data communication mode of the first core array (CoA_1), the second core array (CoA_2), and the memory 450. The memory 450 may be connected to the local interconnection 200. In addition, the first core array (CoA_1) may be connected to the local interconnection 200. In addition, the second core array (CoA_2) may be connected to the local interconnection 200. In other words, data output from the memory 450 may be provided to the first core array (CoA_1) and/or the second core array (CoA_2) through the local interconnection 200. In addition, data output from the first core array (CoA_1) may be provided to the memory 450 and/or the second core array (CoA_2) through the local interconnection 200. In addition, data output from the second core array (CoA_2) may be provided to the memory 450 and/or the first core array (CoA_1) through the local interconnection 200.

The local interconnection 200 may connect at least one core array (CoA), the core global 500, and the task manager 600 to each other. The local interconnection 200 may be a path through which data moves among at least one core array (CoA), the memory 450, the core global 500, and the task manager 600. The local interconnection 200 may be connected to the global interconnection 6000 of FIG. 3 to transmit the data.

That is, the neural processor 1000 may include the memory 450 and the plurality of core arrays (CoA), and data movement may occur between the memory 450 and the core array (CoA) through the local interconnection 200. In addition, data movement between a plurality of core arrays (CoA) may also be performed through the local interconnection 200.

According to some examples, each of the first to fourth data lines D_L1 to D_L4 may include a plurality of data lines. For example, examples will be described below based on the assumption that the first data line (D_L1) includes a 1-1-th data line and a 1-2-th data line. According to some examples, the task manager 600 may control on/off the 1-1-th data line and the 1-2-th data line in accordance with the bandwidth for transmitting data. If the bandwidth of the local interconnection 200 is greater than the bandwidth of the 1-1-th data line, and if data is provided from the local interconnection 200 to the 1-1-th data line, latency may increase due to bottleneck. Therefore, in this case, the task manager 600 may control the controllable port (Ctrlb_port) to turn on both the 1-1-th data line and the 1-2-th data line. If both the 1-1-th data line and the 1-2-th data line are turned on, the bottleneck occurring in the local interconnection 200 may be minimized, thereby reducing latency.

Meanwhile, if the bandwidth of the local interconnection 200 is smaller than the bandwidth of the 1-1-th data line, the bottleneck may not occur even if data is provided from the local interconnection 200 to the 1-1-th data line. In this case, the task manager 600 may control the controllable port (Ctrlb_port) to turn on the 1-1-th data line and turn off the 1-2-th data line. Through this, power consumption generated by the neural processor 1000 can be minimized without involving latency, thereby maximizing efficiency.

In other words, the task manager 600 may control at least some of the plurality of data lines included in the first data line (D_L1) and the second data line (D_L2) in accordance with the bandwidth of the local interconnection 200. Through this, the efficiency of the neural processor 1000 in terms of power and latency can be maximized.

Figure 33:
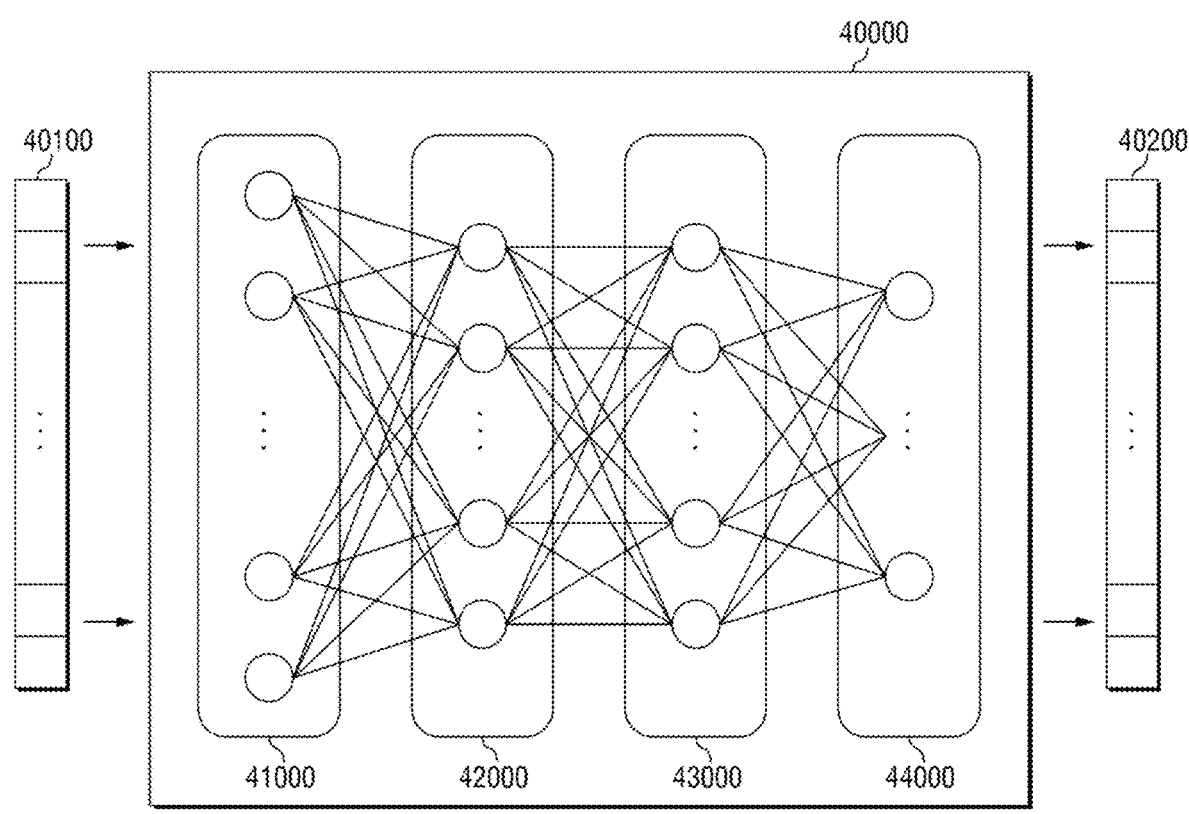
FIG. 33 is a conceptual diagram provided to explain a deep learning computation performed by the neural processing device according to some examples of the present disclosure.

FIG. 33 is a conceptual diagram provided to explain a deep learning computation performed by the neural processing device according to some examples of the present disclosure.

Referring to FIG. 33, in machine learning technology and cognitive science, an artificial neural network model 40000 as an example of the machine learning model refers to a statistical learning algorithm implemented based on a structure of a biological neural network, or to a structure that executes such algorithm.

The artificial neural network model 40000 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 40000 may include any probability model, neural network model, and the like, that is used in artificial intelligence training methods such as machine learning and deep learning.

The neural processing device according to some examples may perform computations by implementing this form of artificial neural network model 40000. For example, the artificial neural network model 40000 may receive an input image and output information on at least a portion of the object included in the input image.

The artificial neural network model 40000 is implemented as a multilayer perceptron (MLP) formed of multiple nodes and connections between them. The artificial neural network model 40000 may be implemented using one of various artificial neural network model structures including the MLP. As illustrated in FIG. 33, the artificial neural network model 40000 includes an input layer 41000 to receive an input signal or data 40100 from the outside, an output layer 44000 to output an output signal or data 40200 corresponding to the input data, and (n) number of hidden layers 42000 to 43000 (where n is a positive integer) positioned between the input layer 41000 and the output layer 44000 to receive a signal from the input layer 41000, extract the features, and transmit the features to the output layer 44000. The output layer 44000 receives signals from the hidden layers 42000 to 43000 and outputs the same to the outside.

The method of training the artificial neural network model 40000 includes the supervised learning that trains to optimize for solving a problem with inputs of teacher signals (correct answers), and the unsupervised learning that does not require a teacher signal.

The neural processing device may directly generate the training data for training the artificial neural network model 40000 through simulation. As described above, the input layer 41000 and the output layer 44000 of the artificial neural network model 40000 are respectively matched with a plurality of output variables corresponding to a plurality of input variables, and as the synaptic values between nodes included in the input layer 41000, the hidden layers 42000 to 43000, and the output layer 44000 are adjusted, training can be processed to extract a correct output corresponding to a specific input. Through this training process, the features hidden in the input variables of the artificial neural network model 40000 may be confirmed, and the synaptic values (or weights) between the nodes of the artificial neural network model 40000 may be adjusted so as to reduce the errors between the output variable calculated based on the input variable and the target output.

Figure 34:
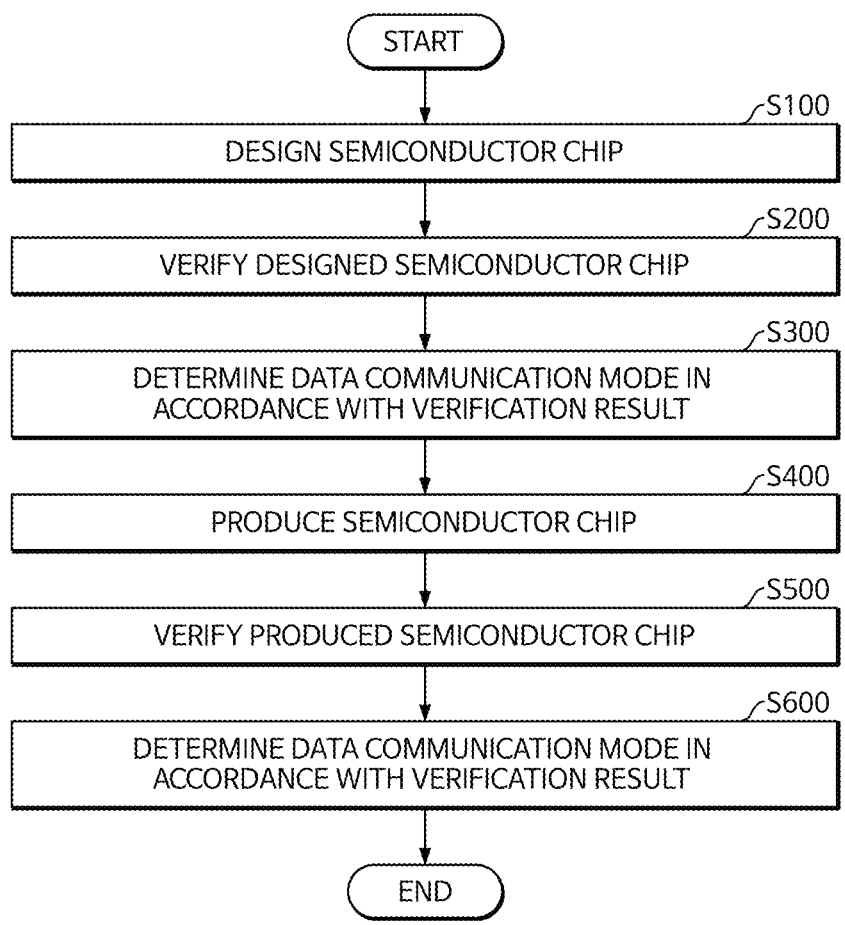
FIG. 34 is a diagram provided to explain a method for determining a data communication mode when designing and producing semiconductor chips according to some examples of the present disclosure.

FIG. 34 is a diagram provided to explain a method for determining a data communication mode when designing and producing semiconductor chips according to some examples of the present disclosure. For convenience of explanation, the elements or operations same as or similar to those described above will be omitted or briefly explained.

According to some examples, a semiconductor chip including a data communication mode determiner (DCMD) is designed, at S100. Next, verification is performed on the designed semiconductor chip, at S200. The verifying the designed semiconductor chip may include checking, through simulation, various tools, FPGA, etc., whether the designed semiconductor chip operates normally and checking whether the designed semiconductor chip can be physically implemented.

Next, the data communication mode is determined in accordance with the result of the verification of the designed semiconductor chip, at S300. That is, if at least some blocks included in the designed semiconductor chip are capable of synchronous data communication, by using the data communication mode determiner (DCMD), at least some blocks included in the designed semiconductor chip may be determined to be in the synchronous data communication mode. On the other hand, if some blocks included in the designed semiconductor chip are not capable of synchronous data communication mode, by using the data communication mode determiner (DCMD), some blocks may be determined to be the asynchronous data communication mode.

Next, the blocks are arranged in accordance with the design, the mode of data communication between blocks is determined, and the semiconductor chip is produced, at S400. The produced semiconductor chip is verified, at S500. The verifying the produced semiconductor chip may include testing whether a timing issue occurs in the produced semiconductor chip. The data communication mode for each block is changed in accordance with the verification result of the produced semiconductor chip, at S600. Among the blocks determined to be in the synchronous data communication mode for the mode of data communication between the blocks, for the blocks that passed as a result of the semiconductor chip test, that is, for the blocks with no particular issues, the data communication mode is maintained in the synchronous data communication mode. On the other hand, among the blocks determined to be in the synchronous data communication mode for the mode of data communication between the blocks, for the blocks that failed as a result of the semiconductor chip test, that is, for the blocks that have timing issues, the data communication mode is changed to the asynchronous data communication mode.

A method for determining the data communication mode when designing and producing a semiconductor chip according to some examples can be helpful in designing an optimal semiconductor chip. For example, if it is necessary to design a semiconductor chip in an ultra-small size, the chip designer may arrange the blocks as densely as possible, and resolve timing issues between the blocks using the data communication mode determiner (DCMD). For another example, if it is necessary to produce a semiconductor chip with new specifications by combining several already produced commercial blocks, the chip designer may adjust the arrangement of commercial blocks to reduce timing issues between commercial blocks as much as possible, and then optionally use the data communication mode determiner (DCMD) only when control is no longer possible, so as to determine the mode of data communication between blocks where timing issues occur to be the asynchronous communication mode, thereby designing semiconductor chips with minimal effort and cost.

In addition, even if the first neural processing device 1 including the data communication mode determiner (DCMD) according to some examples deteriorates due to use and experiences inter-block timing issues, the first neural processing device 1 can easily change the data communication mode into the asynchronous communication mode for the blocks having the timing issues, thereby significantly increasing the lifespan of the first neural processing device 1.

The above description is merely illustrative of the technical idea of the examples, and those of ordinary skill in the art to which the examples pertain will be able to make various modifications and variations without departing from the essential characteristics of the examples. Accordingly, the examples are not intended to limit the technical idea of the examples, but to explain the technical idea, and the scope of the technical idea of the examples is not limited by these examples. The scope of protection of the examples should be interpreted in accordance with the claims below, and all technical ideas within the equivalent scope should be interpreted as being included in the scope of claims of the examples.

The invention claimed is:

1. A neural processing device comprising a neural processor comprising a plurality of neural cores, the neural processing device comprising:
a first neural core that operates at a first operating frequency;
a second neural core that is connected to the first neural core and operates at the first operating frequency;
a third neural core that is connected to the second neural core and operates at the first operating frequency; and
a data communication mode determiner that is connected to the first to third neural cores, respectively, and controls data communication among the first to third neural cores, and determines a mode of data communication among the first to third neural cores,
wherein the data communication mode determiner determines a mode of data communication between the first neural core and the second neural core to be a synchronous data communication mode, and determines a mode of data communication between the second neural core and the third neural core to be a synchronous data communication mode, and
when a clock skew occurs in data communication between the second neural core and the third neural core, the data communication mode determiner maintains the mode of data communication between the first neural core and the second neural core as the synchronous data communication mode, and changes the mode of data communication between the second neural core and the third neural core to an asynchronous data communication mode.

2. The neural processing device according to claim 1, wherein the data communication mode determiner is capable of controlling the first neural core to operate at an operating frequency different from the first operating frequency, is capable of controlling the second neural core to operate at an operating frequency different from the first operating frequency, and is capable of controlling the third neural core to operate at an operating frequency different from the first operating frequency.

3. The neural processing device according to claim 2, wherein the data communication mode determiner controls the first neural core to operate at a second operating frequency different from the first operating frequency, and changes the mode of data communication between the first neural core and the second neural core to the asynchronous data communication mode.

4. The neural processing device according to claim 3, wherein the data communication mode determiner further controls the second neural core to operate at the second operating frequency, and changes the mode of data communication between the first neural core and the second neural core to the synchronous data communication mode, wherein, after the mode of data communication between the first neural core and the second neural core is changed to the synchronous data communication mode, when a clock skew occurs in data communication between the first neural core and the second neural core, the data communication mode determiner further changes the mode of data communication between the first neural core and the second neural core to the asynchronous data communication mode.

5. The neural processing device according to claim 1, wherein, when a clock skew occurs in data communication between the first neural core and the second neural core, the data communication mode determiner changes the mode of data communication between the first neural core and the second neural core to the asynchronous data communication mode.

6. The neural processing device according to claim 1, further comprising a command processor that controls the data communication mode determiner.

7. The neural processing device according to claim 1, wherein, each of the first neural core and the second neural core is either a neural core or a memory.

8. A neural processor comprising a plurality of neural cores, the neural processor comprising:
   a first neural core that operates at a first operating frequency;
   a second neural core that is connected to the first neural core and operates at the first operating frequency;
   a first memory that is connected to the first neural core and operates at a second operating frequency different from the first operating frequency;
   a task manager that configures a data communication path among the first neural core, the second neural core, and the first memory; and
   a data communication mode determiner that is connected to the first neural core, the second neural core, and the first memory, respectively, and controls a data communication among the first neural core, the second neural core, and the first memory, and determines a mode of data communication among the first neural core, the second neural core, and the first memory,
   wherein the data communication mode determiner determines the mode of data communication between the first neural core and the second neural core to be the synchronous data communication mode, and determines the mode of data communication between the first neural core and the first memory to be the asynchronous data communication mode,
   wherein, in a maximum computation speed mode, the data communication mode determiner controls each of the first neural core and the second neural core to operate at a third operating frequency greater than the first operating frequency.

9. The neural processor according to claim 8, wherein, in the maximum computation speed mode, the data communication mode determiner controls the first memory to operate at the third operating frequency and changes the mode of data communication between the first neural core and the first memory to the synchronous data communication mode.

10. The neural processor according to claim 9, wherein, when a clock skew occurs in data communication between the first neural core operating at the third operating frequency and the first memory operating at the third operating frequency, the data communication mode determiner changes the mode of data communication between the first neural core and the first memory to the asynchronous data communication mode.

11. The neural processor according to claim 8, wherein, in a minimum power use mode, the data communication mode determiner controls each of the first neural core and the second neural core to operate at a fourth operating frequency smaller than the first operating frequency.

12. The neural processor according to claim 11, wherein, in the minimum power use mode, the data communication mode determiner controls the first memory to operate at the fourth operating frequency and changes the mode of data communication between the first neural core and the first memory to the synchronous data communication mode.

13. The neural processor according to claim 12, wherein, when a clock skew occurs in data communication between the first neural core operating at the fourth operating frequency and the first memory operating at the fourth operating frequency, the data communication mode determiner changes the mode of data communication between the first neural core and the first memory to the asynchronous data communication mode.

14. The neural processor according to claim 8, further comprising:
   a first data line connecting the first neural core and the second neural core in series and transmitting data in a first direction;
   a second data line connecting the first neural core and the second neural core in series and transmitting data in a second direction opposite to the first direction; and
   a second memory that is connected to the second neural core and operates at the first operating frequency,
   wherein the task manager controls the first data line and the second data line so as to configure a data path among the first neural core, the second neural core, the first memory, and the second memory, and
   the data communication mode determiner determines the mode of data communication between the second neural core and the second memory to be the synchronous data communication mode.

15. The neural processor according to claim 14, wherein, when a clock skew occurs in data communication between the second neural core and the second memory, the data communication mode determiner changes the mode of data communication between the second neural core and the second memory to the asynchronous data communication mode.

16. The neural processor according to claim 15, wherein the task manager controls the first data line and the second data line so as to configure a first data path in which data is provided in the first direction from the first memory to the first neural core and data is provided in the second direction from the first neural core to the first memory, and control the first data line and the second data line so as to configure a second data path in which data is provided in the second direction from the second memory to the second neural core and data is provided in the first direction from the second neural core to the second memory.

17. The neural processor according to claim 8, wherein, when a clock skew occurs in data communication between the first neural core and the second neural core, the data communication mode determiner changes the mode of data communication between the first neural core and the second neural core to the asynchronous data communication mode.

18. A method for determining a data communication mode, the method being performed in a neural processing device including first, second, and third neural core performing data communication and comprising:

controlling the first neural core to operate at a first operating frequency;

controlling the second neural core connected to the first neural core to operate at the first operating frequency;

controlling the third neural core connected to the second neural core to operate at a second operating frequency different from the first operating frequency;

determining a mode of data communication between the first neural core and the second neural core to be a synchronous data communication mode; and determining a mode of data communication between the second neural core and the third neural core to be an asynchronous data communication mode, when a clock skew occurs in data communication between the first neural core and the second neural core, changing the mode of data communication between the first neural core and the second neural core to the asynchronous data communication mode.

* * * * *